(12) United States Patent
Miyoshi et al.

(10) Patent No.: US 8,012,599 B2
(45) Date of Patent: Sep. 6, 2011

(54) SURFACE-TREATED STEEL SHEET WITH EXCELLENT CORROSION RESISTANCE AND METHOD FOR MANUFACTURING SAME

(75) Inventors: Tatsuya Miyoshi, Fukuyama (JP); Kenichi Sasaki, Fukuyama (JP); Naoto Yoshimi, Chiba (JP); Akira Matsuzaki, Fukuyama (JP); Kazuhisa Okai, Fukuyama (JP); Takao Ooshima, Hiratuka (JP); Takashi Nakano, Hiratuka (JP); Masahiro Murata, Hiratuka (JP); Syoichi Tanaka, Hiratuka (JP)

(73) Assignees: JFE Steel Corporation, Tokyo (JP); Kansai Paint Co., Ltd., Hyogo (JP)

( * ) Notice: Subject to any disclaimer, the term of this patent is extended or adjusted under 35 U.S.C. 154(b) by 124 days.

(21) Appl. No.: 11/977,868

(22) Filed: Oct. 26, 2007

(65) Prior Publication Data

US 2008/0070018 A1 Mar. 20, 2008

Related U.S. Application Data

(62) Division of application No. 10/559,641, filed as application No. PCT/JP2004/008650 on Jun. 14, 2004, now Pat. No. 7,517,591.

(30) Foreign Application Priority Data

Jun. 16, 2003 (JP) .................................. 2003-171344
May 17, 2004 (JP) .................................. 2004-146334

(51) Int. Cl.
*B32B 15/04* (2006.01)
*B32B 15/08* (2006.01)
*B32B 15/092* (2006.01)
*B32B 15/095* (2006.01)
*B32B 15/18* (2006.01)
*B05D 3/02* (2006.01)

(52) U.S. Cl. ......... 428/626; 428/653; 428/659; 428/215; 428/336; 428/457; 428/433.1; 427/379; 427/388.2; 427/386

(58) Field of Classification Search .................. 428/626, 428/650, 653, 659, 681, 685, 215, 336, 416, 428/418, 457, 469, 470, 472, 423.1, 425.8
See application file for complete search history.

(56) References Cited

U.S. PATENT DOCUMENTS

| | | | | | |
|---|---|---|---|---|---|
| 5,141,822 | A | * | 8/1992 | Matsuo et al. | ................. 428/623 |
| 2005/0147832 | A1 | * | 7/2005 | Okai et al. | .................... 428/447 |

FOREIGN PATENT DOCUMENTS

| | | | |
|---|---|---|---|
| EP | 1 291 453 | A1 | 3/2003 |
| JP | 7-216268 | A | 8/1995 |
| JP | 8-252524 | A | 10/1996 |
| JP | 8-325760 | A | 12/1996 |
| JP | 11-106945 | A | 4/1999 |
| JP | 2968959 | B1 | 8/1999 |
| JP | 2000-14443 | A | 1/2000 |
| JP | 2000-344578 | A | 2/2000 |
| JP | 2000-178761 | A | 6/2000 |
| JP | 2000-199076 | A | 7/2000 |
| JP | 2000-248380 | A | 9/2000 |
| JP | 2000-281946 | A | 10/2000 |
| JP | 2000-319787 | A | 11/2000 |
| JP | 2000-348384 | A | 12/2000 |
| JP | 2001-239514 | A | 9/2001 |
| JP | 2001-335965 | A | 12/2001 |
| JP | 2002-53979 | A | 2/2002 |
| JP | 2003-34743 | A | 2/2003 |
| JP | 2003-239081 | A | 8/2003 |
| JP | 2004-162097 | A | 6/2004 |
| WO | WO 2004/009870 | | * 1/2004 |

* cited by examiner

*Primary Examiner* — Michael La Villa
(74) *Attorney, Agent, or Firm* — Holtz, Holtz, Goodman & Chick, PC

(57) ABSTRACT

The surface-treated steel sheet has a zinc-based plated steel sheet, a surface-treatment coating being formed on the surface of the zinc-based steel sheet by applying and drying a surface treatment coating composition thereon, and a top coating being formed by applying and drying a coating composition for top coating on the surface-treatment coating. The surface treatment coating composition contains a water-epoxy resin dispersion, a silane coupling agent, and phosphoric acid and/or a hexafluorometal acid. The coating composition for top coating contains a high molecular weight epoxy group-containing resin having number average molecular weights ranging from 6000 to 20000.

9 Claims, No Drawings

US 8,012,599 B2

SURFACE-TREATED STEEL SHEET WITH EXCELLENT CORROSION RESISTANCE AND METHOD FOR MANUFACTURING SAME

CROSS-REFERENCE TO RELATED APPLICATION

This is a divisional application of application Ser. No. 10/559,641 filed Dec. 2, 2005 (U.S. Pat. No. 7,517,591), the entire contents of which are incorporated by reference herein, which is the U.S. national phase application of International application PCT/JP2004/008650 filed Jun. 14, 2004, the entire contents of which are incorporated by reference herein.

BACKGROUND OF THE INVENTION

1. Technical Field

The present invention relates to a surface-treated steel sheet with excellent corrosion resistance and a method for manufacturing thereof. Specifically the present invention relates to an environmentally compatible surface-treated steel sheet as a surface-treated steel sheet with excellent corrosion resistance best suitable for outer panels and inner panels of automobile, free from chromium in the manufacturing process of the surface-treated steel sheet and within the surface-treatment coating, and a method for manufacturing thereof.

2. Background Art

Steel sheets such as zinc-based plated steel sheets or aluminum-based plated steel sheets which are further treated by chromating thereon in a treatment solution containing main ingredients of chromic acid, bichromic acid, or salt thereof have widely been used for the steel sheets for household electric appliances, the steel sheets for buildings, and the steel sheets for automobiles aiming to improve the corrosion resistance (resistance to white rust and resistance to red rust). The chromating is an economical treatment method to provide excellent corrosion resistance and to be conducted relatively easily.

Although chromating uses hexavalent chromium which is a regulated substance for pollution prevention, the hexavalent chromium is treated in a closed system in the treatment process, thereby being completely reduced and recovered, and is not emitted to natural environment. Furthermore, the sealing action of organic coating allows very little the chromium to elute from the chromate coating so that environment and human body are substantially not contaminated by the hexavalent chromium. From the viewpoint of recent global environmental concern, however, the movement of independently decreasing the use of heavy metals including hexavalent chromium has been enhanced. In addition, to prevent the environmental contamination of discarded shredder-dust of industrially wasted products, there has been begun a movement to eliminate or to minimize the heavy metals in the products as far as possible.

Under the situation, there are introduced many treatment technologies to prevent the generation of white rust on zinc-based plated steel sheet without applying chromating, or what is called the "chromium-free technology". An example of the chromium-free technology is a method using a solution of an inorganic compound, an organic compound, an organic polymer material, or a combination thereof, adopting immersion, application, electrolytic treatment, and the like to form a thin film on the zinc-based plated steel sheet.

Typical related technologies are the following.

(1) A method of forming coating by immersing the steel sheet in a treatment solution containing a polyphenol carboxylic acid such as tannic acid and a silane coupling agent, or by applying the treatment solution onto the steel sheet, (for example, Patent Document 1 and Patent Document 2).

(2) A method of forming coating using a treatment solution containing an organic resin blended with a polyphenol carboxylic acid such as tannic acid or a phosphoric acid compound, (for example, Patent Documents 3 through 6).

(3) A method of applying a coating prepared by blending an organic resin and a silane coupling agent, (for example, Patent Documents 7 through 13).

Patent Document 1: Japanese Patent Laid-Open No. 7-216268
Patent Document 2: Japanese Patent No. 2968959
Patent Document 3: Japanese Patent Laid-Open No. 8-325760
Patent Document 4: Japanese Patent Laid-Open No. 2000-34578
Patent Document 5: Japanese Patent Laid-Open No. 2000-199076
Patent Document 6: Japanese Patent Laid-Open No. 2000-248380
Patent Document 7: Japanese Patent Laid-Open No. 11-106945
Patent Document 8: Japanese Patent Laid-Open No. 2000-319787
Patent Document 9: Japanese Patent Laid-Open No. 2000-248384
Patent Document 10: Japanese Patent Laid-Open No. 2000-178761
Patent Document 11: Japanese Patent Laid-Open No. 2000-199076
Patent Document 12: Japanese Patent Laid-Open No. 2000-281946
Patent Document 13: Japanese Patent Laid-Open No. 2000-14443

As for the above method (1), there is a method of treatment in an aqueous solution of a polyphenol carboxylic acid, a silane coupling agent, and further a metal ion. An example of the treatment method is the one described in Patent Document 1. Since, however, the treatment method has a drawback of failing to attain sufficient corrosion resistance, though favorable adhesion of coating is available.

As for the above method (2), Patent Document 3, for example, discloses a method of treatment using a treatment solution containing a polyphenol carboxylic acid, an organic resin, and a metal ion. In addition, Patent Document 4 discloses a method of treatment conducted by immersing the steel sheet in a treatment solution containing an organic resin and a phosphoric acid compound, or by applying the treatment solution onto the steel sheet, followed by drying the applied solution. The protective coating formed by these treatment solutions cannot attain strong corrosion resistance which is attained by the chromating, though the protective coating contributes to the improvement in corrosion resistance to some degree.

As for the above method (3), Patent Documents 8 and 9 disclose a steel sheet having a coating which contains an organic resin, a silane coupling agent, and further a thiocarbonyl compound, a phosphoric acid compound, and a vanadium compound. Since, however, the organic resin is polyurethane or acrylic-olefin resin, the corrosion resistance is not satisfactory. Patent Document 11 discloses a steel sheet having a coating of acid-modified epoxy resin. Patent Document 10 discloses a steel sheet having a coating prepared by blending a resin which contains copolymerization ingredients of monomer containing hydroxyl group, carboxyl group, glycidyl group, and phosphoric acid group, with a silane coupling agent and a phosphoric acid compound. Both of these coatings do not give sufficient corrosion resistance. Patent Document 7 discloses a steel sheet having a coating containing a polyvinylphenol derivative, a silane coupling agent, and an etchant such as phosphoric acid. The coating also cannot give sufficient corrosion resistance. Patent Document 12 discloses a steel sheet having a coating containing an organic resin and an etchant, and Patent Document 13 discloses a steel sheet having a coating containing an organic resin and a silane coupling agent. Both of these Patent Documents do not give detail description, and their coatings have insufficient corrosion resistance.

DISCLOSURE OF THE INVENTION

An object of the present invention is to provide a surface-treated steel sheet which does not contain chromium in the coating thereof and which gives excellent corrosion resistance, and a method for manufacturing thereof.

To attain the above object, the present invention provides a surface-treated steel sheet with excellent corrosion resistance that contains: a zinc-based plated steel sheet or an aluminum-based plated steel sheet; a surface-treatment coating having coating thicknesses ranging from 0.01 to 1 μm, and being formed by applying and drying a surface treatment coating composition which contains ingredients (a) through (c) described below on a surface of the plated steel sheet; and a top coating having coating thicknesses ranging from 0.3 to 2 μm, and being formed by applying and drying a coating composition for top coating on the surface-treatment coating.

The ingredients (a) through (c) in the surface treatment coating composition are the following.

(a) A water-epoxy resin dispersion which is prepared by dispersing in water a resin obtained by a reaction of: an (A) polyalkyleneglycol-modified epoxy resin derived from a reaction of polyalkyleneglycol having number average molecular weights ranging from 400 to 20000, a bisphenol type epoxy resin, an active hydrogen-containing compound, and a polyisocyanate compound; a (B) epoxy group-containing resin other than the (A) polyalkyleneglycol-modified epoxy resin; and an active hydrogen-containing compound in which a part or entire of the compound is structured by a (C) hydrazine derivative having active hydrogen.

(b) A silane coupling agent at amounts ranging from 1 to 300 parts by mass of solid matter therein to 100 parts by mass of the resin solid matter in the water-epoxy resin dispersion.

(c) Phosphoric acid and/or a hexafluorometal acid at amounts ranging from 0.1 to 80 parts by mass of solid matter therein to 100 parts by mass of the resin solid matter in the water-epoxy resin dispersion.

The coating composition for top coating contains an (E) high molecular weight epoxy group-containing resin having number average molecular weights ranging from 6000 to 20000.

The present invention further provides a surface-treated steel sheet with excellent corrosion resistance that contains: a zinc-based plated steel sheet or an aluminum-based plated steel sheet; a surface-treatment coating having coating thicknesses ranging from 0.01 to 1 μm, and being formed by applying and drying a surface treatment coating composition which contains ingredients (α) through (δ) described below on a surface of the plated steel sheet; and a top coating having coating thicknesses ranging from 0.3 to 2 μm, and being formed by applying and drying a coating composition for top coating on the surface-treatment coating.

The ingredients (α) through (δ) in the surface treatment coating composition are the following.

(α) A water-epoxy resin dispersion which is prepared by dispersing in water a (Z) modified epoxy resin obtained by a reaction of a (W) epoxy group-containing resin, an (X) primary amine compound and/or secondary amine compound, and an active hydrogen-containing compound in which a part or entire of the compound is structured by a (Y) hydrazine derivative having active hydrogen.

(β) A water dispersed polyurethane resine at amounts of mass ratio of the resin solid matter in the water-epoxy resin dispersion to the resin solid matter in the water dispersed polyurethane resine, [water-epoxy resin dispersion]/[water dispersed polyurethane resine], ranging from 95/5 to 5/95.

(γ) A silane coupling agent at amounts ranging from 1 to 300 parts by mass of solid matter therein to 100 parts by mass of the resin solid matter in the water-epoxy resin dispersion.

(δ) Phosphoric acid and/or a hexafluorometal acid at amounts ranging from 0.1 to 80 parts by mass of solid matter therein to 100 parts by mass of the resin solid matter in the water-epoxy resin dispersion.

The coating composition for top coating contains an (E) high molecular weight epoxy group-containing resin having number average molecular weights ranging from 6000 to 20000.

The present invention further provides a method for manufacturing surface-treated steel sheet with excellent corrosion resistance, which method has the steps of: applying a surface treatment coating composition which contains ingredients (a) through (c) described below onto a surface of a zinc-based plated steel sheet or an aluminum-based plated steel sheet, and then drying the applied surface treatment coating composition at ultimate sheet temperatures ranging from 30° C. to 150° C., thus forming a surface-treatment coating having coating thicknesses ranging from 0.01 to 1 μm; and forming a top coating having coating thicknesses ranging from 0.3 to 2 μm on the surface-treatment coating by applying a coating composition for top coating, and then by drying the applied coating composition for top coating at ultimate sheet temperatures ranging from 30° C. to 150° C.

The ingredients (a) through (c) in the surface treatment coating composition are the following.

(a) A water-epoxy resin dispersion which is prepared by dispersing in water a resin obtained by a reaction of: an (A) polyalkyleneglycol-modified epoxy resin derived from a reaction of polyalkyleneglycol having number average molecular weights ranging from 400 to 20000, a bisphenol type epoxy resin, an active hydrogen-containing compound, and a polyisocyanate compound; a (B) epoxy group-containing resin other than the (A) polyalkyleneglycol-modified epoxy resin; and an active hydrogen-containing compound in which a part or entire of the compound is structured by a (C) hydrazine derivative having active hydrogen.

(b) A silane coupling agent at amounts ranging from 1 to 300 parts by mass of solid matter therein to 100 parts by mass of the resin solid matter in the water-epoxy resin dispersion.

(c) Phosphoric acid and/or a hexafluorometal acid at amounts ranging from 0.1 to 80 parts by mass of solid matter therein to 100 parts by mass of the resin solid matter in the water-epoxy resin dispersion.

The coating composition for top coating contains an (E) high molecular weight epoxy group-containing resin having number average molecular weights ranging from 6000 to 20000.

The present invention further provides a method for manufacturing surface-treated steel sheet with excellent corrosion resistance, which method has the steps of: applying a surface treatment coating composition which contains ingredients (α) through (δ) described below onto a surface of a zinc-based plated steel sheet or an aluminum-based plated steel sheet, and then drying the applied surface treatment coating composition at ultimate sheet temperatures ranging from 30° C. to 150° C., thus forming a surface-treatment coating having coating thicknesses ranging from 0.01 to 1 μm; and forming a top coating having coating thicknesses ranging from 0.3 to 2 μm on the surface treatment coating by applying a coating composition for top coating, and then by drying the applied coating composition for top coating at ultimate sheet temperatures ranging from 30° C. to 150° C.

The ingredients (α) through (δ) in the surface treatment coating composition are the following.

(α) A water-epoxy resin dispersion which is prepared by dispersing In water a (Z) modified epoxy resin obtained by a reaction of a (W) epoxy group-containing resin, an (X) primary amine compound and/or secondary amine compound, and an active hydrogen-containing compound in which a part or entire of the compound is structured by a (Y) hydrazine derivative having active hydrogen.

(β) A water dispersed polyurethane resine at amounts of mass ratio of the resin solid matter in the water-epoxy resin dispersion to the resin solid matter in the water dispersed polyurethane resine, [water-epoxy resin dispersion]/[water dispersed polyurethane resine], ranging from 95/5 to 5/95.

(γ) A silane coupling agent at amounts ranging from 1 to 300 parts by mass of solid matter therein to 100 parts by mass of the resin solid matter in the water-epoxy resin dispersion.

(δ) Phosphoric acid and/or a hexafluorometal acid at amounts ranging from 0.1 to 80 parts by mass of solid matter therein to 100 parts by mass of the resin solid matter in the water-epoxy resin dispersion.

The coating composition for top coating contains an (E) high molecular weight epoxy group-containing resin having number average molecular weights ranging from 6000 to 20000.

EMBODIMENTS OF THE INVENTION

The findings derived by the inventors of the present invention and the corrosion preventive mechanism which is an aim of the present invention and is derived based on these findings are described in the following.

Corrosion of a zinc-based plated steel sheet with a surface-treatment coating thereon is speculated to proceed in the following steps.

(1) Corrosive substances (oxygen, water, chlorine ion, and the like) penetrate into the surface-treatment coating, and they diffuse to the interface between plated coating and surface-treatment coating.

(2) At the boundary between the plated coating and the surface-treatment coating, following-given oxidation-reduction reaction proceeds to dissolve zinc.

Cathodic reaction: 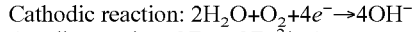
Anodic reaction: 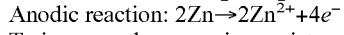

To improve the corrosion resistance of zinc-based plated steel sheet, therefore, suppression of the progress of both of the above reactions (1) and (2) is essential. To do this, it is effective to structure a coating configuration that contains both of:

(a) a high grade barrier layer which hinders the diffusion of corrosive substances; and (b) a reaction layer with the plated metal to make the surface layer of the plated coating inactive. The barrier layer (a) acts mainly to suppress the above-cathodic reaction, while the reaction layer (b) acts mainly to suppress the above anodic reaction. It is further effective that the coating configuration is the one to perform self-repair action in case that the reactive layer becomes defective.

An investigation found that the effect of improvement in corrosion resistance is attained by actualizing that type of coating configuration in a single layer coating formed by a single application coating, not in two-layer coating of the related art separately coating the barrier layer-forming ingredient and the reaction layer-forming ingredient. In detail, the effect of improvement in corrosion resistance is attained by separately forming the (a) barrier layer (an organic resin matrix layer described later) on the coating, and forming the (b) reaction layer (an amorphous compound layer described later) under the coating. Preferably, the effect of improvement in corrosion resistance is attained by precipitating a substance which induces self-repair action in the coating, thereby inducing a synergy effect. When that type of single layer coating is defined as a pseudo-two layer coating, no distinctive interface exists between the barrier layer and the reaction layer configuring the pseudo-two layer coating, which interface is observed between the two layer coatings formed by the two coatings in the prior art. Furthermore, by adopting a gradient composition of these two layers, higher grade effect of improvement in corrosion resistance than that of the single layer coating in the prior art should be attained.

The above-described pseudo-two layer coating can be prepared by applying a surface treatment coating composition onto the surface of a zinc-based plated steel sheet or an aluminum-based plated steel sheet, and then by drying the composition, which surface treatment coating composition is prepared by blending a water-dispersed resin obtained by a reaction of a specific modified epoxy resin, a hydrazine derivative having active hydrogen, or other compound, or a water-dispersed modified epoxy resin obtained by a reaction of an epoxy group-containing resin, a primary amine compound and/or a secondary amine compound, and a hydrazine derivative having active hydrogen, with a silane coupling agent and a specific acid ingredient (phosphoric acid, hexafluorometal acid, or the like).

The silane coupling agent is known to have a function to improve the adhesion between an inorganic compound and an organic compound, thus the silane coupling can increase the adhesion between the plated metal and the water-dispersible resin. Regarding the known effect of silane coupling agent, when the above-described specific surface treatment coating composition is used, the acid ingredient in the surface treatment coating composition presumably activates the surface of the plated coating by etching, and the silane coupling agent presumably chemically bonds the activated plated coating with the coating-forming resin, thereby attaining the extremely strong adhesion between the plated metal and the coating-forming resin. That is, the combined addition of a silane coupling agent and a specific acid ingredient to the surface treatment coating composition presumably increases drastically the adhesion between the plated metal and the coating-forming resin compared with the case of addition of sole silane coupling agent, thus the proceed of corrosion of the plated metal is effectively suppressed to attain especially high corrosion resistance.

Although the detail mechanism of forming the pseudo-two layer coating having above-described configuration is not fully analyzed, the reaction between the acid ingredient of the surface treatment coating composition and the surface of plated coating may contribute to the formation of coating. On the other hand, there is a speculation of following-describing action accompanied with silane coupling agent. That is, since the silane coupling agent which is hydrolyzed in an aqueous solution has silanol group (Si—OH), the hydrogen-bonding type adsorption action of the silane coupling agent to the surface of plated metal which is activated by the acid ingredient is enhanced, thus enriching the silane coupling agent on the surface of plated metal. By succeeding drying, a dehydration-condensation reaction occurs to establish strong chemical bond, which chemical bond then forms the (b) reaction layer under the coating, while the water-dispersible resin which is enriched at upper part of the coating forms the (a) barrier layer. The reaction layer is a layer reacted with the plated metal which inactivates the surface layer of the plated coating, and the barrier layer is a strong barrier layer which acts as a diffusion hindrance to the corrosive substances. Furthermore, there is a possibility of occurrence of combined above-actions. During the above-described coating-forming process, reaction products (compounds) yielded from the reaction between the plated metal such as dissolved zinc and the acid ingredient are presumably precipitated in the coating.

Although the detail mechanism of corrosion resistance of the pseudo-two layer coating is not fully analyzed, speculated individual mechanisms of corrosion resistance are the following (1) through (5), and presumably their combined actions provide the extremely high corrosion resistance (white rust resistance).

(1) By providing an epoxy group-containing resin with a hydrazine derivative, a dense organic polymer coating is formed as the (a) barrier layer. The organic polymer coating suppresses the permeation of corrosive substances (oxygen, water, chlorine ion, and the like), thus effectively suppressing the cathodic reaction which is a cause of corrosion.

(2) Free hydrazine derivative in the coating entraps the plated metal ion eluted by the corrosion reaction, thus forming a stable and insoluble chelating compound layer.

(3) The (b) reaction layer inactivates the surface layer of the plated coating, thus effectively suppressing the anodic reaction which is a cause of corrosion.

(4) The precipitated compound in the coating dissolves in a corrosive environment to form an acid ingredient (phosphoric acid ion, and the like). As a result, a self-repair action is attained, in which the acidic ingredient entraps metal ion such as zinc ion eluted from the plated coating, (forming an insoluble compound by bonding with the metal ion).

(5) The silane coupling agent strongly bonds with the metal surface which is activated by the acid ingredient, thus suppressing the dissolution of plated metal, and also bonds with the coating-forming resin, thereby forming a dense coating having strong adhesion.

Furthermore, by adding a water dispersed polyurethane resine to the surface treatment coating composition to let the urethane resin exist in the coating, workability is improved, crack generation in the coating under press-working is suppressed, and excellent barrier performance is kept even after working.

By further adding a water-soluble phosphate and a non-chromium based rust inhibitor to the surface treatment coating composition, superior corrosion resistance is attained. For a water-soluble phosphate, similar with the above-case, the slightly-soluble coating presumably gives the barrier performance to the corrosive substances, and the phosphoric acid ingredient entraps the eluted plated metal ion, thus forming an insoluble compound with the plated metal ion. In addition, the non-chromium based rust inhibitor forms a protective coating at the origin of the corrosion so that the excellent corrosion-preventive performance is attained. In actual, those combined effects give extremely high corrosion preventive performance.

The corrosion-preventive mechanism of the surface-treatment coating obtained from a specific treatment composition is described above. According to the investigations of the inventors of the present invention, however, the sole single layer of that type of surface-treatment coating or the sole two-layer coating configuration of the surface-treatment coating with a simple organic coating thereon gives serious damages at a severe working section under a holddown bead or the like found in a press-mold for automobile, and the corrosion resistance is significantly poor. Furthermore, it was found that alkali-degreasing given to remove oil after working further damages the damaged portions on the coating, which further deteriorates the corrosion resistance. To this point, the inventors of the present invention conducted further investigations about the coating configuration that highly satisfies the corrosion resistance at working section under that severe working and succeeding alkali degreasing, and found that the high corrosion prevention effect is attained even at the sections subjected to above-described severe working and alkali-degreasing by forming a coating which contains a high molecular weight epoxy group-containing resin having number average molecular weights ranging from 6000 to 20000, or preferably by forming a coating which contains the resin as the main ingredient resin, as the secondary coating on the above-described surface-treatment coating. That is, the present invention attains especially high corrosion resistance at working sections by the combined actions of the combination of above-described specific surface-treatment coating (base coating) with a specific high molecular weight resin coating.

The present invention was perfected based on the above-described findings, and the characteristics of the present invention are the following.

[1] A surface-treated steel sheet with excellent corrosion resistance contains: a zinc-based plated steel sheet or an aluminum-based plated steel sheet; a surface-treatment coating having coating thicknesses ranging from 0.01 to 1.0 µm, and being formed by applying and drying a surface treatment coating composition which contains ingredients (a) through (c) described below on a surface of the plated steel sheet; and a top coating having coating thicknesses ranging from 0.3 to 2.0 µm, and being formed by applying and drying a coating composition for top coating, containing an (E) high molecular weight epoxy group-containing resin having number average molecular weights ranging from 6000 to 20000 on the surface-treatment coating:

(a) a water-epoxy resin dispersion which is prepared by dispersing in water a resin obtained by a reaction of: an (A) polyalkyleneglycol-modified epoxy resin derived from a reaction of polyalkyleneglycol having number average molecular weights ranging from 400 to 20000, a bisphenol type epoxy resin, an active hydrogen-containing compound, and a polyisocyanate compound; a (B) epoxy group-containing resin other than the (A) polyalkyleneglycol-modified epoxy resin; and an active hydrogen-containing compound in which a part or entire of the compound is structured by a (C) hydrazine derivative having active hydrogen;

(b) a silane coupling agent at amounts ranging from 1 to 300 parts by mass of solid matter therein to 100 parts by mass of the resin solid matter in the water-epoxy resin dispersion; and (c) phosphoric acid and/or a hexafluorometal acid at amounts ranging from 0.1 to 80 parts by mass of solid matter therein to 100 parts by mass of the resin solid matter in the water-epoxy resin dispersion.

[2] The surface-treated steel sheet with excellent corrosion resistance according to [1], wherein the (C) hydrazine derivative containing active hydrogen is one or more compounds selected from the group consisting of a pyrazole compound and a triazole compound, which compound has a ring structure of five-membered ring or six-membered ring, and has nitrogen atom in the ring structure.

[3] The surface-treated steel sheet with excellent corrosion resistance according to [1] or [2], wherein the surface treatment coating composition further contains a water-soluble phosphate at amounts ranging from 0.1 to 60 parts by mass of solid matter therein to 100 parts by mass of the resin solid matter in the water-epoxy resin dispersion of the ingredient (a).

[4] The surface-treated steel sheet with excellent corrosion resistance according to any of [1] through [3], wherein the surface treatment coating composition further contains a non-chromium based rust inhibitor at amounts ranging from 0.1 to 50 parts by mass of solid matter therein to 100 parts by mass of the resin solid matter in the water-epoxy resin dispersion of the ingredient (a).

[5] A surface-treated steel sheet with excellent corrosion resistance contains: a zinc-based plated steel sheet or an aluminum-based plated steel sheet; a surface-treatment coating having coating thicknesses ranging from 0.01 to 1.0 μm, and being formed by applying and drying a surface treatment coating composition which contains ingredients ($\alpha$) through ($\delta$) described below on a surface of the plated steel sheet; and a top coating having coating thicknesses ranging from 0.3 to 2.0 μm, and being formed by applying and drying a coating composition for top coating, containing an (E) high molecular weight epoxy group-containing resin having number average molecular weights ranging from 6000 to 20000 on the surface-treatment coating:

($\alpha$) a water-epoxy resin dispersion which is prepared by dispersing in eater a (Z) modified epoxy resin obtained by a reaction of a (W) epoxy group-containing resin, an (X) primary amine compound and/or secondary amine compound, and an active hydrogen-containing compound in which a part or entire of the compound is structured by a (Y) hydrazine derivative having active hydrogen;

($\beta$) a water dispersed polyurethane resine at amounts of mass ratio of the resin solid matter in the water-epoxy resin dispersion to the resin solid matter in the water dispersed polyurethane resine, [water-epoxy resin dispersion]/[water dispersed polyurethane resine], ranging from 95/5 to 5/95;

($\gamma$) a silane coupling agent at amounts ranging from 1 to 300 parts by mass of solid matter therein to 100 parts by mass of the resin solid matter in the water-epoxy resin dispersion; and ($\delta$) phosphoric acid and/or a hexafluorometal acid at amounts ranging from 0.1 to 80 parts by mass of solid matter therein to 100 parts by mass of the resin solid matter in the water-epoxy resin dispersion.

[6] The surface-treated steel sheet with excellent corrosion resistance according to [5], wherein the (Y) hydrazine derivative containing active hydrogen is one or more compounds selected from the group consisting of a pyrazole compound and a triazole compound, which compound has a ring structure of five-membered ring or six-membered ring, and has nitrogen atom in the ring structure.

[7] The surface-treated steel sheet with excellent corrosion resistance according to [5] or [6], wherein the surface treatment coating composition further contains a water-soluble phosphate at amounts ranging from 0.1 to 60 parts by mass of solid matter therein to 100 parts by mass of the resin solid matter in the sum of the water-epoxy resin dispersion of the ingredient ($\alpha$) and the water dispersed polyurethane resine of the ingredient ($\beta$).

[8] The surface-treated steel sheet with excellent corrosion resistance according to any of [5] through [7], wherein the surface treatment coating composition further contains a non-chromium based rust inhibitor at amounts ranging from 0.1 to 50 parts by mass of solid matter therein to 100 parts by mass of the resin solid matter in the sum of the water-epoxy resin dispersion of the ingredient ($\alpha$) and the water dispersed polyurethane resine of the ingredient ($\beta$).

[9] The surface-treated steel sheet with excellent corrosion resistance according to any of [1] through [8], wherein the coating composition for top coating further contains a non-chromium based rust inhibitor at amounts ranging from 0.1 to 50 parts by mass of solid matter therein to 100 parts by mass of the resin solid matter in the coating composition.

[10] The surface-treated steel sheet with excellent corrosion resistance according to any of [1] through [9], wherein the surface treatment coating composition for forming a surface-treatment coating and/or a coating composition for top coating contains one or more compounds selected from the group consisting of (e1) through (e7) given below as the non-chromium based rust inhibitor:

(e1) silicon oxide
(e2) calcium and/or calcium compound
(e3) slightly-soluble phosphoric acid compound
(e4) molybdic acid compound
(e5) vanadium compound
(e6) organic compound containing S atom, being one or more compounds selected from the group consisting of triazole, thiol, thiaziazole, thiazole, and thiuram
(e7) organic compound containing N atom, being one or more compounds selected from the group consisting of hydrazide compound, pyrazole compound, triazole compound, tetrazole compound, thiaziazole compound, and pyridazine compound.

[11] The surface-treated steel sheet with excellent corrosion resistance according to any of [1] through [10], wherein the coating composition for top coating further contains a curing agent having a group which crosslinks with hydroxyl group, at amounts ranging from 1 to 50 parts by mass of solid matter therein to 100 parts by mass of the solid matter in the (E) high molecular weight epoxy group-containing resin.

[12] The surface-treated steel sheet with excellent corrosion resistance according to [11], wherein the curing agent having a group crosslinking with hydroxyl group is an (F) amino resin which has one or more imino groups as an average within a single molecule thereof.

[13] The surface-treated steel sheet with excellent corrosion resistance according to [11], wherein the curing agent having a group crosslinking with hydroxyl group is a (G) polyisocyanate compound which has four or more isocyanate groups as an average within a single molecule thereof.

[14] The surface-treated steel sheet with excellent corrosion resistance according to [13], wherein the (G) polyisocyanate compound is the one in which at least some of the isocyanate groups in the polyisocyanate compound are blocked by a blocking agent.

[15] The surface-treated steel sheet with excellent corrosion resistance according to any of [1] through [14], wherein the (E) high molecular weight epoxy group-containing resin in the coating composition for top coating is a modified epoxy group-containing resin which is modified by an (H) active hydrogen-containing compound in which a part or entire of the compound is structured by an (I) hydrazine derivative having active hydrogen.

[16] The surface-treated steel sheet with excellent corrosion resistance according to any of [1] through [15], wherein the coating composition for top coating further contains a solid lubricant at amounts ranging from 1 to 30 parts by mass of solid matter therein to 100 parts by mass of the resin solid matter in the coating composition.

[17] A method for manufacturing surface-treated steel sheet with excellent corrosion resistance, which method has the steps of: applying a surface treatment coating composition which contains ingredients (a) through (c) described below onto a surface of a zinc-based plated steel sheet or an aluminum-based plated steel sheet, and then drying the applied surface treatment coating composition at ultimate sheet temperatures ranging from 30° C. to 150° C., thus forming a surface-treatment coating having coating thicknesses ranging from 0.01 to 1.0 μm; and forming a top coating having coating thicknesses ranging from 0.3 to 2.0 μm on the surface-treatment coating by applying a coating composition for top coating containing an (E) high molecular weight epoxy group-containing resin having number average molecular weights ranging from 6000 to 20000, and then by drying the applied coating composition for top coating at ultimate sheet temperatures ranging from 30° C. to 150° C.:

(a) a water-epoxy resin dispersion which is prepared by dispersing in water a resin obtained by a reaction of: an (A) polyalkyleneglycol-modified epoxy resin derived from a reaction of polyalkyleneglycol having number average molecular weights ranging from 400 to 20000, a bisphenol type epoxy resin, an active hydrogen-containing compound, and a polyisocyanate compound; a (B) epoxy group-containing resin other than the (A) polyalkyleneglycol-modified epoxy resin; and an active hydrogen-containing compound in which a part or entire of the compound is structured by a (C) hydrazine derivative having active hydrogen;

(b) a silane coupling agent at amounts ranging from 1 to 300 parts by mass of solid matter therein to 100 parts by mass of the resin solid matter in the water-epoxy resin dispersion; and (c) phosphoric acid and/or a hexafluorometal acid at amounts ranging from 0.1 to 80 parts by mass of solid matter thereof to 100 parts by mass of the resin solid matter in the water-epoxy resin dispersion.

[18] A method for manufacturing surface-treated steel sheet with excellent corrosion resistance, which method has the steps of: applying a surface treatment coating composition which contains ingredients (α) through (δ) described below onto a surface of a zinc-based plated steel sheet or an aluminum-based plated steel sheet, and then drying the applied surface treatment coating composition at ultimate sheet temperatures ranging from 30° C. to 150° C., thus forming a surface-treatment coating having coating thicknesses ranging from 0.01 to 1.0 μm; and forming a top coating having coating thicknesses ranging from 0.3 to 2.0 μm on the surface treatment coating by applying a coating composition for top coating containing an (E) high molecular weight epoxy group-containing resin having number average molecular weights ranging from 6000 to 20000, and then by drying the applied coating composition for top coating at ultimate sheet temperatures ranging from 30° C. to 150° C.:

(α) a water-epoxy resin dispersion which is prepared by dispersing in water a (Z) modified epoxy resin obtained by a reaction of a (W) epoxy group-containing resin, an (X) primary amine compound and/or secondary amine compound, and an active hydrogen-containing compound in which a part or entire of the compound is structured by a (Y) hydrazine derivative having active hydrogen;

(β) a water dispersed polyurethane resine at amounts of mass ratio of the resin solid matter in the water-epoxy resin dispersion to the resin solid matter in the water dispersed polyurethane resine, [water-epoxy resin dispersion]/[water dispersed polyurethane resine], ranging from 95/5 to 5/95;

(γ) a silane coupling agent at amounts ranging from 1 to 300 parts by mass of solid matter therein to 100 parts by mass of the resin solid matter in the water-epoxy resin dispersion; and (δ) phosphoric acid and/or a hexafluorometal acid at amounts ranging from 0.1 to 80 parts by mass of solid matter therein to 100 parts by mass of the resin solid matter in the water-epoxy resin dispersion.

The surface-treated steel sheet according to the present invention has extremely high corrosion resistance of sheet before and after working without containing chromium in the coating, and has excellent weldability and coatability. Therefore, the surface-treated steel sheet according to the present invention is particularly useful for automobile.

The following is the detail of the present invention and the reasons to specify the scope of the present invention.

Applicable zinc-based plated steel sheet as the base of the surface-treated steel sheet according to the present invention include zinc plated steel sheet, Zn—Ni alloy plated steel sheet, Zn—Fe alloy plated steel sheet (electroplating steel sheet, alloyed hot-dip galvanized steel sheet), Zn—Cr alloy plated steel sheet, Zn—Mn alloy plated steel sheet, Zn—Co alloy plated steel sheet, Zn—Co—Cr alloy plated steel sheet, Zn—Cr—Ni alloy plated steel sheet, Zn—Cr—Fe alloy plated steel sheet, Zn—Al alloy plated steel sheet (for example, Zn-5% Al alloy plated steel sheet and Zn-55% Al alloy plated steel sheet) Zn—Mg alloy plated steel sheet, Zn—Al—Mg alloy plated steel sheet (for example, Zn-6% Al-3% Mg alloy plated steel sheet and Zn-11% Al-3% Mg alloy plated steel sheet) and zinc-based composite plated steel sheet prepared by dispersing a metal oxide, a polymer, and the like into the plated coating of these plated steel sheets, (for example, Zn—SiO$_2$ dispersed plated steel sheet).

As of these plated steel sheets, two or more layers of plating with the same kind or different kinds thereof, or a multilayered plated steel sheet, may be applied.

As the aluminum-based plated steel sheet as the base of the surface-treated steel sheet according to the present invention, aluminum plated steel sheet, Al—Si alloy plated steel sheet, and the like are applicable.

The plated steel sheet may be the one prepared by applying a small coating weight of Ni or the like onto the surface of the steel sheet, in advance, followed by coating the above-given plating thereon.

Applicable plating method may be any of adoptable ones including electroplating method (electrolysis in an aqueous solution or in a non-aqueous solvent), hot-dip plating method, and chemical vapor deposition method.

To prevent blackening of plating, trace elements of Ni, Co, and Fe may be precipitated in the plated coating to approximate amounts ranging from 1 to 2000 ppm, or a surface-preparation treatment may be given by an alkaline aqueous solution or an acidic aqueous solution containing Ni, Co, and Fe onto the surface of plated coating, thereby precipitating these elements.

The following is the description about the surface-treatment coating which is formed as the primary coating on the surface of the zinc-based plated steel sheet or the aluminum-based plated steel sheet, and about the surface treatment coating composition for forming the coating.

For the surface-treated steel sheet according to the present invention, the surface-treatment coating as the first configuration formed on the surface of the zinc-based plated steel sheet or the aluminum-based plated steel sheet is a surface-treatment coating which is formed by applying and drying the surface treatment coating composition containing the following ingredients (a) through (c). The surface-treatment coating does not contain chromium.

(a) A water-epoxy resin dispersion which is prepared by dispersing in water a resin obtained by a reaction of: an (A) polyalkyleneglycol-modified epoxy resin derived from a reaction of polyalkyleneglycol having number average molecular weights ranging from 400 to 20000, a bisphenol type epoxy resin, an active hydrogen-containing compound, and a polyisocyanate compound; a (B) epoxy group-containing resin other than the (A) polyalkyleneglycol-modified epoxy resin; and an active hydrogen-containing compound structured by a (C) hydrazine derivative having active hydrogen; and further at need a (D) active hydrogen-containing compound other than the (C) hydrazine derivative.

(b) A silane coupling agent at amounts ranging from 1 to 300 parts by mass of solid matter therein to 100 parts by mass of the resin solid matter in the water-epoxy resin dispersion.

(c) Phosphoric acid and/or a hexafluorometal acid at amounts ranging from 0.1 to 80 parts by mass of solid matter therein to 100 parts by mass of the resin solid matter in the water-epoxy resin dispersion.

The description begins from the water-epoxy resin dispersion as the ingredient (a).

The water-epoxy resin dispersion is obtained by dispersing in water a resin which is prepared by a reaction of: an (A) specified polyalkyleneglycol-modified epoxy resin; a (B) epoxy group-containing resin other than the (A) polyalkyleneglycol-modified epoxy resin; and a (C) hydrazine derivative having active hydrogen; and further at need a (D) active hydrogen-containing compound other than the (C) hydrazine derivative.

The (A) polyalkyleneglycol-modified epoxy resin is obtained by a reaction of polyalkyleneglycol having number average molecular weights ranging from 400 to 20000, a bisphenol type epoxy resin, an active hydrogen-containing compound, and a polyisocyanate compound.

Applicable polyalkyleneglycol includes polyethyleneglycol, polypropyleneglycol, and polybutyleneglycol. As of these, polyethyleneglycol is particularly preferred. A suitable range of the number average molecular weight of the polyalkyleneglycol is from 400 to 20000, preferably from 500 to 10000, in view of water-dispersibility and shelf life of the obtained resin.

The bisphenol type epoxy resin is a bisphenol-based compound having at least one epoxy group in a single molecule thereof, and a diglycidylether of bisphenol obtained by the condensation reaction of a bisphenol-based compound with an epihalohydrin (for example, epichlorohydrin) is particularly preferable in view of easily attaining a coating having excellent elasticity and corrosion prevention.

Typical examples of the bisphenol-based compound applicable for preparing the bisphenol type epoxy resin are, bis(4-hydroxyphenyl)-2,2-propane, bis(4-hydroxyphenyl)-1,1-ethane, bis(4-hydroxyphenyl)-methane, 4,4'-dihydroxydiphenylether, 4,4'-dihydroxydiphenylsulfone, bis(4-hydroxyphenyl)-1,1-isobutane, and bis(4-hydroxy-3-t-butylphenyl)-2,2-propane. As of epoxy resins prepared using those bisphenol-based compounds, bisphenol-A type epoxy resin is particularly preferable from the point to attain a coating having excellent elasticity and corrosion preventive performance.

From the viewpoint of production stability and other characteristics during the manufacture of polyalkyleneglycol-modified epoxy resin, generally the bisphenol type epoxy resin preferably has the number average molecular weight in an approximate range from 310 to 10000, and more preferably from about 320 to about 2000, and has the epoxy equivalent in a range from about 155 to about 5000, more preferably from about 160 to about 1000.

The active hydrogen-containing compound is used for blocking the isocyanate group in the (A) polyalkyleneglycol-modified epoxy resin. Typical examples of the active hydrogen-containing compound are: monohydric alcohol such as methanol, ethanol, and diethyleneglycol monobutylether; monohydric carboxylic acid such as acetic acid and propyonic acid; and monohydric thiol such as ethylmercaptan. Other blocking agent (active hydrogen-containing compound) includes: a secondary amine such as diethylamine; a compound prepared by modifying a primary amino group in an amine compound such as diethylenetriamine and monoethanolamine, which amine compound contains one secondary amino group or hydroxyl group and one or more primary amino groups, into aldimine, ketimine, oxazoline, or imidazoline by a heating-reaction with ketone, aldehyde, or carboxylic acid at temperatures of, for example, 100° C. to 230° C.; an oxime such as methylethylketoxime; and a phenol series such as phenol and nonylphenol. Generally these compounds preferably have the number average molecular weights ranging from 30 to 2000, more preferably from 30 to 200.

The polyisocyanate compound is a compound having two or more isocyanate groups, preferably two or three isocyanate groups, in a single molecule thereof. The polyisocyanate compounds which are generally used for manufacturing polyurethane resin are also applicable. Those kinds of polyisocyanate compounds include the ones of aliphatic, alicyclic, and aromatic. Typical examples of these polyisocyanate compounds are: aliphatic polyisocyanate compound such as hexamethylene diisocyanate (HMDI), biuret compound of HMDI, and isocyanulate compound of HMDI; alicyclic polyisocyanate compound such as isophorone diisocyanate (IPDI) and biuret compound of IPDI, isocyanulate compound of IPDI, hydrogenated xylylene diisocyanate, and hydrogenated 4,4'-diphenylmethane diisocyanate; and aromatic polyisocyanate compound such as tolylene diisocyanate and xylylene diisocyanate.

Generally, the blending rate of individual ingredients for manufacturing the (A) polyalkyleneglycol-modified epoxy resin is preferably in a range given below.

That is, a preferable equivalent ratio of the hydroxyl group of polyalkyleneglycol to the isocyanate group of polyisocyanate compound is from 1/1.2 to 1/10, more preferably from 1/1.5 to 1/5, and most preferably from 1/1.5 to 1/3. A preferable equivalent ratio of the hydroxyl group of active hydrogen-containing compound to the isocyanate group of polyisocyanate compound is from 1/2 to 1/100, more preferably from 1/3 to 1/50, and most preferably from 1/3 to 1/20. A preferable equivalent ratio of the sum of the hydroxyl groups of polyalkyleneglycol, bisphenol type epoxy resin, and active hydrogen-containing compound to the isocyanate group of polyisocyanate compound is 1/1.5 or smaller, more preferably from 1/0.1 to 1/1.5, and most preferably from 1/0.1 to 1/1.1.

The reaction of the polyalkyleneglycol, the bisphenol type epoxy resin, the active hydrogen-containing compound, and the polyisocyanate compound may be carried out by a known method.

By the reaction of above-prepared (A) polyalkyleneglycol-modified epoxy resin, (B) epoxy group-containing resin other than the (A) polyalkyleneglycol-modified epoxy resin, (C)

hydrazine derivative having active hydrogen, and further at need (D) active hydrogen-containing compound other than the (C) hydrazine derivative, an epoxy resin which is readily dispersed in water and which gives favorable adhesion to base material is attained.

Examples of the (B) epoxy group-containing resin other than the (A) polyalkyleneglycol-modified epoxy resin are: an aromatic epoxy resin which is prepared by introducing glycidyl group through the reaction of polyphenol such as bisphenol-A, bisphenol-F, and novolak type phenol with epihalohydrin such as epichlorohydrin, or by a further reaction of that glycidyl group-introduced reaction product with a polyphenol to increase the molecular weight; aliphatic epoxy resin; and alicyclic epoxy resin. These epoxy resins may be used separately or in combination of two or more of them. If the coating formability at low temperatures is required, these epoxy resins preferably have the number average molecular weights of 1500 or more.

An example of the (B) epoxy group-containing resin is a resin which is prepared by a reaction of epoxy group or hydroxyl group in the epoxy group-containing resin with various modification agents. Examples of the (B) epoxy group-containing resin are: an epoxy-ester resin prepared by a reaction with dry oil fatty acid; an epoxy-acrylate resin prepared by modification using a polymerizable unsaturated monomer ingredient containing acrylic acid, methacrylic acid, and the like; and an urethane-modified epoxy resin prepared by a reaction with an isocyanate compound.

Further example of the (B) epoxy group-containing resin is an acrylic-based copolymer resin, prepared by copolymerizing with an epoxy group-containing monomer. The acrylic-based copolymer is synthesized from an unsaturated monomer having epoxy group with a polymerizable unsaturated monomer ingredient which essentially contains an acrylic acid ester or a methacrylic acid ester, by solution polymerization, emulsion polymerization, suspension polymerization, and the like. Examples of the polymerizable unsaturated monomer ingredient are: C1-C4 alkyl ester of acrylic acid or methacrylic acid, such as methyl(meth)acrylate, ethyl(meth)acrylate, propyl(meth)acrylate, n-, iso-, or ter-butyl(meth) acrylate, hexyl(meth)acrylate, 2-ethylhexyl(meth)acrylate, decyl(meth)acrylate, and lauryl(meth)acrylate; acrylic acid, methacrylic acid, styrene, vinyl toluene, acrylamide, acrylonitrile, N-methylol(meth)acrylamide, and C1-C4 alkyletherified compound of N-methylol(meth)acrylamide; and N,N-diethylaminoethylmethacrylate. The unsaturated monomer having epoxy group is not specifically limited if only the monomer has an epoxy group and a polymerizable unsaturated group, such as glycidylmethacrylate, glycidylacrylate, and 3,4-epoxycyclohexyl-1-methy(meth)acrylate.

The acrylic-based copolymer resin may further be modified by polyester resin, epoxy resin, phenol resin, and the like.

A specifically preferred (B) epoxy group-containing resin is a product of reaction between bisphenol-A and epihalohydrin, which reaction product is a resin expressed by the following chemical formula. The reaction product is particularly preferred owing to the excellent corrosion resistance.

In the chemical formula, q is integers from 0 to 50, preferably from 1 to 40, and more preferably from 2 to 20.

That kind of bisphenol-A type epoxy resin can be manufactured by a method widely known in the industry concerned.

Examples of the active hydrogen-containing compound which reacts with the (B) epoxy group-containing resin are the following.

Hydrazine derivative having active hydrogen
Primary or secondary amine compound having active hydrogen
   Organic acid such as ammonia and carboxylic acid
   Hydrogen halide such as hydrogen chloride
   Alcohol, thiol
Hydrazine derivative having no active hydrogen or a quaternization agent as a mixture with tertiary amine with an acid.

For preparing the water-epoxy resin dispersion, one or more of above compounds may be used. To attain excellent corrosion resistance, however, at least a part (preferably entire) of the active hydrogen-containing compound has to be a hydrazine derivative having active hydrogen. That is, as of these compounds, the (C) hydrazine derivative having active hydrogen is the essential ingredient, while using the (D) active hydrogen-containing compound other than the (C) hydrazine derivative, at need.

Examples of typical amine compound having active hydrogen, above described, are the following.

(1) A compound prepared by the heating reaction of a primary amino group in an amine compound which contains one secondary amino group and one or more primary amino groups, such as diethylene triamine, hydroxyethylaminoethylamine, ethylaminoethylamine, and methylaminopropylamine, with ketone, aldehyde, or carboxylic acid, at, for example, approximate temperatures ranging from 100° C. to 230° C., thus modifying into aldimine, ketimine, oxazoline, or imidazoline.

(2) A secondary monoamine such as diethylamine, diethanolamine, di-n- or -iso-propanolamine, N-methylethanolamine, and N-ethylethanolamine.

(3) A secondary amine-containing compound prepared by the addition of a monoalkanol amine such as monoethanolamine to dialkyl(meth)acrylamide by Michael addition reaction.

(4) A compound prepared by modifying a primary amine group of alkanolamine such as monoethanolamine, neopentanolamine, 2-aminopropanol, 3-aminopropanol, and 2-hydroxy-2'(aminopropoxy)ethylether into ketimine.

Regarding the quaternization agent applicable as a part of the active hydrogen-containing compound, since the hydrazine derivative having no active hydrogen or the tertiary amine has no reactivity with epoxy group, the respective mixtures with an acid are prepared to make them reactive with epoxy group. The quaternization agent reacts with epoxy group in the presence of, at need, water, thereby forming a quaternary salt, with the epoxy group-containing resin. The acid used to obtain the quaternization agent may be any of organic acid such as acetic acid and lactic acid or inorganic

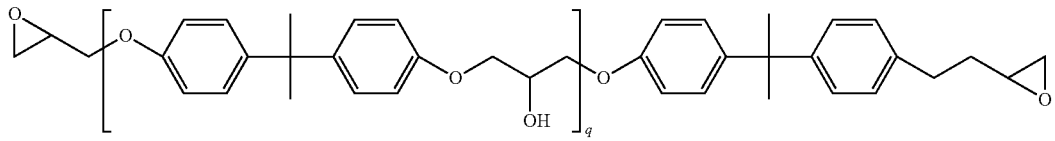

acid such as hydrochloric acid. The hydrazine derivative having no active hydrogen, which is used to obtain the quaternization agent, may be 3,6-dichloropyridazine. The tertiary amine may be dimethylethanolamine, triethylamine, trimethylamine, triisopropylamine, and methyldiethanolamine.

As of these active hydrogen-containing compounds, a hydrazine derivative having active hydrogen is most useful and gives highest corrosion resistance.

Examples of the hydrazine derivative having active hydrogen are the following.

(a) A hydrazide compound such as carbohydrazide, hydrazide propionate, hydrazide salicylate, dihydrazide adipate, dihydrazide sebacylate, dihydrazide dodecanate, dihydrazide isophthalate, thiocarbohydrazide, 4,4'-oxybisbenzenesulfonyl hydrazide, benzophenone hydrazone, and aminopolyacrylamide.

(b) A pyrazole compound such as pyrazole, 3,5-dimethylpyrazole, 3-methyl-5-pyrazolone, and 3-amino-5-methylpyrazole.

(c) A triazole compound such as 1,2,4-triazole, 3-amino-1,2,4-triazole, 4-amino-1,2,4-triazole, 3-mercapto-1,2,4-triazole, 5-amino-3-mercapto-1,2,4-triazole, 2,3-dihydro-3-oxo-1,2,4-triazole, 1H-benzotriazole, 1-hydroxybenzotriazole(monohydrate), 6-methyl-8-hydroxytriazolopyridazine, 6-phenyl-8-hydroxytriazolopyridazine, and 5-hydroxy-7-methyl-1,3,8-triazaindolizine.

(d) A tetrazole compound such as 5-phenyl-1,2,3,4-tetrazole, and 5-mercapto-1-phenyl-1,2,3,4-tetrazole.

(e) A thiadiazole compound such as 5-amino-2-mercapto-1,3,4-thiadiazole, and 2,5-dimercapto-1,3,4-thiaziazole.

(f) A pyridazine compound such as hydrazide maleate, 6-methyl-3-pyridazone, 4,5-dichloro-3-pyridazone, 4,5-dibromo-3-pyridazone, and 6-methyl-4,5-dihydro-3-pyridazone.

As of these compounds, particularly preferred ones are pyrazole compound and triazole compound having a ring structure of five membered ring or six membered ring, and having nitrogen atom in the ring structure.

These hydrazine derivatives may be used separately or in combination of two or more of them.

The above water-epoxy resin dispersion can be obtained by the reaction of above-described (A) polyalkyleneglycol-modified epoxy resin, the (B) epoxy group-containing resin other than the (A) polyalkyleneglycol-modified epoxy resin, the (C) hydrazine derivative having active hydrogen, and further, at need, the (D) active hydrogen-containing compound other than the (C) hydrazine derivative, at temperatures ranging preferably from 10° C. to 300° C., more preferably from 50° C. to 150° C., for about 1 to about 8 hours, followed by dispersing the prepared resin in water.

The above reaction may be conducted adding an organic solvent. The organic solvent is not specifically limited. Examples of the solvent are: ketone such as acetone, methylethylketone, methylisobutylketone, dibutylketone, and cyclohexanone; alcohol or ether having hydroxyl group, such as ethanol, butanol, 2-ethylhexylalcohol, benzylalcohol, ethyleneglycol, ethyleneglycol monoisopropylether, ethyleneglycol monobutylether, ethyleneglycol monohexylether, propyleneglycol, propyleneglycol monomethylether, diethyleneglycol, diethyleneglycol monoethylether, and diethylene glycol monobutylether; ester such as ethylacetate, butylacetate, and ethyleneglycol monobutyletheracetate; aromatic hydrocarbon such as toluene and xylene. One or more of them can be used. As of these solvents, ketone or ether solvent is particularly preferred in view of solubility of epoxy resin and of coating-formability.

From the point of corrosion resistance and water-dispersibility of resin, the blending rate of the (A) polyalkyleneglycol-modified epoxy resin, the (B) epoxy group-containing resin other than the (A) polyalkyleneglycol-modified epoxy resin, and the (C) hydrazine derivative having active hydrogen is preferably adjusted so as the equivalent ratio of the epoxy group in the (A) polyalkyleneglycol-modified epoxy resin and the (B) epoxy group-containing resin to the active hydrogen group in the (C) hydrazine derivative to become in a range from 0.01 to 10, more preferably 0.1 to 8, and most preferably from 0.2 to 4.

Some of the (C) hydrazine derivatives having active hydrogen may be substituted with the (D) active hydrogen-containing compound. From the point of corrosion prevention and adhesion, however, the substituting quantity (or the percentage of the (D) active hydrogen-containing compound in the active hydrogen-containing compounds including the (C) hydrazine derivative) is preferably 90% by mole or less, more preferably 70% by mole or less, and most preferably in a range from 10 to 60% by mole.

To form a dense barrier coating, it is preferable to add a curing agent to the resin composition to heat and cure the coating. Preferred curing methods to form a coating of resin composition are (1) curing method utilizing an urethanation reaction between isocyanate and hydroxyl group in the base resin, and (2) curing method utilizing an etherification reaction between hydroxyl group in the base resin and alkyl-etherified amino resin which is prepared by a reaction between C1-C5 monohydric alcohol and a part or entire of a methylol compound obtained by a reaction between formaldehyde and one or more of melamine, urea, and benzoguanamine. As of these methods, it is particularly preferred to adopt the urethanation reaction between the isocyanate and the hydroxyl group in the base resin as the main reaction.

The polyisocyanate compound as the curing agent applicable to the (1) curing method is a compound which is prepared by a partial reaction of aliphatic, alicyclic (including polycyclic) or aromatic isocyanate compound having at least two isocyanate groups in a single molecule thereof, or a compound of them, with a polyhydric alcohol. Examples of that type of polyisocyanate compound are the following.

(A) m- or p-phenylenediisocyanate, 2,4- or 2,6-tolylenediisocyanate, o- or p-xylylenediisocyanate, hexamethylenediisocyanate, dimer acid diisocyanate, and isophoronediisocyanate.

(B) A reaction product compound obtained by a reaction of sole compound of or a mixture of the (A) compounds with a polyhydric alcohol (dihydric alcohol such as ethyleneglycol and propyleneglycol, trihydric alcohol such as glycerin and trimethylolpropane, tetrahydric alcohol such as pentaerythritol, and hexahydric alcohol such as sorbitol and dipentaerythritol) and having at least two isocyanate left in a single molecule thereof.

These polyisocyanate compounds may be used separately or in combination of two or more of them.

Examples of applicable protective agent (blocking agent) for the polyisocyanate compound are the following.

(i) An aliphatic monoalcohol such as methanol, ethanol, propanol, butanol, and octylalcohol.

(ii) A monoether of ethyleneglycol and/or diethyleneglycol, such as a monoether of methyl, ethyl, propyl (n-, iso), and butyl (n-, iso, sec).

(iii) An aromatic alcohol such as phenol and cresol.

(iv) An oxime such as acetoxime and methylethylketone oxime.

The reaction of one or more of these blocking agents with the polyisocyanate compound provides a polyisocyanate compound which is stably protected at least at normal temperature.

A preferred blending rate of the polyisocyanate compound (a2) in the water-epoxy resin dispersion (a), (above-described ingredient (a)), is, as the curing agent, in a range of (a)/(a2) from 95/5 to 55/45 (mass ratio of nonvolatile matter), and more preferably (a)/(a2) from 90/10 to 65/35. Since polyisocyanate compound is a hygroscopic material, the mixing ratio (a)/(a2) above 55/45 deteriorates the adhesion of the surface-treatment coating. Furthermore, excess ratio enhances the migration of unreacted polyisocyanate compound into the top coating, which induces curing inhibition and insufficient adhesion of the top coating. Accordingly, the mixing ratio of polyisocyanate compound (a2), (a)/(a2), is preferably 55/45 or smaller.

By the addition of above-described crosslinking agent (curing agent), the water-dispersible resin is fully crosslinked. For further increasing the crosslinking performance at low temperatures, however, it is preferred to use a known curing acceleration catalyst. Examples of the curing acceleration catalyst are N-ethylmorphorine, dibutyltin dilaurate, cobalt naphthenate, tin(II)chloride, zinc naphthenate, and bismuth nitrate.

Aiming at the improvement of physical properties such as adhesion, to some extent, a known resin such as acrylic, alkyd, and polyester resins can be used blending with the (B) epoxy group-containing resin.

To disperse in water the reaction product of the (A) polyalkyleneglycol-modified epoxy resin, the (B) epoxy group-containing resin, and the (C) hydrazine derivative having active hydrogen, (and further, at need, the (D) active hydrogen-containing compound), following-given methods, for example, can be adopted.

(1) A method of conducting reaction between the epoxy group in the epoxy group-containing resin, (the resin (A) and the resin (B)), and a dibasic acid, a secondary amine, or the like as the active hydrogen-containing compound, and by neutralizing the reaction product by a tertiary amine, acetic acid, phosphoric acid, and the like as the neutralizing agent, followed by dispersing the product in water.

(2) A method of dispersing the reaction product in water using a modified epoxy resin as the dispersing agent which is prepared by a reaction of epoxy resin and polyalkylene oxide containing terminal hydroxyl group, such as polyethyleneglycol and polypropyleneglycol, with isocyanate.

(3) A method of combining (1) with (2).

The surface treatment coating composition may use a water-dispersible resin and/or a water-soluble resin, other than the above-specified water-dispersible resins, such as one or more of acrylic resin, urethane resin, polyester resin, epoxy resin, ethylene resin, alkyd resin, phenol resin, and olefin resin, at an upper limit of approximately 15% by mass to the total resin solid matter.

The following is the description about the silane coupling agent as the above ingredient (b).

Examples of the silane coupling agent are vinylmethoxysilane, vinylethoxysilane, vinyltrichlorosilane, vinyltrimethoxysilane, vinyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-β(aminoethyl) γ-aminopropylmethyldimethoxysilane, N-β(aminoethyl) γ-aminopropyltrimethoxysilane, N-β(aminoethyl) γ-aminopropylmethoxysilane, γ-aminopropyltrimethoxysilane, γ-aminopropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, γ-mercaptopropylmethyldimethoxysilane, γ-mercaptopropyltrimethoxysilane, p-styryltrimethoxysilane, γ-acryloxypropyltrimethoxysilane, N-phenyl-γ-aminopropyltrimethoxysilane, γ-ureidopropyltriethoxysilane, γ-chloropropyltrimethoxysilane, bis(triethoxysilylpropyl)tetrasulfide, γ-isocyanatepropyltriethoxysilane, γ-triethoxysilyl-N-(1,3-dimethyl-butylidene)propylamine, and N-(vinylbenzilamine)-β-aminoethyl-γ-aminopropyltrimethoxysilane. These compounds may be used separately or in combination of two or more of them.

According to the present invention, the improvement of white rust resistance owing to the existence of silane coupling agent as well as the specified acid ingredient in the surface treatment coating composition is attained presumably by the reason described before.

As of these silane coupling agents, the one having amino group as the reactive functional group is particularly preferable from the point of containing a functional group having high reactivity with the water-dispersible resin of the above ingredient (a). Examples of that type of silane coupling agent are N-β(aminoethyl) γ-aminopropylmethyldimethoxysilane, N-β(aminoethyl) γ-aminopropyltrimethoxysilane, N-β(aminoethyl) γ-aminopropyltrimethoxysilane, γ-aminopropyltrimethoxysilane, and γ-aminopropyltriethoxysilane. Specifically, there are applicable KBM-903, KBE-903, KBM-603, KBE-602, and KBE-603, (trade names; manufactured by Shin-Etsu Chemical Co., Ltd.)

The blending quantity of silane coupling agent is in a range from 1 to 300 parts by mass as solid matter to 100 parts by mass of the resin solid matter in the water-epoxy resin dispersion as the above ingredient (a), preferably from 5 to 100 parts by mass, and more preferably from 15 to 50 parts by mass. If the blending quantity of silane coupling agent is smaller than 1 part by mass, the corrosion resistance is deteriorated. If the blending quantity of silane coupling agent exceeds 300 parts by mass, satisfactory coating cannot be formed, which fails to attain the effect of improving the adhesion and the barrier performance to the water-dispersible resin, thereby deteriorating the corrosion resistance.

The phosphoric acid and/or the hexafluorometal acid as the above ingredient (c) has a function to activate the plated metal surface by acting onto the inactive plated metal surface. The phosphoric acid and the hexafluorometal acid may be used separately or in combination of them.

Although the kind of hexafluorometal acid is not specifically limited, a preferable one is a hexafluorometal acid which contains one or more elements selected from the group consisting of Ti, Si, and Zr, such as fluorotitanic acid, fluorozirconic acid, and hydrofluorosilicic acid, and one or more of them can be used.

The blending quantity of the phosphoric acid and/or the hexafluorometal acid is in a range from 0.1 to 80 parts by mass as solid matter to 100 parts by mass of the resin solid matter in the water-epoxy resin dispersion as the above ingredient (a), preferably from 1 to 60 parts by mass, and more preferably from 5 to 50 parts by mass. If the blending quantity of the phosphoric acid and/or the hexafluorometal acid is smaller than 0.1 parts by mass, the corrosion resistance is deteriorated, and if the blending quantity thereof exceeds 80 parts by mass, the soluble ingredient in the coating increases to deteriorate the corrosion resistance, both of which cases are not preferable.

In the surface-treated steel sheet according to the present invention, the surface-treatment coating in the second configuration, formed on the surface of zinc-based plated steel sheet or aluminum-based plated steel sheet, is a surface-treatment coating which is formed by applying the surface treatment coating composition containing the following ingredients (α) through (δ), and by drying the coating. The surface-treatment coating does not contain chromium.

(α) A water-epoxy resin dispersion which is prepared by dispersing in water a (Z) modified epoxy resin obtained by a reaction of a (W) epoxy group-containing resin, an (X) primary amine compound and/or secondary amine compound, and an active hydrogen-containing compound in which a part or entire of the compound is structured by a (Y) hydrazine derivative having active hydrogen.

(β) A water dispersed polyurethane resine at amounts of mass ratio of the resin solid matter in the water-epoxy resin dispersion to the resin solid matter in the water dispersed polyurethane resine, [water-epoxy resin dispersion]/[water dispersed polyurethane resine], ranging from 95/5 to 5/95.

(γ) A silane coupling agent at amounts ranging from 1 to 300 parts by mass of solid matter therein to 100 parts by mass of the resin solid matter in the water-epoxy resin dispersion.

(δ) Phosphoric acid and/or a hexafluorometal acid at amounts ranging from 0.1 to 80 parts by mass of solid matter therein to 100 parts by mass of the resin solid matter in the water-epoxy resin dispersion.

First, the description is given about the water-epoxy resin dispersion as the ingredient (α).

The epoxy group-containing resin as the ingredient (W) is a resin containing one or more epoxy groups in the molecule thereof. Examples of that type of epoxy group-containing resin are epoxy resin, modified epoxy resin, acrylic-based copolymer resin prepared by copolymerizing epoxy group-containing monomer with other monomer, polybutadiene resin having epoxy group, polyurethane resin having epoxy group, and an additive or a condensate of these resins. These resins may be used separately or in combination of two or more of them.

Examples of these epoxy resins are: an aromatic epoxy resin prepared by introducing glycidyl group through a reaction of polyphenol such as bisphenol-A, bisphenol-F, and novolak type phenol with epihalohydrin such as epichlorohydrin, or by a further reaction of that glycidyl group-introduced reaction product with a polyphenol to increase the molecular weight; an aliphatic epoxy resin; an aliphatic epoxy resin; and an alicyclic epoxy resin. These epoxy resins may be used separately or in combination of two or more of them. If the coating formability at low temperatures is required, these epoxy resins preferably have the number average molecular weights of 1500 or more.

An example of the modified epoxy resin is a resin which is prepared by a reaction of epoxy group or hydroxyl group in the above epoxy resin with various modification agents. Examples of the modified epoxy resin are: an epoxy-ester resin prepared by a reaction with dry oil fatty acid; an epoxy-acrylate resin prepared by modification using a polymerizable unsaturated monomer ingredient containing acrylic acid, methacrylic acid, or the like; and an urethane-modified epoxy resin prepared by a reaction with an isocyanate compound.

An example of the acrylic-based copolymer resin is a resin which is synthesized from an unsaturated monomer having epoxy group with a polymerizable unsaturated monomer ingredient which essentially contains an acrylic acid ester or a methacrylic acid ester, by solution polymerization, emulsion polymerization, suspension polymerization, and the like. Examples of the polymerizable unsaturated monomer ingredient are: C1-C24 alkyl ester of acrylic acid or methacrylic acid, such as methyl(meth)acrylate, ethyl(meth)acrylate, propyl(meth)acrylate, n-, iso-, or ter-butyl(meth)acrylate, hexyl(meth)acrylate, 2-ethylhexyl(meth)acrylate, decyl(meth)acrylate, and lauryl(meth)acrylate; acrylic acid, methacrylic acid, styrene, vinyl toluene, acrylamide, acrylonitrile, N-methylol(meth)acrylamide, N-methylol(meth)acrylamide, C1-C4 alkyletherified compound of N-methylol(meth)acrylamide, and N,N-diethylaminoethyl methacrylate.

The unsaturated monomer having epoxy group is not specifically limited if only the monomer has an epoxy group and a polymerizable unsaturated group, such as glycidylmethacrylate, glycidylacrylate, and 3,4-epoxycyclohexyl-1-methy(meth)acrylate.

The acrylic-based copolymer resin may further be modified by polyester resin, epoxy resin, phenol resin, and the like.

A specifically preferred (W) epoxy group-containing resin is a bisphenol-A type resin which is a product of reaction between bisphenol-A and epihalohydrin. The resin can be obtained by a known manufacturing method.

The primary amine compound and/or the secondary amine compound as the ingredient (X) is essential to obtain water-dispersibility of the epoxy group-containing resin.

Examples of the primary amine compound and/or the secondary amine compound are: a primary amine compound such as monoethylamine, mono-n- or iso-propylamine, mono n- or iso-butylamine, monoethanolamine, neopentanolamine, 2-aminopropanol, 3-aminopropanol, and 2-hydroxy-21 (aminopropoxy) ethylether; and a secondary amine compound such as diethylamine, dibutylamine, methylethylamine, diethanolamine, di-n- or -iso-propanoplaime, N-methylethanolamine, and N-ethylethanolamine. These primary or secondary amine compounds may be used separately or in combination of two or more of them. As of these primary or secondary amine compounds, diethanolamine is preferred in view of easiness in reaction, controllability, and water-dispersibility.

The hydrazine derivative having active hydrogen, as the ingredient (Y), is an essential ingredient to provide the coating with excellent corrosion resistance. Examples of the hydrazine derivative having active hydrogen are the following.

(a) A hydrazide compound such as carbohydrazide, hydrazide propionate, hydrazide salicylate, dihydrazide adipate, dihydrazide sebacylate, dihydrazide dodecanate, dihydrazide isophthalate, thiocarbohydrazide, 4,4'-oxybisbenzenesulfonyl hydrazide, benzophenone hydrazone, and aminopolyacrylamide.

(b) A pyrazole compound such as pyrazole, 3,5-dimethylpyrazole, 3-methyl-5-pyrazolone, and 3-amino-5-methylpyrazole.

(c) A triazole compound such as 1,2,4-triazole, 3-amino-1,2,4-triazole, 4-amino-1,2,4-triazole, 3-mercapto-1,2,4-triazole, 5-amino-3-mercapto-1,2,4-triazole, 2,3-dihydro-3-oxo-1,2,4-triazole, 1H-benzotriazole, 1-hydroxybenzotriazole(monohydrate), 6-methyl-8-hydroxytriazolopyridazine, 6-methyl-8-hydroxytriazolopyridazine, and 5-hydroxy-7-methyl-1,3,8-triazaindolizine.

(d) A tetrazole compound such as 5-phenyl-1,2,3,4-tetrazole, and 5-mercapto-1-phenyl-1,2,3,4-tetrazole.

(e) A thiadiazole compound such as 5-amino-2-mercapto-1,3,4-thiadiazole, and 2,5-dimercapto-1,3,4-thiazazole.

(f) A pyridazine compound such as hydrazide maleate, 6-methyl-3-pyridazone, 4,5-dichloro-3-pyridazone, 4,5-dibromo-3-pyridazone, and 6-methyl-4,5-dihydro-3-pyridazone.

As of these compounds, particularly preferred ones from the point of corrosion resistance and other characteristics are pyrazole and triazole compounds having a ring structure of five membered ring or six membered ring, and having nitrogen atom in the ring structure.

These hydrazine derivatives may be used separately or in combination of two or more of them.

Some of the (Y) hydrazine derivatives having active hydrogen may be substituted with an active hydrogen-containing compound other than the hydrazine derivative. That is, according to the present invention, an active hydrogen-containing compound other than the (Y) hydrazine derivative having active hydrogen may be used for some of the active hydrogen-containing compounds.

Examples of the active hydrogen-containing compound other than the (Y) hydrazine derivative are the following.

Organic acid such as ammonia and carboxylic acid

Hydrogen halide such as hydrogen chloride

Alcohol, thiol

Hydrazine derivative having no active hydrogen or a quaternization agent s a mixture of tertiary amine and acid.

Regarding the quaternization agent applicable as a part of the active hydrogen-containing compound, since the hydrazine derivative having no active hydrogen or the tertiary amine has no reactivity with epoxy group, the respective mixtures with an acid are prepared to make them reactive with epoxy group. The quaternization agent reacts with epoxy group in the presence of, at need, water, thereby forming a quaternary salt with the epoxy group-containing resin. The acid used to obtain the quaternization agent may be any of organic acid such as acetic acid and lactic acid or inorganic acid such as hydrochloric acid. The hydrazine derivative having no active hydrogen, which is used to obtain the quaternization agent, may be 3,6-dichloropyridazine. The tertiary amine may be dimethylethanolamine, triethylamine, trimethylamine, triisopropylamine, and methyldiethanolamine.

The percentage of the (Y) hydrazine derivative having active hydrogen in the active hydrogen-containing compound is in a range from 10 to 100% by mole, preferably from 30 to 100% by mole, and most preferably from 40 to 100% by mole. If the percentage of the (Y) hydrazine derivative having active hydrogen is less than 10% by mole, satisfactory rust-preventive function cannot be given to the surface-treatment coating, and the obtained rust-prevention effect is very little different from that in the case of simple mixing of a coating-forming resin with a hydrazine derivative.

To obtain the (Z) modified epoxy resin, generally it is preferable to conduct reaction between the (W) epoxy group-containing resin, the (X) primary amine compound and/or secondary amine compound, and an active hydrogen-containing compound in which a part or entire of the compound is structured by a (Y) hydrazine derivative having active hydrogen at temperatures ranging from 10° C. to 300° C., preferably from 50° C. to 150° C. for about 1 to about 8 hours.

The reaction may be done adding an organic solvent, and the kind of the solvent is not specifically limited. Examples of the solvent are: ketone such as acetone, methylethylketone, methylisobutylketone, dibutylketone, and cyclohexanone; alcohol or ether having hydroxyl group, such as ethanol, butanol, 2-ethylhexylalcohol, benzylalcohol, ethyleneglycol, ethyleneglycol monoisopropylether, ethyleneglycol monobutylether, ethyleneglycol monohexylether, propyleneglycol, propyleneglycol monomethylether, diethyleneglycol, diethyleneglycol monoethylether, and diethyleneglycol monobutylether; ester such as ethylacetate, butylacetate, and ethyleneglycol monobutyletheracetate; and aromatic hydrocarbon such as toluene and xylene. One or more of them can be used. As of these solvents, ketone or ether solvent is particularly preferred in view of solubility of epoxy resin and of coating-formability.

The blending percentage of the (W) epoxy group-containing resin and the (X) primary amine compound and/or secondary amine compound is preferably in a range from 20 to 80% by mole of the (X) amine compound to the epoxy group in the (X) epoxy group-containing resin, more preferably from 30 to 70% by mole, and most preferably from 40 to 60% by mole. From the point of corrosion resistance and water-dispersibility, it is preferable to let the (Y) hydrazine derivative having active hydrogen react by an equivalent quantity to the residual epoxy groups after the reaction. Accordingly, the (Y) hydrazine having active hydrogen is preferably added by percentages ranging from 80 to 20% by mole to the epoxy groups in the (W) epoxy group-containing resin, more preferably from 70 to 30% by mole, and most preferably from 60 to 40% by mole.

An available method to prepare a resin dispersion by dispersing the (Z) modified epoxy resin in water is the neutralization using acetic acid, formic acid, phosphoric acid, and the like, which are the known neutralizing agents to amino group in the (Z) modified epoxy resin, followed by dispersing in water. Although the neutralization equivalent is not specifically limited, it is preferred to select the range thereof from 0.2 to 0.8 equivalent to amino groups, more preferably from 0.3 to 0.7 equivalent, and most preferably from 0.4 to 0.6 equivalent, from the point of property of dispersion and of water resistance.

The water-epoxy resin dispersion according to the present invention can form a coating having good adhesion with metal and the like by applying and drying the water-epoxy resin dispersion. To form a denser barrier coating, however, it is preferable to add a (J) curing agent to the water-epoxy resin dispersion to heat and cure the organic coating. The (J) curing agent may be a polyisocyanate compound and an amino resin compound.

The polyisocyanate compound is a compound having at least two isocyanate groups in a single molecule thereof. Examples of the polyisocyanate compound are: an aliphatic isocyanate compound; an alicyclic isocyanate compound (including polycyclic one); an aromatic isocyanate compound; and a compound which is prepared by partial reaction of these isocyanate compounds by a polyhydric alcohol. Some of or all of the isocyanate groups in these polyisocyanate compounds may be blocked by a blocking agent.

Examples of the polyisocyanate compound are the following.

(a) m- or p-phenylenediisocyanate, 2,4- or 2,6-tolylenediisocyanate, o- or p-xylylenediisocyanate, hexamethylenediisocyanate, dimer acid diisocyanate, and isophoronediisocyanate.

(b) A reaction product compound obtained by a reaction of sole (a) compound or of a mixture of (a) compounds with a polyhydric alcohol (dihydric alcohol such as ethyleneglycol and propyleneglycol, trihydric alcohol such as glycerin and trimethylpropane, tetrahydric alcohol such as pentaerythritol, and hexahydric alcohol such as sorbitol and dipentaerythritol) and having at least two isocyanates left in a single molecule thereof.

These polyisocyanate compounds may be used separately or in combination of two or more of them.

Examples of blocking agent are: (1) aliphatic monoalcohol such as methanol, ethanol, propanol, butanol, and octylalcohol; (2) monoether of ethyleneglycol and/or diethyleneglycol, such as monoether of methyl, ethyl, propyl (n-, iso), butyl (n-, iso, sec); (3) aromatic alcohol such as phenol and cresol; and (4) oxime such as acetoxime and methylethylketone oxime. The reaction of one or more of these blocking agents with the polyisocyanate compound provides a polyisocyanate compound which is stably protected at least at normal temperature.

The amino resin includes a methylolated amino resin which is prepared by a reaction between an aldehyde and an amino ingredient such as melamine, urea, benzoguanamine, acetoguanamine, steroguanamine, spiroguanamine, and dicyandiamide. The aldehyde includes formaldehyde, paraformaldehyde, acetoaldehyde, and benzaldehyde. A compound prepared by etherifying the methylolated amino resin by an appropriate alcohol can also be used. Examples of the alcohol applicable to the etherification are methylalcohol, ethylalcohol, n-propylalcohol, i-propylalcohol, n-butylalcohol, i-butylalcohol, 2-ethylbutanol, and 2-ethylhexanol.

For the amino resin, a methylolated melamine resin prepared by alkyletherifying at least some of the methylol groups is particularly preferable.

The blending ratio of the (Z) modified epoxy resin to the (J) curing agent, (Z)/(J), is preferably in a range from 95/5 to 55/45 by mass of solid matter, and more preferably from 90/10 to 65/35, in view of adhesion of coating to the base material and of adequacy of top coating.

For further increasing the crosslinking performance at low temperatures, however, it is preferred to use a known curing acceleration catalyst. Examples of the curing acceleration catalyst for the case that polyisocyanate compound is used as the curing agent are N-ethylmorphorine, dibutyltin dilaurate, cobalt naphthenate, tin(II)chloride, zinc naphthenate, and bismuth nitrate. Applicable curing acceleration catalyst in the case of using an amino resin as the curing agent includes phosphoric acid, sulfonic acid compound, or an amine-neutralized sulfonic acid compound. Typical examples of the sulfonic acid compound are p-toluenesulfonate, dodecylbenzenesulfonate, dinonylnaphthalenesulfonate, and dinonylnaphthalenedisulfonate. The amine in the amine-neutralized sulfonic acid compound may be any of primary amine, secondary amine, and tertiary amine.

The following is the description about the water dispersed polyurethane resine as the ingredient (β).

The water dispersed polyurethane resine is an urethane emulsion using a product of a reaction between a polyisocyanate compound and a polyhydroxy compound such as polyetherdiol and polyesterdiol.

The urethane emulsion can be readily obtained by, for example, a reaction between a polyisocyanate compound and a polyhydroxy compound in the presence or in the absence of a hydrophilic organic solvent which has no active hydrogen reactive with isocyanate group in the molecule thereof under a condition of excess isocyanate groups of the polyisocyanate compound to the hydroxyl groups in the polyhydroxy compound. At need, the reaction product (polymer), an amine, and water are mixed together to let the mixture conduct amine-extension reaction, and then a nonionic or ionic emulsifying agent is added to the reaction product, and further water is added to the mixture to make the product emulsify and disperse, and then, at need, the organic solvent is distilled out.

By using a polyol which has nonionic, anionic, or cationic hydrophilic group in the urethane resin skeleton, the urethane emulsion is prepared without using emulsifying agent.

Examples of the polyisocyanate compound are: organic diisocyanate including aliphatic diisocyanate such as hexamethylene diisocyanate and trimethylhexamethylene diisocyanate, alicyclic diisocyanate such as hydrogenated xylylene diisocyanate and isophorone diisocyanate, and aromatic diisocyanate such as tolylene diisocyanate and 4,4'-diphenylmethane diisocyanate; and a cyclization polymer of above organic diisocyanates; and further isocyanulate and biuret compound of above organic diisocyanates.

From the point of mixing stability with water-epoxy resin dispersion, a particularly preferable water dispersed polyurethane resine is nonionic or cationic polyurethane emulsion.

The blending ratio of the (α) water-epoxy resin dispersion to the (β) water dispersed polyurethane resine in the surface treatment coating composition, [water-epoxy resin dispersion]/[water dispersed polyurethane resine], is preferably in a range from 95/5 to 5/95 as mass ratio of the resin solid matter in the water-epoxy resin dispersion to the solid matter in the water-epoxy resin dispersion, more preferably from 75/25 to 25/75. By adding the water dispersed polyurethane resine, the corrosion resistance after forming is effectively improved compared with the case of without addition of the water dispersed polyurethane resine. A presumable reason of the improvement is that the addition of an appropriate quantity of water dispersed polyurethane resine improves the coating-formability of the surface treatment coating composition, which allows preventing the penetration of corrosive substances, which prevents the outflow of rust inhibitor ingredient from the coating, and which suppresses the crack generation in the resin coating after the working, thereby improving the corrosion resistance. If the blending ratio of the (α) water-epoxy resin dispersion to the (β) water dispersed polyurethane resine becomes smaller than the above lower limit, the coating-formability by the urethane resin becomes insufficient, and the suppression effect to the corrosive substances becomes unsatisfactory, thus likely deteriorating the white rust resistance. On the other hand, if the blending ratio of the (α) water-epoxy resin dispersion to the (β) water dispersed polyurethane resine becomes larger than the above upper limit, the percentage of the hydrazine derivative having active hydrogen in the surface treatment coating composition decreases, which also likely decreases the white rust resistance.

Other than the above specific water-dispersible resins, the surface treatment coating composition may contain one or more of other water-dispersible resin and/or water-soluble resin, for example, acrylic resin, polyester resin, epoxy resin, ethylene resin, alkyd resin, phenol resin, and olefin resin, at amounts of about 25% by mass as solid matter to the total resin solid matter.

The following is the description about the silane coupling agent as the ingredient (γ).

Examples of the silane coupling agent are vinylmethoxysilane, vinylethoxysilane, vinyltrichlorosilane, vinyltrimethoxysilane, vinyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-β(aminoethyl)γ-aminopropylmethyldimethoxysilane, N-β(aminoethyl)γ-aminopropyltrimethoxysilane, N-β(aminoethyl)γ-aminopropyltrimethoxysilane, γ-aminopropyltrimethoxysilane, γ-aminopropyltriethoxysilane, γ-methacryloxypropylmethyldimethoxysilane, γ-methacryloxypropyltrimethoxysilane, γ-methacryloxypropylmethyldimethoxysilane, γ-methacryloxypropyltriethoxysilane, γ-mercaptopropylmethyldimethoxysilane, γ-mercaptopropyltrimethoxysilane, p-styryltrimethoxysilane, γ-acryloxypropyltrimethoxysilane, N-phenyl-γ-aminopropyltrimethoxysilane, γ-ureidopropyltriethoxysilane, γ-chloropropyltrimethoxysilane, bis(triethoxysilylpropyl)tetrasulfide, γ-isocyanatepropyltriethoxysilane, γ-triethoxysilyl-N-(1,3-dimethyl-butylidene)propylamine, and N-(vinylbenzilamine)-β-aminoethyl-γ- aminopropyltrimethoxysilane. These compounds may be used separately or in combination of two or more of them.

According to the present invention, the improvement of white rust resistance owing to the existence of silane coupling agent as well as the specified acid ingredient in the surface treatment coating composition is attained presumably by the reason described before.

As of these silane coupling agents, the one having amino group as the reactive functional group is particularly preferable from the point that the water-dispersible resin of the above (α) ingredient contains a highly reactive functional group. Examples of that type of silane coupling agent are N-β(aminoethyl)γ-aminopropylmethyldimethoxysilane, N-β(aminoethyl)γ-aminopropyltrimethoxysilane, N-β(aminoethyl)γ-aminopropyltrimethoxysilane, γ-aminopropyltrimethoxysilane, and γ-aminopropyltriethoxysilane. Specifically, there are applicable KBM-903, KBE-903, KBM-603, KBE-602, and KBE-603, (trade names; manufactured by Shin-Etsu Chemical Co., Ltd.)

The blending quantity of silane coupling agent is preferably in a range from 1 to 300 parts by mass as solid-matter to 100 parts by mass of the resin solid matter in the water-epoxy resin dispersion as the above ingredient (α), more preferably from 5 to 100 parts by mass, and most preferably from 15 to 50 parts by mass. If the blending quantity of silane coupling agent is smaller than 1 part by mass, the corrosion resistance is deteriorated. If the blending quantity of silane coupling agent exceeds 300 parts by mass, satisfactory coating cannot be formed, which fails to attain the effect of improving the adhesion and the barrier performance to the water-dispersible resin, thereby deteriorating the corrosion resistance.

The phosphoric acid and/or the hexafluorometal acid as the above ingredient (δ) has a function to activate the plated metal surface by acting onto the inactive plated metal surface. The adhesion between thus activated plated metal surface and the coating-forming resin is significantly improved owing to the silane coupling agent, thereby markedly improving the corrosion resistance. The phosphoric acid and the hexafluorometal acid may be used separately or in combination of them.

Although the kind of hexafluorometal acid is not specifically limited, a preferable one is a hexafluorometal acid which contains one or more elements selected from the group consisting of Ti, Si, and Zr, such as fluorotitanic acid, fluorozirconic acid, and hydrofluorosilicic acid, from the above-described point that the reaction layer of pseudo-two layer coating is effectively formed. One or more of them can be used.

The blending quantity of the phosphoric acid and/or the hexafluorometal acid is preferably in a range from 0.1 to 80 parts by mass as solid matter to 100 parts by mass of the resin solid matter in the water-epoxy resin dispersion as the above ingredient (α), more preferably from 1 to 60 parts by mass, and most preferably from 5 to 50 parts by mass. If the blending quantity of the phosphoric acid and/or the hexafluorometal acid is smaller than 0.1 parts by mass, the corrosion resistance is deteriorated, and if the blending quantity thereof exceeds 80 parts by mass, the soluble ingredient in the coating increases to deteriorate the corrosion resistance, both of which cases are not preferable.

The following is the description of common matter for the surface-treatment coating in the first and the second configurations.

For improving the corrosion resistance, the surface treatment coating composition may contain, at need, a water-soluble phosphate. Examples of the water-soluble phosphate are one or more of metal salt thereof such as orthophosphoric acid, diphosphoric acid, polyphosphoric acid, and methaphosphoric acid. Furthermore, one or more of salt of organic phosphoric acid (for example, phytic acid, phytinate, phosphonic acid, phosphonate, and their metal salt) may be added. As of these, diphosphate is preferred in view of stability of the surface treatment coating composition and other characteristics.

There is no specific limitation in the configuration of phosphate in the coating, and the phosphate may be in crystal or amorphous state. Furthermore, there is no specific limitation in the ionicity and solubility of phosphate in the coating. A presumable reason of improvement of corrosion resistance by the addition of a water-soluble phosphate is that the water-soluble phosphate forms a dense and slightly-soluble compound during the coating-forming stage.

As described before, the silane coupling agent establishes a chemical bond with both the activated plated metal and the coating-forming resin, thereby providing excellent adhesion between the plated metal and the coating-forming resin, and excellent corrosion resistance. Since, however, the surface of plated metal unavoidably has inactive site, the inactive site is difficult to generate the chemical bond, and fails to fully perform the rust-preventive effect. To that plated coating portion, the water-soluble phosphate forms a dense and slightly-soluble compound during the coating-forming stage. That is, along with the dissolution of the plated coating by the action of the phosphoric acid ion in the water-soluble phosphate, the pH increases at the interface between the plated coating and the surface treatment coating composition. As a result, a precipitate coating of the water-soluble phosphate is formed, which coating contributes to the improvement of corrosion resistance.

For attaining especially excellent corrosion resistance, Al, Mn, Ni, and Mg are particularly preferred as the cation species of the water-soluble phosphate. It is preferable to use a water-soluble phosphate that contains one or more of these cations. Examples of that type of water-soluble phosphate are aluminum diphosphate, manganese diphosphate, nickel diphosphate, and magnesium diphosphate. As of these, aluminum diphosphate is most preferable. The mole ratio of the cationic ingredient to the $P_2O_5$ ingredient, [cation]/[$P_2O_5$], is preferably in a range from 0.4 to 1.0. If the mole ratio [cation]/[$P_2O_5$] is smaller than 0.4, the soluble phosphate deteriorates the insoluble property of the coating, which deteriorates the corrosion resistance, and if the mole ratio [cation]/[$P_2O_5$] exceeds 1.0, the stability of treatment-solution is significantly deteriorated, both of which cases are not preferable.

For the surface-treatment coating in the first configuration, the blending quantity of the water-soluble phosphate is preferably in a range from 0.1 to 60 parts by mass as solid matter to 100 parts by mass of the resin solid matter in the water-epoxy resin dispersion as the ingredient (a), more preferably from 0.5 to 40 parts by mass, and most preferably from 1 to 30 parts by mass. For the surface-treatment coating in the second configuration, a preferable blending quantity is in a range from 0.1 to 60 parts by mass of resin solid matter to 100 parts by mass of the resin solid matter in the sum of the water-epoxy resin dispersion of the ingredient (α) and the water dispersed polyurethane resine of the ingredient (β), more preferably from 0.5 to 40 parts by mass, and most preferably from 1 to 30 parts by mass. If the blending quantity of the water-soluble phosphate is smaller than 0.1 parts by mass, the effect of improvement in the corrosion resistance is insufficient, and if the blending quantity thereof exceeds 60 parts by mass, the soluble ingredient in the coating increases, both of which cases are not preferable.

The surface treatment coating composition may contain a non-chromium based rust inhibitor, at need, aiming to improve the corrosion resistance. By blending a non-chromium based rust inhibitor in the surface treatment coating composition, especially excellent corrosion preventive performance (self-repair performance) is attained.

The non-chromium based rust inhibitor of one or more of the following-given compounds (e1) through (e7) is particularly preferable.

(e1) silicon oxide
(e2) calcium and/or calcium compound
(e3) slightly-soluble phosphoric acid compound
(e4) molybdic acid compound
(e5) vanadium compound
(e6) organic compound containing S atom, being one or more compounds selected from the group consisting of triazole, thiol, thiaziazole, thiazole, and thiuram
(e7) organic compound containing N atom, being one or more compounds selected from the group consisting of hydrazide compound, pyrazole compound, triazole compound, tetrazole compound, thiaziazole compound, and pyridazine compound.

The detail of these non-chromium based rust inhibitors (e1) through (e7), and their corrosion preventive mechanism are the following.

For the ingredient (e1), colloidal silica and dry silica, which are the fine particle silica, may be used. In view of corrosion resistance, however, it is preferable to use calcium ion exchanged silica which is prepared by bonding calcium onto the surface of the fine particle silica.

Examples of the colloidal silica are SNOWTEX O, 20, 30, 40, C, and S, (trade names; manufactured by Nissan Chemical Industries, Co., Ltd.) Examples of the fumed silica are AEROSIL R971, R812, R811, R974, R202, R805, 130, 200, 300, and 300CR, (trade names; manufactured by Nippon Aerosil Co., Ltd.) Examples of calcium ion exchanged silica are SHIELDEX C303, SHIELDEX AC3, SHIELDEX AC5, (trade names; manufactured by W.R. Grace & Co.), and SHIELDEX, SHIELDEX SY710, (trade names; manufactured by Fuji Silysia Chemical, Ltd.) These kinds of silica contribute to the formation of a dense and stable zinc corrosion product in a corrosive environment. By the creation of the corrosion product densely on the surface of the plating, the corrosion progress is suppressed.

The ingredients (e2) and (e3) provide especially excellent corrosion preventive performance (self-repair performance) owing to their precipitation action.

The calcium compound as the ingredient (e2) may be any of calcium oxide, calcium hydroxide, and calcium salt, and one or more of them can be used. There is no specific limitation of the calcium salt, and there may be used a simple salt such as calcium silicate, calcium carbonate, and calcium phosphate, which contain only calcium as the cation, and a double salt such as calcium-zinc phosphate and calcium-magnesium phosphate, which contain calcium ion and cation other than calcium. The ingredient (e2) suppresses the corrosion reaction through the preferential dissolution of calcium, which is less noble than zinc and aluminum which are the plating metals, under a corrosive environment, which dissolved-calcium then forms a dense and slightly-soluble product with $OH^-$ generated by the cathodic reaction to seal the defective section. When the ingredient (e2) is blended with above-described silica, calcium ion is adsorbed onto the surface and is coagulated by electrically neutralizing the surface charge. As a result, a dense and slightly-soluble protective coating is formed, which protective coating then seals the origin of corrosion to suppress the corrosion reaction.

The slightly-soluble phosphoric acid compound as the ingredient (e3) may use a slightly-soluble phosphate. The slightly-soluble phosphate includes all kinds of salts such as simple salt and double salt. The metal cation to structure the slightly-soluble phosphate has no specific limitation, and any metal cation of slightly-soluble zinc phosphate, magnesium phosphate, calcium phosphate, aluminum phosphate, and the like may be applied. In addition, there is no limitation of the skeleton and the condensation degree of phosphoric acid ion, and there are applicable any of normal salt, dihydrogen salt, monohydrogen salt, and phosphite. Furthermore, normal salt includes all kinds of condensed phosphates such as polyphosphate, other than orthophosphate. With the use of the slightly-soluble phosphoric acid compound, zinc and aluminum of the plating metal, dissolved by corrosion, and phosphoric acid ion dissociated by hydrolysis conduct the complex-forming reaction to form a dense and slightly-soluble protective coating, thus sealing the origin of corrosion to suppress the corrosion reaction.

As the molybdic acid compound of the ingredient (e4), a molybdate may be used. The molybdate has no limitation of the skeleton and condensation degree thereof, and there are applicable orthomolybdate, paramolybdate, and methamolybdate. The molybdate includes all kinds of salts such as simple salt and double salt. An example of the double salt is phosphoric acid-molybdic acid salt. The molybdic acid compound generates self-repair performance by the passivation effect. That is, with the dissolved oxygen, the molybdic acid compound forms a dense oxide on the coating surface in a corrosive environment, thereby sealing the origin of corrosion to suppress the corrosion reaction.

Applicable vanadium compound of the ingredient (e5) includes pentavalent vanadium compound and tetravalent vanadium compound. From the point of corrosion resistance, tetravalent vanadium is particularly preferred.

Examples of the organic compound of the ingredient (e6) are the following. As triazole, there are applicable 1,2,4-triazole, 3-amino-1,2,4-triazole, 3-mercapto-1,2,4-triazole, 5-amino-3-mercapto-1,2,4-triazole, 1H-benzotriazole, and the like. As thiol, there are applicable 1,3,5-triazine-2,4,6-trithiol, 2-mercaptobenzimidazole, and the like. As thiaziazole, there are applicable 5-amino-2-mercapto-1,3,4-thiadiazole, 2,5-dimercapto-1,3,4-thiaziazole, and the like. As thiazole, there area applicable 2-N,N-diethylthiobenzothiazole, 2-mercaptobenzothiazole, and the like. As thiuram, there are applicable tetrathiuramdisulfide, and the like. These organic compounds generate self-repair performance by the adsorption effect. That is, zinc and aluminum eluted by corrosion are adsorbed to the polar group containing sulfur in these organic compounds, thus forming an inactive coating to seal the origin of corrosion, thereby suppressing the corrosion reaction.

Examples of the organic compound of the ingredient (e7) are the following. As the hydrazide compound, there are applicable carbohydrazide, hydrazidepropionate, hydrazidesalicylate, dihydrazideadipate, dihydrazidesebacylate, dihydrazidedodecanate, dihydrazideisophthalate, thiocarbohydrazide, 4,4'-oxybisbenzenesulfonylhydrazide, benzophenonehydrazone, aminopolyacrylamide, and the like. As the pyrazole compound, there are applicable pyrazole, 3,5-dimethylpyrazole, 3-methyl-5-pyrazolone, 3-amino-5-methylpyrazole, and the like. As the triazole compound, there area applicable 1,2,4-triazole, 3-amino-1,2,4-triazole, 4-amino-1,2,4-triazole, 3-mercapto-1,2,4-triazole, 5-amino-3-mercapto-1,2,4-triazole, 2,3-dihydro-3-oxo-1,2,4-triazole, 1H-benzotriazole, 1-hydroxybenzotriazole (monohydrate), 6-phenyl-8-hydroxytriazolopyridazine, 6-methyl-8-hydroxytriazolopyridazine, 5-hydroxy-7-methyl-1,3,8-triazaindolizine, and the like. As the tetrazole compound, there are applicable 5-phenyl-1,2,3,4-tetrazole, 5-mercapto-1-phenyl-1,2,3,4-tetrazole, and the like. As the thiaziazole compound, there are applicable 5-amino-2-mercapto-1,3,4-thiaziazole, 2,5-dimercapto-1,3,4-thiadiazole, and the like. As the pyridazine compound, there are applicable hydrazidemaleate, 6-methyl-3-pyridazone, 4,5-dichloro-3-pyridazone, 4,5-dibromo-3-pyridazone, 5-methyl-4,5-dihydro-3-pyridazone, and the like. As of these, pyrazole compound and triazole compound which have ring structure with five-membered ring or six-membered ring and which have nitrogen atom in the ring structure are particularly preferable.

For the case of surface-treatment coating in the first configuration, the blending quantity of the non-chromium based rust inhibitor is preferably in a range from 0.1 to 50 parts by mass as solid matter to 100 parts by mass of the resin solid matter in the water-epoxy resin dispersion as the ingredient (a), more preferably from 0.5 to 30 parts by mass. For the case of surface-treatment coating in the second configuration, a preferable blending quantity is in a range from 0.1 to 50 parts by mass of solid matter to 100 parts by mass of the resin solid matter in the sum of the water-epoxy resin dispersion of the ingredient ($\alpha$) and the water dispersed polyurethane resine of the ingredient ($\beta$), more preferably from 0.5 to 30 parts by mass. If the blending quantity of the non-chromium based rust inhibitor is smaller than 0.1 parts by mass, the effect of improvement in the corrosion resistance after alkaline degreasing is insufficient, and if the blending quantity thereof exceeds 50 parts by mass, the coatability and the workability deteriorate, and the corrosion resistance also deteriorates, both of which cases are not preferable.

Two or more of the above (e1) through (e7) rust inhibitors may be added in combination thereof. In that case, since the respective inherent corrosion preventive actions are combined, stronger corrosion resistance is attained. In particular, when the ingredient (e1) adopts a calcium ion exchanged silica, and one or more of (e3) through (e7) ingredients, particularly all of the (e3) through (e7) ingredients, are added in combination, specifically excellent corrosion resistance is attained.

The surface-treatment coating (and the surface treatment coating composition) may further contain one or more of other oxide fine particles (aluminum oxide, zirconium oxide, titanium oxide, cerium oxide, antimony oxide, and the like), phosphomolybdic acid salt (aluminum phosphomolybdate, and the like), and organic inhibitor (hydrazine and its derivative, thiol compound, thiocarbamate, and the like), as the rust inhibitor.

Furthermore, at need, the surface-treatment coating (and the surface treatment coating composition) may contain one or more of organic coloring pigment (condensed polycyclic organic pigment, phthalocyanine-based organic pigment, and the like), coloring dye (water-soluble azo-based metal dye, and the like) inorganic pigment (titanium oxide, and the like), conductive pigment (metal powder of zinc, aluminum, nickel, and the like, iron phosphide, antimony-doped tin oxide, and the like, coupling agent (titanium coupling agent, and the like), and melamine-cyanuric acid additive, and the like), as the additive.

The surface-treatment coating formed by the surface treatment coating composition containing the above ingredients has dry coating thicknesses ranging from 0.01 to 1.0 μm, preferably from 0.1 to 0.8 μm. If the dry coating thickness is smaller than 0.01 μm, the corrosion resistance is insufficient, and if the dry coating thickness is larger than 1.0 μm, the conductivity and the workability deteriorate.

The following is the description about the top coating (organic coating) formed on the surface-treatment coating (the surface-treatment coatings of the first configuration and the second configuration) as the secondary coating.

The top coating is a coating having thicknesses ranging from 0.3 to 2.0 μm, formed by applying a coating composition for top-coating, which composition contains an (E) high molecular weight epoxy group-containing resin having number average molecular weights ranging from 6000 to 20000, or which preferably contains the (E) resin as the main ingredient resin, and then by drying the applied resin. The top coating also does not contain chromium. By forming that specific high molecular weight resin coating on the specific surface-treatment coating (base coating) especially strong corrosion resistance at the working section is attained owing to the combined action of both coatings.

According to the present invention, the (E) epoxy group-containing resin is adopted as the top coating because the (E) epoxy group-containing resin is superior in reactivity, readiness of reaction, corrosion prevention, and other characteristics to other resins. Examples of the (E) epoxy group-containing resin are epoxy resin, modified epoxy resin, acrylic-based copolymer resin prepared by copolymerizing with epoxy group-containing monomer, polybutadiene resin having epoxy group, polyurethane resin having epoxy group, and an additive or a condensate of these resins. These epoxy group-containing resins may be used separately or in combination of two or more of them.

As of these (E) epoxy group-containing resins, epoxy resin and modified epoxy resin are particularly preferable in view of adhesion with plating surface and of corrosion resistance. Among them, thermosetting epoxy resin and modified epoxy resin having excellent insulation performance to the corrosive substances such as oxygen are most suitable, and are particularly advantageous to make the coating weight of the coating low level for attaining high grade spot-weldability.

As the (E) epoxy group-containing resin, high molecular weight epoxy group-containing resins having number average molecular weights ranging from 6000 to 20000, preferably from 700 to 12000, are adopted. Among them, bisphenol type epoxy resins are preferred. The generally-used bisphenol type epoxy resins have 5500 or smaller number average molecular weight. If, however, the number average molecular weight thereof is smaller than 6000, the workability of the obtained coating is not sufficient, and the coating induces serious damages during severe working under a holddown bead in a press-mold for automobile, and the corrosion resistance at the working section deteriorates. If the number average molecular weight thereof exceeds 20000, the manufacture of epoxy resin becomes extremely difficult, and gelling or other phenomena hinder obtaining stable quality of the product.

Examples of the bisphenol type epoxy resin are any of a resin which is prepared by condensing epichlorohydrin with bisphenol in the presence of, at need, a catalyst such as alkali catalyst to high molecular weight, and a resin which is prepared by condensing epichlorohydrin with bisphenol in the presence of, at need, a catalyst such as alkali catalyst to a low molecular weight epoxy resin, which low molecular weight epoxy resin is further subjected to polyaddition reaction with bisphenol. To attain stably the high molecular weight epoxy resin, however, the latter method is preferable.

Examples of the bisphenol are bis(4-hydroxyphenyl)methane [bisphenol F], 1,1-bis(4-hydroxyphenyl)ethane, 2,2-bis(4-hydroxyphenyl)propane [bisphenol A], 2,2-bis(4-hydroxyphenyl)butane [bisphenol B], bis(4-hydroxyphenyl)-1,1-isobutane, bis(4-hydroxy-tert-butyl-phenyl)-2,2-propane, p-(4-hydroxyphenyl)phenol, oxybis(4-hydroxyphenyl), sulfonylbis(4-hydroxyphenyl), 4,4'-dihydroxybenzophenone, and bis(2-hydroxynaphthyl)methane. As of these, bis(4-hydroxydiphenyl)methane [bisphenol F] and 2,2-bis(4-hydroxyphenyl)propane [bisphenol A] are preferred. The above bisphenols may be used separately or in combination of two or more of them.

The modified epoxy resins include acrylic-modified epoxy resin, polyester-modified epoxy resin, and urethane-modified epoxy resin. Furthermore, there area applicable a polyalkyleneglycol-modified epoxy resin which is prepared by the reaction of polyalkyleneglycol, polyisocyanate, and epoxy resin, and a modified epoxy resin (hydrazine derivative-modified epoxy resin) which is prepared by the reaction of epoxy resin with an active hydrogen-containing compound in which a part or entire of the compound is structured by a hydrazine derivative having active hydrogen. As of these, hydrazine derivative-modified epoxy resin is particularly preferable in view of improving the corrosion resistance.

The modified epoxy resin may be the one prepared by the reaction of epoxy group or hydroxyl group in the above epoxy resin with various modifying agents. Examples of the modified epoxy resin are an epoxy ester resin prepared by a reaction with dry fatty acid, an epoxy acrylate resin prepared by modifying by a polymerizable unsaturated monomer ingredient containing acrylic acid or methacrylic acid, and an urethane-modified epoxy resin prepared by a reaction with isocyanate compound.

Examples of the acrylic-based copolymer resin prepared by the copolymerization with the above epoxy group-containing monomer are the resins synthesized from an unsaturated monomer having epoxy group and a polymerizable unsaturated monomer ingredient which essentially contains an acrylic acid ester or a methacrylic acid ester, by solution polymerization, emulsion polymerization, suspension polymerization, and the like.

Examples of the polymerizable unsaturated monomer ingredient are: C1-C24 alkyl ester of acrylic acid or methacrylic acid, such as methyl(meth)acrylate, ethyl(meth)acrylate, propyl(meth)acrylate, n-, iso-, or ter-butyl(meth)acrylate, hexyl(meth)acrylate, 2-ethylhexyl(meth)acrylate, decyl (meth)acrylate, and lauryl(meth)acrylate; acrylic acid, methacrylic acid, styrene, vinyl toluene, acrylamide, acrylonitrile, N-methylol(meth)acrylamide, and C1-C4 alkyletherified compound of N-methylol(meth)acrylamide; and N,N-diethylaminoethyl methacrylate.

The unsaturated monomer having epoxy group is not specifically limited if only the monomer has an epoxy group and a polymerizable unsaturated group, such as glycidylmethacrylate, glycidylacrylate, and 3,4-epoxycyclohexylmethyl(meth)acrylate.

The modified epoxy group-containing resin, represented by the above hydrazine derivative-modified epoxy resin, which is prepared by the reaction of an (H) active hydrogen-containing compound in which a part or entire of the compound is structured by an (I) hydrazine derivative having active hydrogen with an (E) high molecular weight epoxy group-containing resin, provides improved adhesion with base coating and forms a coating having particularly superior corrosion resistance by the reaction between the epoxy group in the (E) high molecular weight epoxy group-containing resin with the (I) hydrazine derivative having active hydrogen.

Examples of the (H) active hydrogen-containing compound reacting with the epoxy group of the (E) high molecular weight epoxy group-containing resin are the following, and one or more thereof may be applied. Also in this case, it is essential that at least a part (preferably entire) of the (H) active hydrogen-containing compound is the (I) hydrazine derivative having active hydrogen. That is, the (I) hydrazine derivative having active hydrogen is adopted as the essential ingredient, and at need, the (H) active hydrogen-containing compound other than the (I) hydrazine derivative is adopted.

Hydrazine derivative having active hydrogen
Primary or secondary amine compound having active hydrogen
Organic acid such as ammonia and carboxylic acid
Hydrogen halide such as hydrogen chloride
Alcohol, thiol
Hydrazine derivative having no active hydrogen or a quaternization agent as a mixture of tertiary amine with an acid.

Examples of the (I) hydrazide derivative having active hydrogen are the following.

(a) A hydrazide compound such as carbohydrazide, hydrazide propionate, hydrazide salicylate, dihydrazide adipate, dihydrazide sebacylate, dihydrazide dodecanate, dihydrazide isophthalate, thiocarbohydrazide, 4,4'-oxybisbenzenesulfonyl hydrazide, benzophenone hydrazone, and aminopolyacrylamide.

(b) A pyrazole compound such as pyrazole, 3,5-dimethylpyrazole, 3-methyl-5-pyrazolone, and 3-amino-5-methylpyrazole.

(c) A triazole compound such as 1,2,4-triazole, 3-amino-1,2,4-triazole, 4-amino-1,2,4-triazole, 3-mercapto-1,2,4-triazole, 5-amino-3-mercapto-1,2,4-triazole, 2,3-dihydro-3-oxo-1,2,4-triazole, 1H-benzotriazole, 1-hydroxybenzotriazole(monohydrate), 6-methyl-8-hydroxytriazolopyridazine, 6-phenyl-8-hydroxytriazolopyridazine, and 5-hydroxy-7-methyl-1,3,8-triazaindolizine.

(d) A tetrazole compound such as 5-phenyl-1,2,3,4-tetrazole, and 5-mercapto-1-phenyl-1,2,3,4-tetrazole.

(e) A thiadiazole compound such as 5-amino-2-mercapto-1,3,4-thiadiazole, and 2,5-dimercapto-1,3,4-thiaziazole.

(f) A pyridazine compound such as hydrazide maleate, 6-methyl-3-pyridazone, 4,5-dichloro-3-pyridazone, 4,5-dibromo-3-pyridazone, and 6-methyl-4,5-dihydro-3-pyridazone.

As of these compounds, particularly preferred ones are pyrazole and triazole compounds having a ring structure of five membered ring or six membered ring, and having nitrogen atom in the ring structure.

These hydrazine derivatives may be used separately or in combination of two or more of them.

Typical examples of the amine compound having active hydrogen, applicable to a part of the (H) active hydrogen-containing compound are the following.

(1) A compound prepared by the heating reaction of a primary amino group in an amine compound which contains one secondary amino group such as diethylenetriamine, hydroxyethylaminoethylamine, ethylaminoethylamine, and methylaminopropylamine and one or more of primary amino group, with ketone, aldehyde, or carboxylic acid at, for example, approximate temperatures ranging from 100° C. to 230° C., thus modifying to aldimine, ketimine, oxazoline, or imidazoline.

(2) A secondary monoamine such as diethylamine, diethanolamine, di-n- or -iso-propanolamine, N-methylethanolamine, and N-ethylethanolamine.

(3) A secondary amine-containing compound prepared by the addition of a monoalkanol amine such as monoethanolamine to dialkyl(meth)acrylamide by Michael addition reaction.

(4) A compound prepared by modifying a primary amine group of alkanolamine such as monoethanolamine, neopentanolamine, 2-aminopropanol, 3-aminopropanol, and 2-hydroxy-2'(aminopropoxy)ethylether into ketimine.

Regarding the quaternization agent applicable as a part of the (H) active hydrogen-containing compound, since the hydrazine derivative having no active hydrogen or the tertiary amine have no reactivity with epoxy group, the respective mixtures with an acid are prepared to make them reactive with epoxy group. The quaternization agent reacts with epoxy group in the presence of, at need, water, thereby forming a quaternary salt with the epoxy group-containing resin.

The acid used to obtain the quaternization agent may be any of organic acid such as acetic acid and lactic acid and inorganic acid such as hydrochloric acid. The hydrazine derivative having no active hydrogen, which is used to obtain the quaternization agent, may be 3,6-dichloropyridazine. The tertiary amine may be dimethylethanolamine, triethylamine, trimethylamine, triisopropylamine, and methyldiethanolamine.

The product of the reaction of the (E) high molecular weight epoxy group-containing resin and the (H) active hydrogen-containing compound in which a part or entire of the compound is structured by an (I) hydrazine derivative having active hydrogen is prepared by the reaction of the (E) high molecular weight epoxy group-containing resin and the (H) active hydrogen-containing compound at temperatures ranging from 10° C. to 300° C., preferably from 50° C. to 150° C., for about 1 to about 8 hours.

The above reaction may be conducted adding an organic solvent. The organic solvent is not specifically limited. Examples of the organic solvent are: ketone such as acetone, methylethylketone, methylisobutylketone, dibutylketone, and cyclohexanone; alcohol or ether having hydroxyl group, such as ethanol, butanol, 2-ethylhexylalcohol, benzylalcohol, ethyleneglycol, ethyleneglycol monoisopropylether, ethyleneglycol monobutylether, ethyleneglycol monohexylether, propyleneglycol, propyleneglycol monomethylether, diethyleneglycol, diethyleneglycol monoethylether, and diethyleneglycol monobutylether; ester such as ethylacetate, butylacetate, and ethyleneglycol monobutyletheracetate; aromatic hydrocarbon such as toluene and xylene. One or more of them can be used. As of these solvents, ketone or ether solvent is particularly preferred in view of solubility of epoxy resin and of coating-formability.

The blending quantity of the (E) high molecular weight epoxy group-containing resin to the (H) active hydrogen-containing compound in which a part or entire of the compound is structured by an (I) hydrazine derivative having active hydrogen is preferably in a range from 0.5 to 20 parts by mass of solid matter to 100 parts by mass of solid matter in the (E) high molecular weight epoxy group-containing resin (A), and more preferably from 1.0 to 10 parts by mass.

The blending ratio of the (H) active hydrogen-containing compound to the (E) high molecular weight epoxy group-containing resin, as the number of active hydrogen groups in the (H) active hydrogen-containing compound to the number of epoxy groups in the (E) high molecular weight epoxy group-containing resin, or [(the number of active hydrogen groups)/(the number of epoxy groups)], is preferably in a range from 0.01 to 10, more preferably from 0.1 to 8, and most preferably from 0.2 to 4, from the point of corrosion resistance.

The percentage of the (I) hydrazine derivative having active hydrogen in the (H) active hydrogen-containing compound is preferably in a range from 10 to 100% by mole, more preferably from 30 to 100% by mole, and most preferably from 40 to 100% by mole. If the percentage of the (I) hydrazine derivative having active hydrogen is smaller than 10% by mole, the top coating fails to attain sufficient rust preventive function, and the obtained rust prevention effect becomes almost similar with that in the case of simple-mixing of a coating-forming organic resin and a hydrazine derivative.

The coating composition for top coating according to the present invention contains the (E) high molecular weight epoxy group-containing resin as an essential ingredient. By adding a curing agent which can react with the hydroxyl group in the high molecular weight epoxy group-containing resin, the coating crosslinks during the heating and drying stage after applying, thus forming a dense coating having more excellent workability and giving barrier performance. Preferable curing methods for forming the resin composition coating include a curing method which utilizes urethanation reaction between the (G) polyisocyanate compound and hydroxyl group in the epoxy group-containing resin, and a curing method which utilizes etherification reaction between the (F) amino resin and hydroxyl group in the epoxy group-containing resin.

The (F) amino resin includes a methylolated amino resin which is prepared by a reaction between an amino ingredient such as melamine, urea, benzoguanamine, acetoguanamine, steroguanamine, spiroguanamine, and dicyandiamide, and an aldehyde ingredient such as formaldehyde, paraformaldehyde, acetoaldehyde, and benzaldehyde. A compound prepared by etherifying the methylol group in the methylolated amino resin by a lower alcohol of C1 to C6 is also included in the above amino resins.

As for the above amino resins, there are particularly preferable a methyl-etherified melamine resin prepared by etherifying a part or all of methylol groups in the methyloled melamine resin by methyl alcohol, a butyl-etherified melamine resin prepared by butyl-etherifying by butylether, and a mixed etherified melamine resin of methyl ether and butyl ether, which is etherified by both methyl alcohol and butyl alcohol. As of these, use of a methyl-etherified melamine resin containing 1 or more imino groups as an average in a single molecule thereof, preferably 1.5 or more thereof, allows increasing the low temperature reactivity with the (E) high molecular weight epoxy group-containing resin, thereby significantly increasing the strength of the coating. Commercially available amino resins include Cymel 325, Cymel 327, and Cymel 703, (trade names; manufactured by Mitsui Cytec, Ltd.)

The above amino resins may be used separately or in combination of two or more of them.

Examples of the (G) polyisocyanate compound are: aliphatic diisocyanate such as hexamethylene diisocyanate and trimethylhexamethylene diisocyanate; alicyclic diisocyanate such as hydrogenated xylylene diisocyanate and isophorone diisocyanate; aromatic diisocyanate such as tolylene diisocyanate and 4,4'-diphenylmethane diisocyanate; organic polyisocyanate itself such as a polyisocyanate compound having three or more isocyanate groups, including triphenylmethane-4,4',4''-triisocyanate, 1,3,5-triisocyanatebenzene, 2,4,6-triisocyanatetoluene, and 4,4'-dimethyldiphenylmethane-2,2',5,5'-tetraisocyanate; an additive of each of these organic polyisocyanates with polyhydric alcohol, low molecular weight polyester resin, water, or the like; cyclized polymer of above organic polyisocyanates; and isocyanate biuret compound.

Among them, polyisocyanate compounds having 4 or more isocyanate groups, preferably 6 to 10 thereof, in a single molecule can form stronger coating even at decreased reaction temperatures owing to the dense crosslink with the (E)

high molecular weight epoxy group-containing resin, thus providing particularly good corrosion resistance at working section under severe working. Examples of that type of polyisocyanate compound are: an adduct of 4,4'-dimethyldiphenylmethane-2,2',5,5'-tetraisocyanate; and an adduct of hexamethylenediisocyanate.

The (G) polyisocyanate compound may be the one in which a part or all of the isocyanate groups thereof is blocked by a blocking agent. Examples of the blocking agent are: phenol series including phenol, cresol, and xylenol; lactam series including ϵ-caprolactam, δ-valerolactam, γ-butylolactam, and β-propyolactam; alcohol series including methanol, ethanol, n-propyl alcohol, isopropyl alcohol, n-butyl alcohol, isobutyl alcohol, tert-butyl alcohol, ethyleneglycol monoethylether, ethyleneglycol monobutylether, diethyleneglycol monoethylether, propyleneglycol monomethylether, and benzyl alcohol; oxime series including formamidoxime, acetoaldoxime, acetoxime, methylethylketoxime, diacetylmonoxime, benzophenoneoxime, and cyclohexaneoxime; and active methylene series including dimethyl malonate, diethyl malonate, ethyl acetoacetate, methyl acetoacetate, and acetyl acetone.

Commercially available polyisocyanate compounds containing 4 or more isocyanate groups in a single molecule thereof include MF-B80M, MF-B60X, MF-K60X, and ME20-B80S, (trade names; manufactured by Asahi-Kasei Chemicals Corporation)

From the point of curing performance, preferable content of the curing agent in the coating composition for top coating is in a range from 1 to 50 parts by mass of solid matter, more preferably from 5 to 30 parts by mass, to 100 parts by mass of the solid matter in the (E) high molecular weight epoxy group-containing resin.

By the addition of above-described crosslinking agent (curing agent), the (E) high molecular weight epoxy group-containing resin is fully crosslinked. For further increasing the crosslinking performance at low temperatures, however, it is preferred to use a known curing acceleration catalyst. Examples of the curing acceleration catalyst are N-ethylmorphorine, dibutyltin dilaurate, cobalt naphthenate, tin(II)chloride, zinc naphthenate, and bismuth nitrate.

Aiming at the improvement of physical properties such as adhesion, to some extent, a known resin such as acrylic, alkyd, and polyester resins can be used together with the (E) high molecular weight epoxy group-containing resin.

To improve the corrosion resistance, the top coating (coating composition for top coating) according to the present invention may contain a non-chromium based rust inhibitor, at need. By adding the non-chromium based rust inhibitor to the top coating, further excellent corrosion preventive performance is attained.

The non-chromium based rust inhibitor of one or more of the following-given compounds (e1) through (e7) is particularly preferable.

(e1) silicon oxide
(e2) calcium and/or calcium compound
(e3) slightly-soluble phosphoric acid compound
(e4) molybdic acid compound
(e5) vanadium compound
(e6) organic compound containing S atom, being one or more compounds selected from the group consisting of triazole, thiol, thiazizaole, thiazole, and thiuram
(e7) organic compound containing N atom, being one or more compounds selected from the group consisting of hydrazide compound, pyrazole compound, triazole compound, tetrazole compound, thiaziazole compound, and pyridazine compound.

The detail of these non-chromium based rust inhibitors (e1) through (e7), and their corrosion preventive mechanism are described before relating to the surface-treatment coating.

The blending quantity of the non-chromium based rust inhibitor is preferably in a range from 0.1 to 50 parts by mass as solid matter to 100 parts by mass of the resin solid matter in the coating composition for forming coating, more preferably from 0.5 to 30 parts by mass. If the blending quantity of the non-chromium based rust inhibitor is smaller than 0.1 parts by mass, the effect of improvement in the corrosion resistance after alkaline degreasing is insufficient, and if the blending quantity thereof exceeds 50 parts by mass, the coatability, the workability, and the weldability deteriorate, and further the corrosion resistance deteriorates, both of which cases are not preferable.

Two or more of the above (e1) through (e7) rust inhibitors may be added in combination therewith. In that case, since the respective inherent corrosion preventive actions are combined, stronger corrosion resistance is attained. In particular, when the ingredient (e1) adopts a calcium ion exchanged silica, and one or more of (e3) through (e7) ingredients, particularly all of the (e3) through (e7) ingredients, are added in combination, especially excellent corrosion resistance is attained.

Adding to the above rust inhibitor ingredients, the top coating (the coating composition for top coating) may further contain one or more of other oxide fine particles (aluminum oxide, zirconium oxide, titanium oxide, cerium oxide, antimony oxide, and the like), phosphomolybdate (aluminum phosphomolybdate and the like), organic phosphoric acid and a salt thereof (phytic acid, phytinate, phosphonic acid, phosphonate, their metal salt, alkali metal salt, alkali earth metal salt, and the like), and organic inhibitor (hydrazine derivative, thiol compound, dithiocarbamate, and the like), as the rust inhibitor.

Furthermore, at need, the top coating (coating composition for top coating) may contain a solid lubricant to improve the workability of the coating.

Examples of applicable solid lubricant in the present invention are the following, which may be used separately or in combination of two or more of them.

(1) Polyolefin wax, paraffin wax: for example, polyethylene wax, synthetic paraffin, natural paraffin, microwax, and chlorinated hydrocarbon.

(2) Fluororesin fine particles: for example, polyfluoroethylene resin (polytetrafluoroethylene resin, and the like), polyvinylfluoride resin, polyvinylidenefluoride resin, and the like).

Other than those compounds, there may be applied one or more of aliphatic amide-based compound (for example, stearic acid amide, palmitic acid amide, methylene bisstearoamide, ethylene bisstearoamide, oleic acid amide, acyl acid amides and alkylene bis fatty acid amide), metal soap (for example, calcium stearate, lead stearate, calcium laurate, and calcium palmitate), metal sulfide (for example, molybdenum disulfide and tungsten disulfide), graphite, graphite fluoride, boron nitride, polyalkyleneglycol, and alkali metal sulfide.

As of these solid lubricants, polyethylene wax and fluororesin fine particles (particularly polytetrafluoroethylene resin fine particles) are preferred.

Examples of the applicable polyethylene wax are: Ceridust 9615A, Ceridust 3715, Ceridust 3620, and Ceridust 3910, (trade names; manufactured by Hoechst); Sun Wax 131-P and Sun Wax 161-P, (trade names; manufactured by Sanyo Chemical Industries, Ltd.) and CHEMIPEARL W-100, CHEMIPEARL W-200, CHEMIPEARL W-500, CHEMI- PEARL W-800, and CHEMIPEARL W-950, (trade names; manufactured by Mitsui chemicals, Inc.)

For the fluororesin fine particles, tetrafluoroethylene fine particles are the most preferable. Preferred tetrafluoroethylene fine particles include: Lubron L-2 and Lubron L-5, (trade names; manufactured by Daikin Industries, Ltd.); MP1100 and MP1200, (trade names; manufactured by Mitsui DuPont Co., Ltd.); and Fluon dispersion AD1, Fluon dispersion AD2, Fluon L141J, Fluon L150J, and Fluon L155J, (trade names; manufactured by Asahi ICI Fluoropolymers Co., Ltd.)

As of these, combined use of polyolefin wax and tetrafluoroethylene fine particles is expected to provide particularly excellent lubrication effect.

The blending quantity of the solid lubricant in the top coating is in a range from 1 to 10 part by mass as solid matter to 100 parts by mass of the resin solid matter in the coating composition for forming coating, more preferably from 1 to 10 parts by mass. If the blending quantity of the solid lubricant is smaller than 1 parts by mass, the effect of lubrication is poor, and if the blending quantity thereof exceeds 30 parts by mass, the coatability deteriorates, both of which cases are not preferable.

The top coating on the surface-treatment coating (coating composition for top coating) according to the present invention has the (E) high molecular weight epoxy group-containing resin as an essential ingredient, and may contain, at need, a curing agent, a non-chromium based rust inhibitor, a solid lubricant, and the like. Furthermore, at need, the top coating may contain one or more of organic coloring pigment (condensed polycyclic organic pigment, phthalocyanine-based organic pigment, and the like), coloring dye (azo-based dye soluble in organic solvent, water-soluble azo-based metal dye, and the like), inorganic pigment (titanium oxide, and the like), conductive pigment (metal powder of zinc, aluminum, nickel, and the like, iron phosphide, antimony-doped tin oxide, and the like), chelating agent (thiol, and the like), coupling agent (silane coupling agent, titanium coupling agent, and the like), and melamine-cyanuric acid additive, as the additives.

The above coating composition for forming coating, containing above main ingredient and additive ingredients, normally contains solvent (organic solvent and/or water), and further contains, at need, neutralizer and the like.

The above organic solvent is not specifically limited if only the organic solvent allows the (E) high molecular weight epoxy group-containing resin to be dissolved or dispersed, and is able to prepare the coating composition. For example, various organic solvents given in the above examples are applicable.

The neutralizer is added, at need, to neutralize and to make the (E) high molecular weight epoxy group-containing resin aquatic. If the (E) high molecular weight epoxy group-containing resin is a cationic resin, acetic acid, lactic acid, formic acid, and other acid can be used as the neutralizer.

The dry coating thickness of the top coating is in a range from 0.3 to 2.0 µm, preferably from 0.4 to 1.5 µm. If the dry coating thickness is smaller than 0.3 µm, the corrosion resistance is insufficient, and if the dry coating thickness is larger than 2.0 µm, the weldability and the electrocoatability deteriorate.

From the point of weldability and electrocoatability, the total coating thickness of the primary surface-treatment coating with the secondary top coating is preferably 2.0 µm or less.

The following is the description about the method for manufacturing the surface-treated steel sheet according to the present invention.

To form the surface-treatment coating on the surface of a zinc-based plated steel sheet or an aluminum-based plated steel sheet, the surface treatment coating composition (treatment solution) having the above composition is applied onto the surface of the plated steel sheet so as the dry coating thickness to become the above range, and then the applied coating is heated to dry without washing with water.

The method for forming the surface treatment coating composition on the surface of the plated steel sheet may be any of application method, immersion method, and spray method. The application method may be done using any of roll coater (3 roll type, 2 roll type, and the like), squeeze coater, and die coater. After the application treatment by squeeze coater or the like, after the immersion treatment, or after the spray treatment, it is also possible to perform adjusting the coating weight, uniformizing the appearance, and uniformizing the coating thickness using air-knife method, roll-squeezing method, and the like.

After coating the surface treatment coating composition, the composition is heated to dry without washing with water. The heating-drying method may be done by drier, hot-air furnace, high frequency induction heating furnace, infrared furnace, and the like. The heating-drying is preferably conducted at ultimate sheet temperatures ranging from 30° C. to 150° C., more preferably from 40° C. to 140° C. If the heating-drying temperature is below 30° C., large amount of water is left in the coating to result in insufficient corrosion resistance, and if the heating-drying temperature is above 150° C., the treatment becomes uneconomical, and the coating is defected to deteriorate the corrosion resistance. Furthermore, if the heating-drying temperature exceeds 150° C., the treatment cannot be used to BH steel sheets, which is not preferable.

On thus formed surface-treatment coating, the top coating (organic resin coating) is formed as the secondary coating. That is, the coating composition for the secondary coating is applied onto the surface-treatment coating to above-described coating thickness, and then is heated to dry. The application of the coating composition may be done in accordance with the method used for forming the surface-treatment coating.

After the application of the coating composition, normally the coating composition is heated to dry without washing with water. However, the water-washing step may be given after the application of the coating composition. The heating-drying treatment may be given by drier, hot-air furnace, high frequency induction heating furnace, infrared furnace, and the like. The heating-drying is preferably conducted at ultimate sheet temperatures ranging from 30° C. to 150° C., more preferably from 40° C. to 140° C. If the heating-drying temperature is below 30° C., large amount of water is left in the coating to result in insufficient corrosion resistance, and if the heating-drying temperature is above 150° C., the treatment becomes uneconomical, and the coating is defected to deteriorate the corrosion resistance. In addition, if the heating-drying temperature exceeds 150° C., the treatment cannot be used to BH steel sheets, which is not preferable.

Therefore, the method for manufacturing the surface-treated steel sheet according to the present invention and preferred embodiments for the manufacture are the following.

[1] A method for manufacturing surface-treated steel sheet with excellent corrosion resistance contains the steps of: applying a surface treatment coating composition which contains ingredients (a) through (c) described below onto a surface of a zinc-based plated steel sheet or an aluminum-based plated steel sheet, and then drying the applied surface treatment coating composition at ultimate sheet temperatures ranging from 30° C. to 150° C., thus forming a surface-treatment coating having coating thicknesses ranging from 0.01 to 1.0 µm; and forming a top coating having coating thicknesses ranging from 0.3 to 2.0 µm on the surface-treatment coating by applying a coating composition for top coating containing an (E) high molecular weight epoxy group-containing resin having number average molecular weights ranging from 6000 to 20000, and then drying the applied coating composition for top coating at ultimate sheet temperatures ranging from 30° C. to 150° C.

(a) a water-epoxy resin dispersion which is prepared by dispersing in water a resin obtained by a reaction of: an (A) polyalkyleneglycol-modified epoxy resin derived from a reaction of polyalkyleneglycol having number average molecular weights ranging from 400 to 20000, a bisphenol type epoxy resin, an active hydrogen-containing compound, and a polyisocyanate compound; a (B) epoxy group-containing resin other than the (A) polyalkyleneglycol-modified epoxy resin; and an active hydrogen-containing compound in which a part or entire of the compound is structured by a (C) hydrazine derivative having active hydrogen;

(b) a silane coupling agent at amounts ranging from 1 to 300 parts by mass of solid matter therein to 100 parts by mass of the resin solid matter in the water-epoxy resin dispersion; and (c) phosphoric acid and/or a hexafluorometal acid at amounts ranging from 0.1 to 80 parts by mass of solid matter therein to 100 parts by mass of the resin solid matter in the water-epoxy resin dispersion.

[2] The method for manufacturing surface-treated steel sheet with excellent corrosion resistance according to [1], wherein the (C) hydrazine derivative containing active hydrogen is one or more compounds selected from the group consisting of a pyrazole compound and a triazole compound, which compound has a ring structure of five-membered ring or six-membered ring, and has nitrogen atom in the ring structure.

[3] The method for manufacturing surface-treated steel sheet with excellent corrosion resistance according to [1] or [2], wherein the surface treatment coating composition for forming surface-treatment coating further contains a water-soluble phosphate at amounts ranging from 0.1 to 60 parts by mass of solid matter therein to 100 parts by mass of the resin solid matter in the water-epoxy resin dispersion of the ingredient (a).

[4] The method for manufacturing surface-treated steel sheet with excellent corrosion resistance according to any of [1] through [3], wherein the surface treatment coating composition for forming surface-treatment coating further contains a non-chromium based rust inhibitor at amounts ranging from 0.1 to 50 parts by mass of solid matter therein to 100 parts by mass of the resin solid matter in the water-epoxy resin dispersion of the ingredient (a).

[5] A method for manufacturing surface-treated steel sheet with excellent corrosion resistance, which method has the steps of: applying a surface treatment coating composition which contains ingredients (α) through (δ) described below onto a surface of a zinc-based plated steel sheet or an aluminum-based plated steel sheet, and then drying the applied surface treatment coating composition at ultimate sheet temperatures ranging from 30° C. to 150° C., thus forming a surface-treatment coating having coating thicknesses ranging from 0.01 to 1.0 µm; and forming a top coating having coating thicknesses ranging from 0.3 to 2.0 µm on the surface-treatment coating by applying a coating composition for top coating containing an (E) high molecular weight epoxy group-containing resin having number average molecular weights ranging from 6000 to 20000, and then by drying the applied coating composition for top coating at ultimate sheet temperatures ranging from 30° C. to 150° C.:

(α) a water-epoxy resin dispersion which is prepared by dispersing in water a (Z) modified epoxy resin obtained by a reaction of a (W) epoxy group-containing resin, an (X) primary amine compound and/or secondary amine compound, and an active hydrogen-containing compound in which a part or entire of the compound is structured by a (Y) hydrazine derivative having active hydrogen;

(β) a water dispersed polyurethane resine at amounts of mass ratio of the resin solid matter in the water-epoxy resin dispersion to the resin solid matter in the water dispersed polyurethane resine, [water-epoxy resin dispersion]/[water dispersed polyurethane resine], ranging from 95/5 to 5/95;

(γ) a silane coupling agent at amounts ranging from 1 to 300 parts by mass of solid matter therein to 100 parts by mass of the resin solid matter in the water-epoxy resin dispersion; and (δ) phosphoric acid and/or a hexafluorometal acid at amounts ranging from 0.1 to 80 parts by mass of solid matter therein to 100 parts by mass of the resin solid matter in the water-epoxy resin dispersion.

[6] The method for manufacturing surface-treated steel sheet with excellent corrosion resistance according to [5], wherein the (Y) hydrazine derivative containing active hydrogen is one or more compounds selected from the group consisting of a pyrazole compound and a triazole compound, which compound has a ring structure of five-membered ring or six-membered ring, and has a nitrogen atom in the ring structure.

[7] The method for manufacturing surface-treated steel sheet with excellent corrosion resistance according to [5] or [6], wherein the surface treatment coating composition for forming surface-treatment coating further contains a water-soluble phosphate at amounts ranging from 0.1 to 60 parts by mass of solid matter therein to 100 parts by mass of the resin solid matter in the sum of the water-epoxy resin dispersion of the ingredient (α) and the water dispersed polyurethane resine of the ingredient (β).

[8] The method for manufacturing surface-treated steel sheet with excellent corrosion resistance according to any of [5] through [7], wherein the surface treatment coating composition for forming surface-treatment coating further contains a non-chromium based rust inhibitor at amounts ranging from 0.1 to 50 parts by mass of solid matter therein to 100 parts by mass of the resin solid matter in the sum of the water-epoxy resin dispersion of the ingredient (α) and the water dispersed polyurethane resine of the ingredient (β).

[9] The method for manufacturing surface-treated steel sheet with excellent corrosion resistance according to any of [1] through [8], wherein the coating composition for top coating further contains a non-chromium based rust inhibitor at amounts ranging from 0.1 to 50 parts by mass of solid matter therein to 100 parts by mass of the resin solid matter in the coating composition.

[10] The method for manufacturing surface-treated steel sheet with excellent corrosion resistance according to any of [1] through [9], wherein the surface treatment coating composition for forming surface-treatment coating and/or coating composition for top coating contain at one or more compounds selected from the group consisting of (e1) through (e7) given below as the non-chromium based rust inhibitor:

(e1) silicon oxide (e2) calcium and/or calcium compound (e3) slightly-soluble phosphoric acid compound (e4) molybdic acid compound (e5) vanadium compound (e6) organic compound containing S atom, being one or more compounds selected from the group consisting of triazole, thiol, thiaziazole, thiazole, and thiuram (e7) organic compound containing N atom, being one or more compounds selected from the group consisting of hydrazide compound, pyrazole compound, triazole compound, tetrazole compound, thiaziazole compound, and pyridazine compound.

[11] The method for manufacturing surface-treated steel sheet with excellent corrosion resistance according to any of [1] through [10], wherein the coating composition for top coating further contains a curing agent having a group which crosslinks with hydroxyl group, at amounts ranging from 1 to 50 parts by mass of solid matter therein to 100 parts by mass of the solid matter in the (E) high molecular weight epoxy group-containing resin.

[12] The method for manufacturing surface-treated steel sheet with excellent corrosion resistance according to [11], wherein the curing agent having a group crosslinking with hydroxyl group is an (F) amino resin which has one or more imino groups as an average within a single molecule thereof.

[13] The method for manufacturing surface-treated steel sheet with excellent corrosion resistance according to [11], wherein the curing agent having a group crosslinking with hydroxyl group is a (G) polyisocyanate compound which has four or more isocyanate groups as an average within a single molecule thereof.

[14] The method for manufacturing surface-treated steel sheet with excellent corrosion resistance according to [13], wherein the (G) polyisocyanate compound is the one in which at least some of the isocyanate groups in the polyisocyanate compound are blocked by a blocking agent.

[15] The method for manufacturing surface-treated steel sheet with excellent corrosion resistance according to any of [1] through [14], wherein the (E) high molecular weight epoxy group-containing resin in the coating composition for top coating is a modified epoxy group-containing resin which is modified by an (H) active hydrogen-containing compound in which a part or entire of the compound is structured by an (I) hydrazine derivative having active hydrogen.

[16] The method for manufacturing surface-treated steel sheet with excellent corrosion resistance according to any of [1] through [15], wherein the coating composition for top coating further contains a solid lubricant at amounts ranging from 1 to 30 parts by mass of solid matter therein to 100 parts by mass of the resin solid matter in the coating composition.

The surface-treatment coating and the top coating may be formed on either of a single side or both sides of the plated steel sheet. The combination of the coating configuration on the front side and the rear side of the plated steel sheet is arbitrary, including (surface-treatment coating+top coating)/(non-treatment), (surface-treatment coating+top coating)/(surface-treatment coating), (surface-treatment coating+top coating)/(surface-treatment coating+top coating).

Example 1

Table 1 shows the plated steel sheets used. The surface treatment coating compositions for forming the primary coating adopted the respective water-soluble or water-dispersible epoxy resins given in Table 2 as the resin compositions. To the resin compositions, the respective appropriate quantities of silane coupling agents (Table 3), phosphoric acid or hexafluorometal acids (Table 4), water-soluble phosphates (Table 5), and non-chromium based rust inhibitors (Table 6) were added. Each of the mixtures was agitated in a disperser for coating (sand-grinder) for a specified time to prepare the surface treatment coating composition.

The water-soluble or water-dispersible epoxy resins given in Table 2 were prepared by the following procedure.

Preparation of Polyalkyleneglycol-Modified Epoxy Resin

Manufacture Example 1

To a four-neck flask equipped with a thermometer, an agitator, and a cooling tube, 1688 g of polyethyleneglycol having a number average molecular weight of 4000, and 539 g of methylethylketone were charged. The mixture was agitated at 60° C. to bring the mixture homogeneous and transparent. After that, 171 g of tolylenediisocyanate was added to the mixture to conduct reaction for 2 hours. Then, 1121 g of Epicoat 834×90 (an epoxy resin having an epoxy equivalent of 250; manufactured by Shell Japan Ltd.), 66 g of diethyleneglycol ethylether, and 1.1 g of 1% dibutyltin dilaurate solution were added to the mixture to further conduct reaction for 2 hours. After that, the mixture was heated to 80° C. to conduct reaction for 3 hours to confirm that the isocyanate value became 0.9 or lower. Then, the mixture was heated to 90° C. to conduct distillation under a reduced pressure to remove methylethylketone to reach the solid matter concentration to 81.7%. After removing the methylethylketone, 659 g of propyleneglycol monomethylether and 270 g of deionized water were added to dilute the mixture, thus obtained the polyalkyleneglycol-modified epoxy resin solution A1 containing solid matter of 76%.

Preparation of Water-Epoxy Resin Dispersion

Manufacture Example 2

To a four-neck flask, 2029 g of EP1004 (an epoxy resin having a number average molecular weight of 1000; manufactured by Yuka-Shell Epoxy Co., Ltd.), and 697 g of propyleneglycol monobutylether were charged. The mixture was heated to 110° C. to completely dissolve the epoxy resin within 1 hour. Then, 1180 g of the polyalkyleneglycol-modified epoxy resin solution A1 prepared in Manufacture Example 1, and 311.7 g of 3-amino-1,2,4-triazole (molecular weight of 84) were added to the mixture, and thus prepared mixture was heated to conduct reaction at 100° C. for 5 hours. After that, 719.6 g of propyleneglycol monobutylether was added to the mixture to obtain the resin solution D1.

A 257.6 g aliquot of the resin solution D1 was mixed with 50 g of MF-K60X (an isocyanate curing agent; manufactured by Asahi Chemical Industry Co., Ltd.), and 0.3 g of Scat24 (a curing catalyst). After fully agitated the mixture, 692.1 g of water was dropped gradually to mix and agitate the mixture, thus obtained the water-epoxy resin dispersion E1.

Manufacture Example 3

Water-Epoxy Resin Dispersion Containing No Hydrazine Derivative

To a four-neck flask, 2029 g of EP1004 (an epoxy resin having a number average molecular weight of 1000; manufactured by Yuka-Shell Epoxy Co., Ltd.), and 697 g of propyleneglycol monobutylether were charged. The mixture was heated to 110° C. to completely dissolve the epoxy resin within 1 hour. Then, 1180 g of the polyalkyleneglycol-modified epoxy resin solution A1 prepared in Manufacture Example 1, and 527.0 g of propyleneglycol monobutylether were added to the mixture to obtain the resin solution D2.

A 257.6 g aliquot of the resin solution D2 was mixed with 50 g of MF-K60X (an isocyanate curing agent; manufactured by Asahi Chemical Industry Co., Ltd.), and 0.3 g of Scat24 (a curing catalyst). After fully agitated the mixture, 692.1 g of water was dropped gradually to mix and agitate the mixture, thus obtained the water-epoxy resin dispersion E2.

The coating composition for forming the secondary coating adopted the respective resin compositions given in Table 7 and Table 8, to which further added appropriately the respective non-chromium based rust inhibitors (Table 6) and solid lubricators (Table 9). Each of the mixtures was agitated in a disperser for coating (sand-grinder) for a specified time to prepare the surface treatment coating composition.

The base resins (reaction products) of the resin compositions given in Table 7 and Table 8 were synthesized by the following procedure.

Synthesis Example 1

To a four-neck flask, 634 parts of Epicoat 828 (epoxy equivalent of 187; manufactured by Japan Epoxy Resins Co., Ltd.), 366 parts of Bisphenol-A, 8 parts of 50% tetraethylammonium bromide aqueous solution, and 180 parts of cyclohexane were charged. The mixture was heated to 150° C. to conduct reaction for 5 hours. After that, 300 parts of methylisobutylketone and 1843 parts of cyclohexanone were added while cooling the mixture to obtain the epoxy resin solution F1 with solid matter of 30%, (resin composition (1)). The resin had the number average molecular weight of 7600.

Synthesis Example 2

To a four-neck flask, 347 parts of Epicoat 1256 (epoxy equivalent of 7880; manufactured by Japan Epoxy Resins Co., Ltd.), and 543 parts of cyclohexane were charged. The mixture was heated to 130° C. to fully dissolve the epoxy resin within 2 hours. The mixture was cooled to 120° C. Then, 3.7 parts of 3-amino-1,2,4-tolyazole (molecular weight of 84) was added to the mixture to conduct reaction for 6 hours until the epoxy group vanished. After that, 78 parts of methylisobutylketone and 197 parts of cyclohexanone were added while cooling the mixture to obtain the triazole-modified epoxy resin solution F2 with solid matter of 30%, (resin composition (2)). The resin had the number average molecular weight of 10100.

Synthesis Example 3

To a four-neck flask, 637 parts of Epicoat 828 (epoxy equivalent of 187; manufactured by Japan Epoxy Resins Co., Ltd.), 363 parts of Bisphenol-A, 10 parts of 50% tetraethylammonium bromide aqueous solution, and 175 parts of cyclohexane were charged. The mixture was heated to 160° C. to conduct reaction for 4 hours, thus obtained an epoxy resin solution with solid matter of 85%. Then, 1315 pairs of cyclohexanone was added to the mixture, and then the mixture was cooled to 100° C. Further 9.7 parts of 3,5-dimethylpyrazole and 13 parts of dibutylamine were added to the mixture to conduct reaction for 6 hours until the epoxy group vanished. After that, 908 parts of methylisobutylketone was added to the mixture while cooling the mixture to obtain the pyrazole-modified epoxy resin solution F3 with solid matter of 30%, (resin composition (3)). The resin had the number average molecular weight of 6300.

Synthesis Example 4

To a four-neck flask, 1833 parts of Epicoat 828 (epoxy equivalent of 187; manufactured by Japan Epoxy Resins Co., Ltd.), 894 parts of Bisphenol-A, 1.96 parts of tetraethylammonium bromide, and 294 parts of methylisobutylketone were charged. The mixture was heated to 140° C. to conduct reaction for 4 hours. Then, 3795 parts of ethyleneglycol monobutylether was added to the mixture while cooling the mixture, thus obtained the epoxy resin solution F4 (epoxy equivalent of 1388, and solid matter of 40%), (resin composition (4)). The resin had the number average molecular weight of 3100.

As the treating base sheets, the plated steel sheets given in Table 1, which are the plated steel sheets with cold-rolled steel sheets as the base sheets, were adopted. The plated steel sheets are for household electric appliances, building materials, and automobile parts. The thickness of the steel sheets was selected responding to the objectives of evaluations. After alkali degreasing, washing with water, and drying on the surface of the plated steel sheets, the above-described respective surface treatment coating compositions for forming the primary coating were applied using a roll coater, and then the compositions were heated to dry at various temperatures. The coating thickness was adjusted by the solid matter content (heating residue) of the surface treatment coating composition or by the application conditions (roll pressing force, rotational speed, and the like).

Then, the respective coating compositions for forming the secondary coating were applied using a roll coater, and were heated to dry at various temperatures. The coating thickness was adjusted by the solid matter content (heating residue) of the surface treatment coating composition or by the application conditions (roll pressing force, rotational speed, and the like).

Tables 10 through 25 show the result of evaluation of thus prepared surface-treated steel sheets in terms of coating composition and quality performance (corrosion resistance, corrosion resistance after forming, weldability, and electrodeposited paint adhesion). The evaluation of quality was given in the following procedure.

(1) Corrosion Resistance

Each sample was degreased by FC-4460 (manufactured by Japan Parkerizing Co., Ltd.) under the condition of 60° C. for 2 minutes. Then, the sample was subjected to the following-given combined cycle test (CCT) to evaluate the corrosion resistance based on the area percentage of white rust generation and the area percentage of red rust generation after 50 cycles.

Salt spraying (per JIS Z2371): 4 hours
↓
Drying (60° C.): 2 hours
↓
Wetting (50° C., 95% RH): 2 hours The evaluation criterion is the following.

⊚: less than 5% of the area percentage of white rust generation

○+: 5% or more and less than 10% of the area percentage of white rust generation ○: 10% or more and less than 30% of the area percentage of white rust generation ○−: 30% or more of the area percentage of white rust generation, without red rust generation Δ: with red rust generation, less than 10% of area percentage of red rust generation X: 10% or more of area percentage of red rust generation (2) Corrosion Resistance after Forming Each sample was subjected to deformation and sliding with a draw-bead under the condition given below. Thus treated sample was degreased by FC-4460 (manufactured by Japan Parkerizing Co., Ltd.) under the condition of 60° C. for 2 minutes. Then, the sample was treated by CCT given in the "(1) Corrosion resistance" to evaluate the corrosion resistance after forming based on the area percentage of white rust generation and the area percentage of red rust generation after 36 cycles.

Pressing load: 800 kgf
Draw-out speed: 1000 mm/min
Bead shoulder R: 2 mm on male side, 3 mm on female side
Penetration depth: 7 mm
Oil: Pleton R-352L; manufactured by Sugimura Chemical Industry, Co., Ltd.

The evaluation criterion is the following.
◉: less than 5% of the area percentage of white rust generation
○+: 5% or more and less than 10% of the area percentage of white rust generation
○: 10% or more and less than 30% of the area percentage of white rust generation
○−: 30% or more of the area percentage of white rust generation, without red rust generation
Δ: with red rust generation, less than 10% of area percentage of red rust generation
X: 10% or more of area percentage of red rust generation (3) Weldability Each sample was tested by welding to evaluate in terms of successive spottability using a CF type Cr—Cu electrode at 200 kg of pressing force, 10 cycles/50 Hz of power applying time, and 10 kA of welding current. The evaluation was given by the number of successive spots. The evaluation criterion is the following.
◉: 2000 or larger number of spots
○: 1000 or more and less than 2000 of the number of spots
Δ: 500 or more and less than 1000 of the number of spots
X: less than 500 of the number of spots (4) Electrodeposited Paint Adhesion Each sample was coated by a cationic electrodeposition coat GT-10 (manufactured by Kansai Paint Co., Ltd.) to a coating thickness of 30 μm. The coating was then baked at 130° C. for 30 minutes. The coated sample was immersed in boiling water for 2 hours, and then immediately subjected to cross-cut corrosion test (10×10 segments, 1 mm in spacing) applying/peeling adhesion tapes, thus determined the peeling area percentage on the coating. The evaluation criterion is the following.
◉: no peeling occurred
○: less than 5% of peeling area percentage
Δ: 5% or more and less than 20% of peeling area percentage
X: 20% or more of peeling area percentage

TABLE 1

| No. | Plated steel sheet | Coating weight (g/m$^2$) |
|---|---|---|
| 1 | Electro-galvanized steel sheet | 50 |
| 2 | Hot-dip galvanized steel sheet | 60 |
| 3 | Alloyed hot-dip galvanized steel sheet (Fe: 10 mass %) | 45 |
| 4 | Zn—Ni alloy plated steel sheet (Ni: 12 mass %) | 20 |
| 5 | Hot-dip Zn—Al alloy plated steel sheet (Al: 55 mass %) | 90 |
| 6 | Hot-dip Zn-5 mass % Al-0.5 mass % Mn alloy plated steel sheet | 90 |
| 7 | Hot-dip aluminum plated steel sheet (Al—Si alloy, Si: 6 mass %) | 60 |
| 8 | Zn—Al—Mg alloy plated steel sheet (Al: 6 mass %, Mg: 3 mass %) | 120 |
| 9 | Hot-dip Zn—Mg alloy plated steel sheet (Mg: 0.5 mass %) | 150 |

TABLE 2

| No. | Water-soluble or water-dispersible epoxy resin |
|---|---|
| 1 | E1 of (Manufacture Example 2) given in the description |
| 2 | D1 of (Manufacture Example 2) given in the description |
| 3 | A1 of (Manufacture Example 1) given in the description |
| 4 | D2 of (Manufacture Example 3) given in the description |
| 5 | E2 of (Manufacture Example 3) given in the description |

TABLE 3

| No. | Silane coupling agent | Product name |
|---|---|---|
| 1 | γ-aminopropyl triethoxysilane | "KBE-903", manufactured by Shin-Etsu Chemical Co., Ltd. |
| 2 | γ-aminopropyl trimethoxysilane | "KBM-903", manufactured by Shin-Etsu Chemical Co., Ltd. |
| 3 | N-β (aminoethyl) γ-aminopropylmethyl dimethoxysilane | "KBM-602", manufactured by Shin-Etsu Chemical Co., Ltd. |
| 4 | N-β (aminoethyl) γ-aminopropyl trimethoxysilane | "KBM-603", manufactured by Shin-Etsu Chemical Co., Ltd. |
| 5 | N-β (aminoethyl) γ-aminopropyl triethoxysilane | "KBE-603", manufactured by Shin-Etsu Chemical Co., Ltd. |
| 6 | γ-glycidoxypropyl trimethoxysilane | "KBM-403", manufactured by Shin-Etsu Chemical Co., Ltd. |
| 7 | γ-glycidoxpropylmethyl diethoxysilane | "KBE-402", manufactured by Shin-Etsu Chemical Co., Ltd. |
| 8 | γ-glycidoxypropyl triethoxysilane | "KBE-403", manufactured by Shin-Etsu Chemical Co., Ltd. |

TABLE 4

| No. | Kind |
|---|---|
| 1 | Phosphoric acid |
| 2 | Hexafluorosilicate (hydrofluosilic acid) $H_2SiF_6$ |
| 3 | Hexafluorotitanate $H_2TiF_6$ |
| 4 | Hexafluorozirconate $H_2ZrF_6$ |

TABLE 5

| No. | Water-soluble phosphate |
|---|---|
| 1 | Aluminum phosphate ([Cation]/[$P_2O_5$] = 0.90) |
| 2 | Manganese phosphate ([Cation]/[$P_2O_5$] = 0.77) |
| 3 | Magnesium phosphate ([Cation]/[$P_2O_5$] = 0.97) |
| 4 | Nickel phosphate ([Cation]/[$P_2O_5$] = 0.82) |

TABLE 6

| No. | Rust inhibitor |
|---|---|
| 1 | Calcium ion exchanged silica |
| 2 | Colloidal silica |
| 3 | Fumed silica |
| 4 | Aluminum dihydrogen tripolyphosphate |
| 5 | Aluminum phosphomolybdate |
| 6 | Tetraethylthiuram disulfide |
| 7 | Vanadyl sulfate |

TABLE 7

| No. | Base resin Kind *1 | Base resin Blending quantity | Curing agent Kind *2 | Curing agent Blending quantity | Catalyst | Suitability to the conditions of the invention |
|---|---|---|---|---|---|---|
| 1 | (1) | 100 parts | A | 5 parts | Dibutyltin dilaurate (0.2 parts) | Satisfied |
| 2 | (1) | 100 parts | B | 25 parts | Dibutyltin dilaurate (1.0 part) | Satisfied |
| 3 | (1) | 100 parts | C | 25 parts | — | Satisfied |
| 4 | (5) | 100 parts | A | 10 parts | Dibutyltin dilaurate (2.0 parts) | Satisfied |
| 5 | (5) | 100 parts | B | 40 parts | Dibutyltin dilaurate (3.0 parts) | Satisfied |
| 6 | (5) | 100 parts | C | 50 parts | Dibutyltin dilaurate (4.0 parts) | Satisfied |
| 7 | (2) | 100 parts | A | 25 parts | Cobalt naphthenate (1.0 part) | Satisfied |
| 8 | (2) | 100 parts | B | 5 parts | Tin(II) chloride (1.0 part) | Satisfied |
| 9 | (2) | 100 parts | C | 40 parts | N-ethyl-morpholine (1.0 part) | Satisfied |
| 10 | (3) | 100 parts | A | 10 parts | Cobalt naphthenate (0.5 parts) | Satisfied |
| 11 | (3) | 100 parts | B | 25 parts | Cobalt naphthenate (1.0 part) | Satisfied |
| 12 | (3) | 100 parts | C | 5 parts | Cobalt naphthenate (2.0 parts) | Satisfied |
| 13 | (4) | 100 parts | A | 25 parts | Tin(II) chloride (0.5 parts) | Not satisfied |
| 14 | (4) | 100 parts | B | 25 parts | Tin(II) chloride (2.0 parts) | Not satisfied |

*1: The resin compositions (1) through (4) which were synthesized in the respective Synthesis Examples 1 through 4 given in the description of the invention, and the resin compositions (5) through (7) given below.
(5): High molecular weight bisphenol-based epoxy resin (Phenoxy resin): "Epicoat 1256", manufactured by Japan Epoxy Resins Co., Ltd.; number average molecular weight 10000.
(6): Branched polyester resin: "Biron GK-130", manufactured by Toyobo Co., Ltd.; number average molecular weight 7000.
(7): High molecular weight polyester resin: "Biron GK-140", manufactured by Toyobo Co., Ltd.; number average molecular weight 13000.
*2: A: MEK oxime-blocked IPDI: "Takenate B-870N", manufactured by Takeda Chemical Industries, Ltd.; the number of isocyanate groups in a molecule: 3
B: Isocyanurate type: "DESMODURE BL-3175", manufactured by Bayer; the number of isocyanate groups in a molecule: 3
C: MEK oxime-blocked HMDI: "Duranate MF-B80M", manufactured by Asahi Chemical Industry Co., Ltd.; the number of isocyanate groups in a molecule: 6
D: Imino-group type melamine resin: "Cymel 325", manufactured by Mitsui Cytec, Ltd.
E: All methoxy group type melamine resin: "Cymel 303", manufactured by Mitsui Cytec, Ltd.

TABLE 8

| No. | Base resin Kind *1 | Base resin Blending quantity | Curing agent Kind *2 | Curing agent Blending quantity | Catalyst | Suitability to the conditions of the invention |
|---|---|---|---|---|---|---|
| 15 | (4) | 100 parts | C | 40 parts | N-ethyl-morpholine (2.0 parts) | Not satisfied |
| 16 | (1) | 100 parts | D | 20 parts | — | Satisfied |
| 17 | (5) | 100 parts | D | 40 parts | — | Satisfied |
| 18 | (3) | 100 parts | D | 10 parts | — | Satisfied |
| 19 | (4) | 100 parts | D | 20 parts | — | Not satisfied |
| 20 | (1) | 100 parts | E | 20 parts | Dodecylbenzene sulfonate (1.0 pat) | Satisfied |
| 21 | (6) | 100 parts | C | 20 parts | — | Not satisfied |
| 22 | (7) | 100 parts | C | 25 parts | Dibutyltin dilaurate (2.0 parts) | Not satisfied |
| 23 | (7) | 100 parts | D | 10 parts | — | Not satisfied |

*1: The resin compositions (1) through (4) which were synthesized in the respective Synthesis Examples 1 through 4 given in the description of the invention, and the resin compositions (5) through (7) given below.
(5): High molecular weight bisphenol-based epoxy resin (Phenoxy resin): "Epicoat 1256", manufactured by Japan Epoxy Resins Co., Ltd.; number average molecular weight 10000.
(6): Branched polyester resin: "Biron GK-130", manufactured by Toyobo Co., Ltd.; number average molecular weight 7000.
(7): High molecular weight polyester resin: "Biron GK-140", manufactured by Toyobo Co., Ltd.; number average molecular weight 13000.
*2: A: MEK oxime-blocked IPDI: "Takenate B-870N", manufactured by Takeda Chemical Industries, Ltd.; the number of isocyanate groups in a molecule: 3
B: Isocyanurate type: "DESMODURE BL-3175", manufactured by Bayer; the number of isocyanate groups in a molecule: 3
C: MEK oxime-blocked HMDI: "Duranate MF-B80M", manufactured by Asahi Chemical Industry Co., Ltd.; the number of isocyanate groups in a molecule: 6
D: Imino-group type melamine resin: "Cymel 325", manufactured by Mitsui Cytec, Ltd.
E: All methoxy group type melamine resin: "Cymel 303", manufactured by Mitsui Cytec, Ltd.

TABLE 9

| No. | Solid lubricant | Product name |
|---|---|---|
| 1 | Polyethylene wax | "LUVAX1151", manufactured by Nippon Seiro Co., Ltd. |
| 2 | Polyethylene wax | "Ceridust3620", manufactured by Hoechst |
| 3 | Tetrafluoroethylene fine particles | "MP1100", manufactured by Mitsui DuPont KK. |

Symbols *1 through *10 found in Tables 10 through 25 designate the following, respectively.

*1: No. given in Table 1, (plated steel sheet)

*2: No. given in Table 2, (water-soluble or water-dispersible epoxy resin)

*3: No. given in Table 3, (silane coupling agent)

*4: No. given in Table 4, (phosphoric acid or hexafluorometal acid)

*5: No. given in Table 5, (water-soluble phosphate)

*6: No. given in Table 6, (rust inhibitor)

*7: Parts by mass, (for the ingredients other than water-soluble or water-dispersible epoxy resin, parts by mass to 100 parts by mass of the solid matter in the water-soluble or water-dispersible epoxy resin)

*8: No. given Table 7 and Table 8, (resin composition)

*9: No. given Table 9, (solid lubricant)

*10: Parts by mass (for the ingredients other than organic resin, parts by mass to 100 parts by mass of the solid matter in the organic resin)

TABLE 10

| Classification | No. | Plated steel sheet *1 | Primary layer | | | | | | | | | Coating thickness (μm) | Baking temperature (°C.) |
|---|---|---|---|---|---|---|---|---|---|---|---|---|---|
| | | | Water-soluble resin or water-dispersible resin | | Silane coupling agent | | Phosphoric acid or hexafluorometal acid | | Water-soluble phosphate | | Rust inhibitor | | | |
| | | | Kind *2 | Blending quantity *7 | Kind *3 | Blending quantity *7 | Kind *4 | Blending quantity *7 | Kind *5 | Blending quantity *7 | Kind *6 | Blending quantity *7 | | |
| Comparative example | 1 | 1 | — | — | 1 | 25 | 1 | 40 | — | — | — | — | 0.3 | 140 |
| Comparative example | 2 | 1 | 1 | 100 | — | — | 1 | 40 | — | — | — | — | 0.3 | 140 |
| Example | 3 | 1 | 1 | 100 | 1 | 5 | 1 | 40 | — | — | — | — | 0.3 | 140 |
| Example | 4 | 1 | 1 | 100 | 1 | 15 | 1 | 40 | — | — | — | — | 0.3 | 140 |
| Example | 5 | 1 | 1 | 100 | 1 | 50 | 1 | 40 | — | — | — | — | 0.3 | 140 |
| Example | 6 | 1 | 1 | 100 | 1 | 100 | 1 | 40 | — | — | — | — | 0.3 | 140 |
| Comparative example | 7 | 1 | 1 | 100 | 1 | 500 | 1 | 40 | — | — | — | — | 0.3 | 140 |
| Comparative example | 8 | 1 | 1 | 100 | 1 | 25 | — | — | — | — | — | — | 0.3 | 140 |
| Example | 9 | 1 | 1 | 100 | 1 | 25 | 1 | 1 | — | — | — | — | 0.3 | 140 |
| Example | 10 | 1 | 1 | 100 | 1 | 25 | 1 | 5 | — | — | — | — | 0.3 | 140 |
| Example | 11 | 1 | 1 | 100 | 1 | 25 | 1 | 20 | — | — | — | — | 0.3 | 140 |
| Example | 12 | 1 | 1 | 100 | 1 | 25 | 1 | 40 | — | — | — | — | 0.3 | 140 |
| Comparative example | 13 | 1 | 1 | 100 | 1 | 25 | 1 | 100 | — | — | — | — | 0.3 | 140 |
| Example | 14 | 1 | 1 | 100 | 1 | 25 | 1 | 40 | 1 | 0.5 | — | — | 0.3 | 140 |
| Example | 15 | 1 | 1 | 100 | 1 | 25 | 1 | 40 | 1 | 5 | — | — | 0.3 | 140 |
| Example | 16 | 1 | 1 | 100 | 1 | 25 | 1 | 40 | 1 | 10 | — | — | 0.3 | 140 |

TABLE 11

| Classification | No. | Secondary layer | | | | | | | | Performance | | | |
|---|---|---|---|---|---|---|---|---|---|---|---|---|---|
| | | Organic resin | | Rust inhibitor | | Solid lubricant | | Coating thickness (μm) | Baking temperature (°C.) | Corrosion resistance | Corrosion resistance after treatment | Weldability | Electrodeposited paint adhesion |
| | | Kind *8 | Blending quantity *10 | Kind *6 | Blending quantity *10 | Kind *9 | Blending quantity *10 | | | | | | |
| Comparative example | 1 | 1 | 100 | 1 | 20 | — | — | 1.0 | 140 | Δ | X | ◎ | ◎ |
| Comparative example | 2 | 1 | 100 | 1 | 20 | — | — | 1.0 | 140 | ○ | X | ◎ | ◎ |
| Example | 3 | 1 | 100 | 1 | 20 | — | — | 1.0 | 140 | ○ | ○- | ◎ | ◎ |
| Example | 4 | 1 | 100 | 1 | 20 | — | — | 1.0 | 140 | ○ | ○ | ◎ | ◎ |
| Example | 5 | 1 | 100 | 1 | 20 | — | — | 1.0 | 140 | ○ | ○ | ◎ | ◎ |
| Example | 6 | 1 | 100 | 1 | 20 | — | — | 1.0 | 140 | ○ | ○ | ◎ | ◎ |
| Comparative example | 7 | 1 | 100 | 1 | 20 | — | — | 1.0 | 140 | Δ | X | ○ | ○ |
| Comparative example | 8 | 1 | 100 | 1 | 20 | — | — | 1.0 | 140 | X | X | ◎ | ◎ |
| Example | 9 | 1 | 100 | 1 | 20 | — | — | 1.0 | 140 | ○ | ○- | ◎ | ◎ |
| Example | 10 | 1 | 100 | 1 | 20 | — | — | 1.0 | 140 | ○ | ○ | ◎ | ◎ |
| Example | 11 | 1 | 100 | 1 | 20 | — | — | 1.0 | 140 | ○ | ○ | ◎ | ◎ |
| Example | 12 | 1 | 100 | 1 | 20 | — | — | 1.0 | 140 | ○ | ○ | ◎ | ◎ |
| Comparative example | 13 | 1 | 100 | 1 | 20 | — | — | 1.0 | 140 | Δ | X | ◎ | ◎ |
| Example | 14 | 1 | 100 | 1 | 20 | — | — | 1.0 | 140 | ○ | ○ | ◎ | ◎ |
| Example | 15 | 1 | 100 | 1 | 20 | — | — | 1.0 | 140 | ○ | ○ | ◎ | ◎ |
| Example | 16 | 1 | 100 | 1 | 20 | — | — | 1.0 | 140 | ○ | ○ | ◎ | ◎ |

TABLE 12

| | | | Primary layer | | | | | | | | | |
|---|---|---|---|---|---|---|---|---|---|---|---|---|
| | | | Water-soluble resin or water-dispersible resin | | Silane coupling agent | | Phosphoric acid or hexafluorometal acid | | Water-soluble phosphate | | Rust inhibitor | | Coating thickness (μm) | Baking temperature (°C.) |
| Classification | No. | Plated steel sheet *1 | Kind *2 | Blending quantity *7 | Kind *3 | Blending quantity *7 | Kind *4 | Blending quantity *7 | Kind *5 | Blending quantity *7 | Kind *6 | Blending quantity *7 | | |
| Example | 17 | 1 | 1 | 100 | 1 | 25 | 1 | 40 | 1 | 30 | — | — | 0.3 | 140 |
| Comparative example | 18 | 1 | 1 | 100 | 1 | 25 | 1 | 40 | 1 | 80 | — | — | 0.3 | 140 |
| Example | 19 | 1 | 1 | 100 | 1 | 25 | 1 | 40 | — | — | 1 | 0.5 | 0.3 | 140 |
| Example | 20 | 1 | 1 | 100 | 1 | 25 | 1 | 40 | — | — | 1 | 10 | 0.3 | 140 |
| Example | 21 | 1 | 1 | 100 | 1 | 25 | 1 | 40 | — | — | 1 | 30 | 0.3 | 140 |
| Example | 22 | 1 | 1 | 100 | 1 | 25 | 1 | 40 | — | — | 1 | 70 | 0.3 | 140 |
| Example | 23 | 1 | 1 | 100 | 1 | 25 | 1 | 40 | 1 | 5 | 1 | 0.5 | 0.3 | 140 |
| Example | 24 | 1 | 1 | 100 | 1 | 25 | 1 | 40 | 1 | 5 | 1 | 10 | 0.3 | 140 |
| Example | 25 | 1 | 1 | 100 | 1 | 25 | 1 | 40 | 1 | 10 | 1 | 10 | 0.3 | 140 |
| Example | 26 | 1 | 1 | 100 | 1 | 25 | 1 | 40 | 1 | 10 | 1 | 30 | 0.3 | 140 |
| Comparative example | 27 | 1 | 1 | 100 | 1 | 25 | 1 | 40 | 1 | 5 | 1 | 10 | 0.005 | 140 |
| Example | 28 | 1 | 1 | 100 | 1 | 25 | 1 | 40 | 1 | 5 | 1 | 10 | 0.01 | 140 |
| Example | 29 | 1 | 1 | 100 | 1 | 25 | 1 | 40 | 1 | 5 | 1 | 10 | 0.1 | 140 |
| Example | 30 | 1 | 1 | 100 | 1 | 25 | 1 | 40 | 1 | 5 | 1 | 10 | 0.6 | 140 |
| Example | 31 | 1 | 1 | 100 | 1 | 25 | 1 | 40 | 1 | 5 | 1 | 10 | 1.0 | 140 |

TABLE 13

| | | Secondary layer | | | | | | | | Performance | | |
|---|---|---|---|---|---|---|---|---|---|---|---|---|
| | | Organic resin | | Rust inhibitor | | Solid lubricant | | | | | | |
| Classification | No. | Kind *8 | Blending quantity *10 | Kind *6 | Blending quantity *10 | Kind *9 | Blending quantity *10 | Coating thickness (μm) | Baking temperature (°C.) | Corrosion resistance | Corrosion resistance after treatment | Weldability | Electrodeposited paint adhesion |
| Example | 17 | 1 | 100 | 1 | 20 | — | — | 1.0 | 140 | ○ | ○ | ⊚ | ⊚ |
| Comparative example | 18 | 1 | 100 | 1 | 20 | — | — | 1.0 | 140 | Δ | Δ | ⊚ | ⊚ |
| Example | 19 | 1 | 100 | 1 | 20 | — | — | 1.0 | 140 | ⊚ | ○ | ⊚ | ⊚ |
| Example | 20 | 1 | 100 | 1 | 20 | — | — | 1.0 | 140 | ⊚ | ○ | ⊚ | ⊚ |
| Example | 21 | 1 | 100 | 1 | 20 | — | — | 1.0 | 140 | ⊚ | ○ | ○ | ⊚ |
| Example | 22 | 1 | 100 | 1 | 20 | — | — | 1.0 | 140 | ○ | ○− | ○ | ⊚ |
| Example | 23 | 1 | 100 | 1 | 20 | — | — | 1.0 | 140 | ⊚ | ○ | ⊚ | ⊚ |
| Example | 24 | 1 | 100 | 1 | 20 | — | — | 1.0 | 140 | ○+ | ○− | ⊚ | ⊚ |
| Example | 25 | 1 | 100 | 1 | 20 | — | — | 1.0 | 140 | ⊚ | ○+ | ⊚ | ⊚ |
| Example | 26 | 1 | 100 | 1 | 20 | — | — | 1.0 | 140 | ⊚ | ○ | ○ | ⊚ |
| Comparative example | 27 | 1 | 100 | 1 | 20 | — | — | 1.0 | 140 | X | X | ⊚ | ⊚ |
| Example | 28 | 1 | 100 | 1 | 20 | — | — | 1.0 | 140 | ○− | ○− | ⊚ | ⊚ |
| Example | 29 | 1 | 100 | 1 | 20 | — | — | 1.0 | 140 | ○ | ○ | ⊚ | ⊚ |
| Example | 30 | 1 | 100 | 1 | 20 | — | — | 1.0 | 140 | ○+ | ○− | ○ | ○ |
| Example | 31 | 1 | 100 | 1 | 20 | — | — | 1.0 | 140 | ○+ | ○− | ○ | ○ |

TABLE 14

| Classification | No. | Plated steel sheet *1 | Primary layer | | | | | | | | | Coating thickness (μm) | Baking temperature (°C.) |
|---|---|---|---|---|---|---|---|---|---|---|---|---|---|
| | | | Water-soluble resin or water-dispersible resin | | Silane coupling agent | | Phosphoric acid or hexafluorometal acid | | Water-soluble phosphate | | Rust inhibitor | | | |
| | | | Kind *2 | Blending quantity *7 | Kind *3 | Blending quantity *7 | Kind *4 | Blending quantity *7 | Kind *5 | Blending quantity *7 | Kind *6 | Blending quantity *7 | | |
| Comparative example | 32 | 1 | 1 | 100 | 1 | 25 | 1 | 40 | 1 | 5 | 1 | 10 | 1.5 | 140 |
| Comparative example | 33 | 1 | 1 | 100 | 1 | 25 | 1 | 40 | 1 | 5 | 1 | 10 | 0.3 | 25 |
| Example | 34 | 1 | 1 | 100 | 1 | 25 | 1 | 40 | 1 | 5 | 1 | 10 | 0.3 | 50 |
| Example | 35 | 1 | 1 | 100 | 1 | 25 | 1 | 40 | 1 | 5 | 1 | 10 | 0.3 | 100 |
| Example | 36 | 1 | 1 | 100 | 1 | 25 | 1 | 40 | 1 | 5 | 1 | 10 | 0.3 | 200 |
| Example | 37 | 2 | 1 | 100 | 1 | 25 | 1 | 40 | 1 | 5 | 1 | 10 | 0.3 | 140 |
| Example | 38 | 3 | 1 | 100 | 1 | 25 | 1 | 40 | 1 | 5 | 1 | 10 | 0.3 | 140 |
| Example | 39 | 4 | 1 | 100 | 1 | 25 | 1 | 40 | 1 | 5 | 1 | 10 | 0.3 | 140 |
| Example | 40 | 5 | 1 | 100 | 1 | 25 | 1 | 40 | 1 | 5 | 1 | 10 | 0.3 | 140 |
| Example | 41 | 6 | 1 | 100 | 1 | 25 | 1 | 40 | 1 | 5 | 1 | 10 | 0.3 | 140 |
| Example | 42 | 7 | 1 | 100 | 1 | 25 | 1 | 40 | 1 | 5 | 1 | 10 | 0.3 | 140 |
| Example | 43 | 8 | 1 | 100 | 1 | 25 | 1 | 40 | 1 | 5 | 1 | 10 | 0.3 | 140 |
| Example | 44 | 9 | 1 | 100 | 1 | 25 | 1 | 40 | 1 | 5 | 1 | 10 | 0.3 | 140 |
| Comparative example | 45 | 1 | 2 | 100 | 1 | 25 | 1 | 40 | 1 | 5 | 1 | 10 | 0.3 | 140 |
| Comparative example | 46 | 1 | 3 | 100 | 1 | 25 | 1 | 40 | 1 | 5 | 1 | 10 | 0.3 | 140 |

TABLE 15

| Classification | No. | Secondary layer | | | | | | | | Performance | | | |
|---|---|---|---|---|---|---|---|---|---|---|---|---|---|
| | | Organic resin | | Rust inhibitor | | Solid lubricant | | Coating thickness (μm) | Baking temperature (°C.) | Corrosion resistance | Corrosion resistance after treatment | Weldability | Electrodeposited paint adhesion |
| | | Kind *8 | Blending quantity *10 | Kind *6 | Blending quantity *10 | Kind *9 | Blending quantity *10 | | | | | | |
| Comparative example | 32 | 1 | 100 | 1 | 20 | — | — | 1.0 | 140 | ◎ | ◎ | X | X |
| Comparative example | 33 | 1 | 100 | 1 | 20 | — | — | 1.0 | 140 | Δ | Δ | ◎ | ◎ |
| Example | 34 | 1 | 100 | 1 | 20 | — | — | 1.0 | 140 | ○− | ○− | ◎ | ◎ |
| Example | 35 | 1 | 100 | 1 | 20 | — | — | 1.0 | 140 | ○ | ○ | ◎ | ◎ |
| Example | 39 | 1 | 100 | 1 | 20 | — | — | 1.0 | 140 | ○− | ○− | ◎ | ◎ |
| Example | 37 | 1 | 100 | 1 | 20 | — | — | 1.0 | 140 | ○+ | ○+ | ○ | ◎ |
| Example | 38 | 1 | 100 | 1 | 20 | — | — | 1.0 | 140 | ○ | ○ | ◎ | ◎ |
| Example | 39 | 1 | 100 | 1 | 20 | — | — | 1.0 | 140 | ◎ | ◎ | ○ | ○ |
| Example | 40 | 1 | 100 | 1 | 20 | — | — | 1.0 | 140 | ◎ | ◎ | ○ | ○ |
| Example | 41 | 1 | 100 | 1 | 20 | — | — | 1.0 | 140 | ◎ | ◎ | ○ | ○ |
| Example | 42 | 1 | 100 | 1 | 20 | — | — | 1.0 | 140 | ◎ | ○+ | ○ | ○ |
| Example | 43 | 1 | 100 | 1 | 20 | — | — | 1.0 | 140 | ◎ | ◎ | ○ | ○ |
| Example | 44 | 1 | 100 | 1 | 20 | — | — | 1.0 | 140 | ◎ | ◎ | ○ | ○ |
| Comparative example | 45 | 1 | 100 | 1 | 20 | — | — | 1.0 | 140 | ○ | ○ | ◎ | ◎ |
| Comparative example | 46 | 1 | 100 | 1 | 20 | — | — | 1.0 | 140 | ○ | ○ | ◎ | ◎ |

TABLE 16

| Classification | No. | Plated steel sheet *1 | Primary layer ||||||||||| Coating thickness (μm) | Baking temperature (°C.) |
| | | | Water-soluble resin or water-dispersible resin || Silane coupling agent || Phosphoric acid or hexafluorometal acid || Water-soluble phosphate || Rust inhibitor || | |
| | | | Kind *2 | Blending quantity *7 | Kind *3 | Blending quantity *7 | Kind *4 | Blending quantity *7 | Kind *5 | Blending quantity *7 | Kind *6 | Blending quantity *7 | | |
|---|---|---|---|---|---|---|---|---|---|---|---|---|---|---|
| Comparative example | 47 | 1 | 4 | 100 | 1 | 25 | 1 | 40 | 1 | 5 | 1 | 10 | 0.3 | 140 |
| Comparative example | 48 | 1 | 5 | 100 | 1 | 25 | 1 | 40 | 1 | 5 | 1 | 10 | 0.3 | 140 |
| Example | 49 | 1 | 1 | 100 | 2 | 25 | 1 | 40 | 1 | 5 | 1 | 10 | 0.3 | 140 |
| Example | 50 | 1 | 1 | 100 | 3 | 25 | 1 | 40 | 1 | 5 | 1 | 10 | 0.3 | 140 |
| Example | 51 | 1 | 1 | 100 | 4 | 25 | 1 | 40 | 1 | 5 | 1 | 10 | 0.3 | 140 |
| Example | 52 | 1 | 1 | 100 | 5 | 25 | 1 | 40 | 1 | 5 | 1 | 10 | 0.3 | 140 |
| Example | 53 | 1 | 1 | 100 | 6 | 25 | 1 | 40 | 1 | 5 | 1 | 10 | 0.3 | 140 |
| Example | 54 | 1 | 1 | 100 | 7 | 25 | 1 | 40 | 1 | 5 | 1 | 10 | 0.3 | 140 |
| Example | 55 | 1 | 1 | 100 | 8 | 25 | 1 | 40 | 1 | 5 | 1 | 10 | 0.3 | 140 |
| Example | 56 | 1 | 1 | 100 | 1 | 25 | 2 | 40 | 1 | 5 | 1 | 10 | 0.3 | 140 |
| Example | 57 | 1 | 1 | 100 | 1 | 25 | 3 | 40 | 1 | 5 | 1 | 10 | 0.3 | 140 |
| Example | 58 | 1 | 1 | 100 | 1 | 25 | 4 | 40 | 1 | 5 | 1 | 10 | 0.3 | 140 |
| Example | 59 | 1 | 1 | 100 | 1 | 25 | 1 | 40 | 2 | 5 | 1 | 10 | 0.3 | 140 |
| Example | 60 | 1 | 1 | 100 | 1 | 25 | 1 | 40 | 3 | 5 | 1 | 10 | 0.3 | 140 |
| Example | 61 | 1 | 1 | 100 | 1 | 25 | 1 | 40 | 4 | 5 | 1 | 10 | 0.3 | 140 |
| Example | 62 | 1 | 1 | 100 | 1 | 25 | 1 | 40 | 1 | 5 | 2 | 10 | 0.3 | 140 |

TABLE 17

| Classification | No. | Secondary layer |||||| Performance ||||
| | | Organic resin || Rust inhibitor || Solid lubricant || Coating thickness (μm) | Baking temperature (°C.) | Corrosion resistance | Corrosion resistance after treatment | Weldability | Electrodeposited paint adhesion |
| | | Kind *8 | Blending quantity *10 | Kind *6 | Blending quantity *10 | Kind *9 | Blending quantity *10 | | | | | | |
|---|---|---|---|---|---|---|---|---|---|---|---|---|---|
| Comparative example | 47 | 1 | 100 | 1 | 20 | — | — | 1.0 | 140 | Δ | Δ | ◯ | ◎ |
| Comparative example | 48 | 1 | 100 | 1 | 20 | — | — | 1.0 | 140 | X | X | ◎ | ◎ |
| Example | 49 | 1 | 100 | 1 | 20 | — | — | 1.0 | 140 | ◎ | ◯+ | ◎ | ◎ |
| Example | 50 | 1 | 100 | 1 | 20 | — | — | 1.0 | 140 | ◯+ | ◯ | ◎ | ◎ |
| Example | 51 | 1 | 100 | 1 | 20 | — | — | 1.0 | 140 | ◯+ | ◯ | ◎ | ◎ |
| Example | 52 | 1 | 100 | 1 | 20 | — | — | 1.0 | 140 | ◯+ | ◯ | ◎ | ◎ |
| Example | 53 | 1 | 100 | 1 | 20 | — | — | 1.0 | 140 | ◯ | ◯− | ◎ | ◎ |
| Example | 54 | 1 | 100 | 1 | 20 | — | — | 1.0 | 140 | ◯ | ◯− | ◎ | ◎ |
| Example | 55 | 1 | 100 | 1 | 20 | — | — | 1.0 | 140 | ◯ | ◯− | ◎ | ◎ |
| Example | 56 | 1 | 100 | 1 | 20 | — | — | 1.0 | 140 | ◎ | ◯+ | ◎ | ◎ |
| Example | 57 | 1 | 100 | 1 | 20 | — | — | 1.0 | 140 | ◎ | ◯+ | ◎ | ◎ |
| Example | 58 | 1 | 100 | 1 | 20 | — | — | 1.0 | 140 | ◎ | ◯+ | ◎ | ◎ |
| Example | 59 | 1 | 100 | 1 | 20 | — | — | 1.0 | 140 | ◎ | ◯+ | ◎ | ◎ |
| Example | 60 | 1 | 100 | 1 | 20 | — | — | 1.0 | 140 | ◎ | ◯+ | ◎ | ◎ |
| Example | 61 | 1 | 100 | 1 | 20 | — | — | 1.0 | 140 | ◎ | ◯+ | ◎ | ◎ |
| Example | 62 | 1 | 100 | 1 | 20 | — | — | 1.0 | 140 | ◎ | ◯+ | ◎ | ◎ |

TABLE 18

| Classification | No. | Plated steel sheet *1 | Primary layer ||||||||||| Coating thickness (μm) | Baking temperature (° C.) |
| | | | Water-soluble resin or water-dispersible resin || Silane coupling agent || Phosphoric acid or hexafluoro-metal acid || Water-soluble phosphate || Rust inhibitor || | |
| | | | Kind *2 | Blending quantity *7 | Kind *3 | Blending quantity *7 | Kind *4 | Blending quantity *7 | Kind *5 | Blending quantity *7 | Kind *6 | Blending quantity *7 | | |
|---|---|---|---|---|---|---|---|---|---|---|---|---|---|---|
| Example | 63 | 1 | 1 | 100 | 1 | 25 | 1 | 40 | 1 | 5 | 3 | 10 | 0.3 | 140 |
| Example | 64 | 1 | 1 | 100 | 1 | 25 | 1 | 40 | 1 | 5 | 4 | 10 | 0.3 | 140 |
| Example | 65 | 1 | 1 | 100 | 1 | 25 | 1 | 40 | 1 | 5 | 5 | 10 | 0.3 | 140 |
| Example | 66 | 1 | 1 | 100 | 1 | 25 | 1 | 40 | 1 | 5 | 6 | 10 | 0.3 | 140 |
| Example | 67 | 1 | 1 | 100 | 1 | 25 | 1 | 40 | 1 | 5 | 1 | 10 | 0.3 | 140 |
| Example | 68 | 1 | 1 | 100 | 1 | 25 | 1 | 40 | 1 | 5 | 1 | 10 | 0.3 | 140 |
| Example | 69 | 1 | 1 | 100 | 1 | 25 | 1 | 40 | 1 | 5 | 1 | 10 | 0.3 | 140 |
| Example | 70 | 1 | 1 | 100 | 1 | 25 | 1 | 40 | 1 | 5 | 1 | 10 | 0.3 | 140 |
| Example | 71 | 1 | 1 | 100 | 1 | 25 | 1 | 40 | 1 | 5 | 1 | 10 | 0.3 | 140 |
| Example | 72 | 1 | 1 | 100 | 1 | 25 | 1 | 40 | 1 | 5 | 1 | 10 | 0.3 | 140 |
| Example | 73 | 1 | 1 | 100 | 1 | 25 | 1 | 40 | 1 | 5 | 1 | 10 | 0.3 | 140 |
| Example | 74 | 1 | 1 | 100 | 1 | 25 | 1 | 40 | 1 | 5 | 1 | 10 | 0.3 | 140 |
| Example | 75 | 1 | 1 | 100 | 1 | 25 | 1 | 40 | 1 | 5 | 1 | 10 | 0.3 | 140 |
| Example | 76 | 1 | 1 | 100 | 1 | 25 | 1 | 40 | 1 | 5 | 1 | 10 | 0.3 | 140 |
| Example | 77 | 1 | 1 | 100 | 1 | 25 | 1 | 40 | 1 | 5 | 1 | 10 | 0.3 | 140 |
| Example | 78 | 1 | 1 | 100 | 1 | 25 | 1 | 40 | 1 | 5 | 1 | 10 | 0.3 | 140 |

TABLE 19

| Classification | No. | Secondary layer |||||| Coating thickness (μm) | Baking temperature (° C.) | Performance ||||
| | | Organic resin || Rust inhibitor || Solid lubricant || | | Corrosion resistance | Corrosion resistance after treatment | Weldability | Electro-deposited paint adhesion |
| | | Kind *8 | Blending quantity *10 | Kind *6 | Blending quantity *10 | Kind *9 | Blending quantity *10 | | | | | | |
|---|---|---|---|---|---|---|---|---|---|---|---|---|---|
| Example | 63 | 1 | 100 | 1 | 20 | — | — | 1.0 | 140 | ⊚ | ○ | ⊚ | ⊚ |
| Example | 64 | 1 | 100 | 1 | 20 | — | — | 1.0 | 140 | ⊚ | ○ | ⊚ | ⊚ |
| Example | 65 | 1 | 100 | 1 | 20 | — | — | 1.0 | 140 | ⊚ | ○ | ⊚ | ⊚ |
| Example | 66 | 1 | 100 | 1 | 20 | — | — | 1.0 | 140 | ⊚ | ○ | ⊚ | ⊚ |
| Example | 67 | 1 | 100 | 1 | 20 | — | — | 1.0 | 140 | ⊚ | ○+ | ⊚ | ⊚ |
| Example | 69 | 2 | 100 | 1 | 20 | — | — | 1.0 | 140 | ⊚ | ○+ | ⊚ | ⊚ |
| Example | 70 | 3 | 100 | 1 | 20 | — | — | 1.0 | 140 | ⊚ | ⊚ | ⊚ | ⊚ |
| Example | 71 | 4 | 100 | 1 | 20 | — | — | 1.0 | 140 | ⊚ | ○ | ⊚ | ⊚ |
| Example | 72 | 5 | 100 | 1 | 20 | — | — | 1.0 | 140 | ⊚ | ○ | ⊚ | ⊚ |
| Example | 73 | 6 | 100 | 1 | 20 | — | — | 1.0 | 140 | ⊚ | ○+ | ⊚ | ⊚ |
| Example | 74 | 7 | 100 | 1 | 20 | — | — | 1.0 | 140 | ⊚ | ○+ | ⊚ | ⊚ |
| Example | 75 | 8 | 100 | 1 | 20 | — | — | 1.0 | 140 | ⊚ | ○+ | ⊚ | ⊚ |
| Example | 76 | 9 | 100 | 1 | 20 | — | — | 1.0 | 140 | ⊚ | ⊚ | ⊚ | ⊚ |
| Example | 77 | 10 | 100 | 1 | 20 | — | — | 1.0 | 140 | ⊚ | ○− | ⊚ | ⊚ |
| Example | 78 | 11 | 100 | 1 | 20 | — | — | 1.0 | 140 | ⊚ | ○− | ⊚ | ⊚ |

TABLE 20

| Classification | No. | Plated steel sheet *1 | Primary layer ||||||||||| Coating thickness (μm) | Baking temperature (° C.) |
| | | | Water-soluble resin or water-dispersible resin || Silane coupling agent || Phosphoric acid or hexafluoro-metal acid || Water-soluble phosphate || Rust inhibitor || | |
| | | | Kind *2 | Blending quantity *7 | Kind *3 | Blending quantity *7 | Kind *4 | Blending quantity *7 | Kind *5 | Blending quantity *7 | Kind *6 | Blending quantity *7 | | |
|---|---|---|---|---|---|---|---|---|---|---|---|---|---|---|
| Example | 79 | 1 | 1 | 100 | 1 | 25 | 1 | 40 | 1 | 5 | 1 | 10 | 0.3 | 140 |
| Compar- | 80 | 1 | 1 | 100 | 1 | 25 | 1 | 40 | 1 | 5 | 1 | 10 | 0.3 | 140 |

TABLE 20-continued

| | | | Primary layer | | | | | | | | | | |
|---|---|---|---|---|---|---|---|---|---|---|---|---|---|
| | | Plated | Water-soluble resin or water-dispersible resin | | Silane coupling agent | | Phosphoric acid or hexafluoro-metal acid | | Water-soluble phosphate | | Rust inhibitor | | Coating thickness (μm) | Baking temperature (°C.) |
| Classification | No. | steel sheet *1 | Kind *2 | Blending quantity *7 | Kind *3 | Blending quantity *7 | Kind *4 | Blending quantity *7 | Kind *5 | Blending quantity *7 | Kind *6 | Blending quantity *7 | | |
| Comparative example | 81 | 1 | 1 | 100 | 1 | 25 | 1 | 40 | 1 | 5 | 1 | 10 | 0.3 | 140 |
| Comparative example | 82 | 1 | 1 | 100 | 1 | 25 | 1 | 40 | 1 | 5 | 1 | 10 | 0.3 | 140 |
| Example | 83 | 1 | 1 | 100 | 1 | 25 | 1 | 40 | 1 | 5 | 1 | 10 | 0.3 | 140 |
| Example | 84 | 1 | 1 | 100 | 1 | 25 | 1 | 40 | 1 | 5 | 1 | 10 | 0.3 | 140 |
| Example | 85 | 1 | 1 | 100 | 1 | 25 | 1 | 40 | 1 | 5 | 1 | 10 | 0.3 | 140 |
| Comparative example | 86 | 1 | 1 | 100 | 1 | 25 | 1 | 40 | 1 | 5 | 1 | 10 | 0.3 | 140 |
| Example | 87 | 1 | 1 | 100 | 1 | 25 | 1 | 1 | 1 | 5 | 1 | 10 | 0.3 | 140 |
| Comparative example | 88 | 1 | 1 | 100 | 1 | 25 | 1 | 5 | 1 | 5 | 1 | 10 | 0.3 | 140 |
| Comparative example | 89 | 1 | 1 | 100 | 1 | 25 | 1 | 20 | 1 | 5 | 1 | 10 | 0.3 | 140 |
| Comparative example | 90 | 1 | 1 | 100 | 1 | 25 | 1 | 40 | 1 | 5 | 1 | 10 | 0.3 | 140 |
| Example | 91 | 1 | 1 | 100 | 1 | 25 | 1 | 100 | 1 | 5 | 1 | 10 | 0.3 | 140 |

TABLE 21

| | | Secondary layer | | | | | | | | Performance | | | |
|---|---|---|---|---|---|---|---|---|---|---|---|---|---|
| | | Organic resin | | Rust inhibitor | | Solid lubricant | | Coating | | | Corrosion | | |
| Classification | No. | Kind *8 | Blending quantity *10 | Kind *6 | Blending quantity *10 | Kind *9 | Blending quantity *10 | thickness (μm) | Baking temperature (°C.) | Corrosion resistance | resistance after treatment | Weldability | Electrodeposited paint adhesion |
| Example | 79 | 12 | 100 | 1 | 20 | — | — | 1.0 | 140 | ◉ | ○ | ◉ | ◉ |
| Comparative example | 80 | 13 | 100 | 1 | 20 | — | — | 1.0 | 140 | ○ | X | ◉ | ◉ |
| Comparative example | 81 | 14 | 100 | 1 | 20 | — | — | 1.0 | 140 | ○ | X | ◉ | ◉ |
| Comparative example | 82 | 15 | 100 | 1 | 20 | — | — | 1.0 | 140 | ○ | X | ◉ | ◉ |
| Example | 83 | 16 | 100 | 1 | 20 | — | — | 1.0 | 140 | ◉ | ◉ | ◉ | ◉ |
| Example | 84 | 17 | 100 | 1 | 20 | — | — | 1.0 | 140 | ◉ | ◉ | ◉ | ◉ |
| Example | 85 | 18 | 100 | 1 | 20 | — | — | 1.0 | 140 | ◉ | ◉ | ◉ | ◉ |
| Comparative example | 86 | 19 | 100 | 1 | 20 | — | — | 1.0 | 140 | ○ | Δ | ◉ | ◉ |
| Example | 87 | 20 | 100 | 1 | 20 | — | — | 1.0 | 140 | ◉ | ○+ | ◉ | ◉ |
| Comparative example | 88 | 21 | 100 | 1 | 20 | — | — | 1.0 | 140 | Δ | X | ◉ | ◉ |
| Comparative example | 89 | 22 | 100 | 1 | 20 | — | — | 1.0 | 140 | Δ | Δ | ◉ | ◉ |
| Comparative example | 90 | 23 | 100 | 1 | 20 | — | — | 1.0 | 140 | Δ | Δ | ◉ | ◉ |
| Example | 91 | 1 | 100 | 2 | 20 | — | — | 1.0 | 140 | ◉ | ○ | ◉ | ◉ |

TABLE 22

| | | Plated steel sheet *1 | Primary layer | | | | | | | | | Coating thickness (μm) | Baking temperature (° C.) |
|---|---|---|---|---|---|---|---|---|---|---|---|---|---|
| | | | Water-soluble resin or water-dispersible resin | | Silane coupling agent | | Phosphoric acid or hexafluoro-metal acid | | Water-soluble phosphate | | Rust inhibitor | | | |
| Classification | No. | | Kind *2 | Blending quantity *7 | Kind *3 | Blending quantity *7 | Kind *4 | Blending quantity *7 | Kind *5 | Blending quantity *7 | Kind *6 | Blending quantity *7 | | |
| Example | 92 | 1 | 1 | 100 | 1 | 25 | 1 | 40 | 1 | 5 | 1 | 10 | 0.3 | 140 |
| Example | 93 | 1 | 1 | 100 | 1 | 25 | 1 | 40 | 1 | 5 | 1 | 10 | 0.3 | 140 |
| Example | 94 | 1 | 1 | 100 | 1 | 25 | 1 | 40 | 1 | 5 | 1 | 10 | 0.3 | 140 |
| Example | 95 | 1 | 1 | 100 | 1 | 25 | 1 | 40 | 1 | 5 | 1 | 10 | 0.3 | 140 |
| Example | 96 | 1 | 1 | 100 | 1 | 25 | 1 | 40 | 1 | 5 | 1 | 10 | 0.3 | 140 |
| Example | 97 | 1 | 1 | 100 | 1 | 25 | 1 | 40 | 1 | 5 | 1 | 10 | 0.3 | 140 |
| Example | 98 | 1 | 1 | 100 | 1 | 25 | 1 | 40 | 1 | 5 | 1 | 10 | 0.3 | 140 |
| Example | 99 | 1 | 1 | 100 | 1 | 25 | 1 | 40 | 1 | 5 | 1 | 10 | 0.3 | 140 |
| Example | 100 | 1 | 1 | 100 | 1 | 25 | 1 | 40 | 1 | 5 | 1 | 10 | 0.3 | 140 |
| Example | 101 | 1 | 1 | 100 | 1 | 25 | 1 | 40 | 1 | 5 | 1 | 10 | 0.3 | 140 |
| Example | 102 | 1 | 1 | 100 | 1 | 25 | 1 | 40 | 1 | 5 | 1 | 10 | 0.3 | 140 |
| Example | 103 | 1 | 1 | 100 | 1 | 25 | 1 | 40 | 1 | 5 | 1 | 10 | 0.3 | 140 |

TABLE 23

| | | Secondary layer | | | | | | | Performance | | | |
|---|---|---|---|---|---|---|---|---|---|---|---|---|
| | | Organic resin | | Rust inhibitor | | Solid lubricant | | Coating thickness (μm) | Baking temperature (° C.) | Corrosion resistance | Corrosion resistance after treatment | Weldability | Electro-deposited paint adhesion |
| Classification | No. | Kind *8 | Blending quantity *10 | Kind *6 | Blending quantity *10 | Kind *9 | Blending quantity *10 | | | | | | |
| Example | 92 | 1 | 100 | 3 | 20 | — | — | 1.0 | 140 | ⊚ | ○ | ⊚ | ⊚ |
| Example | 93 | 1 | 100 | 4 | 20 | — | — | 1.0 | 140 | ⊚ | ○ | ⊚ | ⊚ |
| Example | 94 | 1 | 100 | 5 | 20 | — | — | 1.0 | 140 | ⊚ | ○ | ⊚ | ⊚ |
| Example | 95 | 1 | 100 | 6 | 20 | — | — | 1.0 | 140 | ○ | ○− | ⊚ | ⊚ |
| Example | 96 | 1 | 100 | 1 + 4 | 10 + 10 | — | — | 1.0 | 140 | ⊚ | ○+ | ⊚ | ⊚ |
| Example | 97 | 1 | 100 | 1 + 5 | 20 + 10 | — | — | 1.0 | 140 | ⊚ | ○+ | ⊚ | ⊚ |
| Example | 98 | 1 | 100 | 1 + 6 | 20 + 10 | — | — | 1.0 | 140 | ⊚ | ○+ | ⊚ | ⊚ |
| Example | 99 | 1 | 100 | 1 + 4 + 6 | 10 + 7 + 3 | — | — | 1.0 | 140 | ⊚ | ○+ | ⊚ | ⊚ |
| Example | 100 | 1 | 100 | 1 + 5 + 6 | 10 + 7 + 3 | — | — | 1.0 | 140 | ⊚ | ○+ | ⊚ | ⊚ |
| Example | 101 | 1 | 100 | 4 + 5 + 6 | 9 + 8 + 3 | — | — | 1.0 | 140 | ⊚ | ○+ | ⊚ | ⊚ |
| Example | 102 | 1 | 100 | — | — | — | — | 1.0 | 140 | ○ | ○− | ⊚ | ⊚ |
| Example | 103 | 1 | 100 | 1 | 1 | — | — | 1.0 | 140 | ○ | ○− | ⊚ | ⊚ |

TABLE 24

| | | Plated steel sheet *1 | Primary layer | | | | | | | | | Coating thickness (μm) | Baking temperature (° C.) |
|---|---|---|---|---|---|---|---|---|---|---|---|---|---|
| | | | Water-soluble resin or water-dispersible resin | | Silane coupling agent | | Phosphoric acid or hexafluoro-metal acid | | Water-soluble phosphate | | Rust inhibitor | | | |
| Classification | No. | | Kind *2 | Blending quantity *7 | Kind *3 | Blending quantity *7 | Kind *4 | Blending quantity *7 | Kind *5 | Blending quantity *7 | Kind *6 | Blending quantity *7 | | |
| Example | 104 | 1 | 1 | 100 | 1 | 25 | 1 | 40 | 1 | 5 | 1 | 10 | 0.3 | 140 |
| Example | 105 | 1 | 1 | 100 | 1 | 25 | 1 | 40 | 1 | 5 | 1 | 10 | 0.3 | 140 |
| Example | 106 | 1 | 1 | 100 | 1 | 25 | 1 | 40 | 1 | 5 | 1 | 10 | 0.3 | 140 |
| Example | 107 | 1 | 1 | 100 | 1 | 25 | 1 | 40 | 1 | 5 | 1 | 10 | 0.3 | 140 |
| Example | 108 | 1 | 1 | 100 | 1 | 25 | 1 | 40 | 1 | 5 | 1 | 10 | 0.3 | 140 |

TABLE 24-continued

| | | Plated steel sheet *1 | Primary layer | | | | | | | | | | |
|---|---|---|---|---|---|---|---|---|---|---|---|---|---|
| | | | Water-soluble resin or water-dispersible resin | | Silane coupling agent | | Phosphoric acid or hexafluoro-metal acid | | Water-soluble phosphate | | Rust inhibitor | | Coating thickness (μm) | Baking temperature (° C.) |
| Classification | No. | | Kind *2 | Blending quantity *7 | Kind *3 | Blending quantity *7 | Kind *4 | Blending quantity *7 | Kind *5 | Blending quantity *7 | Kind *6 | Blending quantity *7 | | |
| Comparative example | 109 | 1 | 1 | 100 | 1 | 25 | 1 | 40 | 1 | 5 | 1 | 10 | 0.3 | 140 |
| Comparative example | 110 | 1 | 1 | 100 | 1 | 25 | 1 | 40 | 1 | 5 | 1 | 10 | 0.3 | 140 |
| Example | 111 | 1 | 1 | 100 | 1 | 25 | 1 | 40 | 1 | 5 | 1 | 10 | 0.3 | 140 |
| Example | 112 | 1 | 1 | 100 | 1 | 25 | 1 | 40 | 1 | 5 | 1 | 10 | 0.3 | 140 |
| Comparative example | 113 | 1 | 1 | 100 | 1 | 25 | 1 | 40 | 1 | 5 | 1 | 10 | 0.3 | 140 |
| Comparative example | 114 | 1 | 1 | 100 | 1 | 25 | 1 | 40 | 1 | 5 | 1 | 10 | 0.3 | 140 |
| Example | 115 | 1 | 1 | 100 | 1 | 25 | 1 | 40 | 1 | 5 | 1 | 10 | 0.3 | 140 |
| Example | 116 | 1 | 1 | 100 | 1 | 25 | 1 | 40 | 1 | 5 | 1 | 10 | 0.3 | 140 |
| Example | 117 | 1 | 1 | 100 | 1 | 25 | 1 | 40 | 1 | 5 | — | — | 0.3 | 140 |

TABLE 25

| | | Secondary layer | | | | | | | Performance | | | |
|---|---|---|---|---|---|---|---|---|---|---|---|---|
| | | Organic resin | | Rust inhibitor | | Solid lubricant | | Coating thickness (μm) | Baking temperature (° C.) | Corrosion resistance | Corrosion resistance after treatment | Weldability | Electro-deposited paint adhesion |
| Classification | No. | Kind *8 | Blending quantity *10 | Kind *6 | Blending quantity *10 | Kind *9 | Blending quantity *10 | | | | | | |
| Example | 104 | 1 | 100 | 1 | 50 | — | — | 1.0 | 140 | ◎ | ○ | ○ | ◎ |
| Example | 105 | 1 | 100 | 1 | 30 | — | — | 1.0 | 140 | ◎ | ○+ | ○ | ◎ |
| Example | 106 | 1 | 100 | 1 | 20 | 1 | 5 | 1.0 | 140 | ◎ | ◎ | ◎ | ◎ |
| Example | 107 | 1 | 100 | 1 | 20 | 2 | 5 | 1.0 | 140 | ◎ | ◎ | ◎ | ◎ |
| Example | 108 | 1 | 100 | 1 | 20 | 3 | 5 | 1.0 | 140 | ◎ | ◎ | ◎ | ◎ |
| Comparative example | 109 | — | — | — | — | — | — | — | — | X | X | ◎ | ◎ |
| Comparative example | 110 | 1 | 100 | 1 | 20 | 1 | 5 | 0.1 | 140 | Δ | Δ | ○ | ◎ |
| Example | 111 | 1 | 100 | 1 | 20 | 1 | 5 | 0.3 | 140 | ○ | ○ | ○ | ◎ |
| Example | 112 | 1 | 100 | 1 | 20 | 1 | 5 | 2.0 | 140 | ◎ | ◎ | ○ | ○ |
| Comparative example | 113 | 1 | 100 | 1 | 20 | 1 | 5 | 3.0 | 140 | ◎ | ○ | X | X |
| Comparative example | 114 | 1 | 100※ | 1 | 20 | 1 | 5 | 7.0 | 140 | ◎ | X | ○ | ○ |
| Example | 115 | 1 | 100 | 1 | 20 | 2 | 5 | 1.0 | 110 | ◎ | ○+ | ◎ | ◎ |
| Example | 116 | 1 | 100 | 1 | 20 | 2 | 5 | 1.0 | 200 | ○ | ○ | ◎ | ◎ |
| Example | 117 | 1 | 100 | 1 | 20 | 2 | 5 | 1.0 | 140 | ◎ | ◎ | ◎ | ◎ |

※As the conductive agent, 80 parts by mass of iron phosphide is added to 100 parts by mass of the solid matter in the resin composition.

Example 2

The surface treatment coating compositions for forming the primary coating were prepared using the respective resin compositions of water-soluble or water-dispersible epoxy resins shown in Table 26 or using the respective water dispersed polyurethane resines shown in Table 27, adding appropriately the respective silane coupling agents (Table 3), the phosphoric acid or hexafluorometal acids (Table 4), the water-soluble phosphates (Table 5), and non-chromium based rust inhibitors (Table 6), which were used in [Example 1]. The pH of the mixture was agitated to a range from 0.5 to 6 using ammonia water, nitric acid, acetic acid, sulfuric acid, phosphoric acid, hexafluorometal acid, and the like. Then, the mixture was agitated using a disperser for coating (sand-grinder) for a specified time to prepare the respective surface treatment coating compositions.

The water-soluble or water-dispersible epoxy resins shown in Table 26 were prepared by the following procedure.

Manufacture Example 1

To a four-neck flask equipped with a thermometer, an agitator, and a cooling tube, 787.4 g of Epicoat 1007 (an epoxy resin having epoxy equivalent of 2000; manufactured by Shell Japan Ltd.), and 425 g of propyleneglycol monobutylether were added. The mixture was agitated at 110° C. to bring the mixture homogeneous and transparent. Then, the mixture was cooled to 100° C. After that, 20.7 g of diethanolamine was added to the mixture to conduct reaction for 1 hour. The epoxy amine value of the reacted mixture was determined to confirm that the observed value agreed with the theoretical value. Then, 16.5 g of 3-amino-1,2,4-tolyazole (molecular weight of 84) was added to the mixture to conduct reaction for 5 hours. After that, 250 g of propyleneglycol monobutylether was added to the mixture to obtain the modified epoxy resin (D1). A 23.3 g of phosphoric acid was added to the (D1) modified epoxy resin, and water was dropped thereto to mix them together, thus obtained the water-epoxy resin dispersion (E1) with solid matter content of 20%.

Manufacture Example 2

To a four-neck flask equipped with a thermometer, an agitator, and a cooling tube, 546 g of Epicoat 1004 (an epoxy resin having epoxy equivalent of 925; manufactured by Shell Japan Ltd.), and 311 g of propyleneglycol monobutylether were added. The mixture was agitated at 110° C. to bring the mixture homogeneous and transparent. Then, the mixture was cooled to 100° C. After that, 31.5 g of diethanolamine was added to the mixture to conduct reaction for 1 hour. The epoxy amine value of the reacted mixture was determined to confirm that the observed value agreed with the theoretical value. Then, 25.2 g of 3-amino-1,2,4-tolyazole (molecular weight of 84) was added to the mixture to conduct reaction for 5 hours. After that, 182.6 g of propyleneglycol monobutylether was added to the mixture to obtain the modified epoxy resin (D2). A 35.3 g of phosphoric acid was added to the (D2) modified epoxy resin, and water was dropped thereto to mix them together, thus obtained the water-epoxy resin dispersion (E2) with solid matter content of 20%.

Manufacture Example 3

The reaction similar with that in Manufacture Example 1 was conducted except for changing the quantity of diethanolamine to 12.4 g, and the quantity of 3-amino-1,2,4-tolyazole to 23.1 g, thus obtained the modified epoxy-resin. The modified epoxy resin was mixed with water to obtain the water-epoxy resin dispersion (E3) with solid matter content of 20%.

Manufacture Example 4

Comparative Example

To a four-neck flask equipped with a thermometer, an agitator, and a cooling tube, 186.6 g of Epicoat 1001 (an epoxy resin having epoxy equivalent of about 475 and number average molecular weight of about 900; manufactured by Japan Epoxy Resins Co., Ltd.), and 115.2 g of propyleneglycol monobutylether were charged. The mixture was heated to 110° C. to agitate to establish a homogeneous and transparent state. The mixture was cooled to 100° C. Then, 25.5 g of diethanolamine was added to the mixture to hold at 100° C. for 1 hour. After that, 68.0 g of propyleneglycol monobutylether was added to the mixture to obtain the modified epoxy resin solution (D4). A 23.3 g of phosphoric acid was added to the (D4) modified epoxy resin solution, and water was dropped into the solution to mix them together, thus obtained the water-epoxy resin dispersion (E4) with solid matter content of 20%.

Manufacture Example 5

Comparative Example

The reaction similar with that in Manufacture Example 1 was conducted except for changing 16.5 g of 3-amino-1,2,4-tolyazole to 14.7 g of N-methyl-ethanolamine, thus obtained the modified epoxy resin (D5). The (D5) modified epoxy resin was mixed with water to obtain the water-epoxy resin dispersion (E5) with solid matter content of 20%.

The surface treatment coating compositions for forming the secondary coating were prepared using the respective resin compositions shown in Table 7 and Table 8 similar with the case of [Example 1], adding appropriately the respective non-chromium based rust inhibitors (Table 6) and solid lubricants (Table 9), silane coupling agents (Table 3) used in [Example 1]. The mixture was agitated using a disperser for coating (sand-grinder) for a specified time to prepare the surface treatment coating composition. The method for synthesizing the base resins (reaction products) of the resin composition given in Table 7 and Table 8 was the same as that described in [Example 1].

As the treating base sheets, the plated steel sheets given in Table 1, which are the plated steel sheets with cold-rolled steel sheets as the base sheets were adopted. The plated steel sheets are for household electric appliances, building materials, and automobile parts. The thickness of the steel sheets was selected responding to the objectives of evaluations. After alkali degreasing, washing with water, and drying on the surface of the plated steel sheets, the above-described respective surface treatment coating compositions for forming the primary coating were applied using a roll coater, and then the compositions were heated to dry at various temperatures. The coating thickness was adjusted by the solid matter content (heating residue) of the surface treatment coating composition or by the application conditions (roll pressing force, rotational speed, and the like).

Then, the respective coating compositions for forming the secondary coating were applied using a roll coater, and were heated to dry at various temperatures. The coating thickness was adjusted by the solid matter content (heating residue) of the surface treatment coating composition or by the application conditions (roll pressing force, rotational speed, and the like).

Tables 28 through 43 show the result of evaluation of thus prepared surface-treated steel sheets in terms of coating composition and quality performance (corrosion resistance, corrosion resistance after forming, weldability, and electrodeposited paint adhesion). The evaluation of quality was given in the following procedure.

(1) Corrosion Resistance

Each sample was degreased by FC-4460 (manufactured by Japan Parkerizing Co., Ltd.) under the condition of 60° C. for 2 minutes. Then, the sample was subjected to the following-given combined cycle test (CCT) to evaluate the corrosion resistance based on the area percentage of white rust generation and the area percentage of red rust generation after 50 cycles.

Salt spraying (per JIS Z2371): 4 hours
↓
Drying (60° C.): 2 hours
↓
Wetting (50° C., 95% RH): 2 hours
The evaluation criterion is the following.
◎: less than 5% of the area percentage of white rust generation
○+: 5% or more and less than 10% of the area percentage of white rust generation
○: 10% or more and less than 30% of the area percentage of white rust generation
○−: 30% or more of the area percentage of white rust generation, without red rust generation
Δ: with red rust generation, less than 10% of area percentage of red rust generation
X: 10% or more of area percentage of red rust generation
(2) Corrosion Resistance after Forming
Each sample was subjected to deformation and sliding with a draw-bead under the condition given below. Thus treated sample was degreased by FC-4460 (manufactured by Japan Parkerizing Co., Ltd.) under the condition of 60° C. for 2 minutes. Then, the sample was treated by CCT given in the "(1) Corrosion resistance" to evaluate the corrosion resistance after forming based on the area percentage of white rust generation and the area percentage of red rust generation after 36 cycles.
Pressing load: 800 kgf
Draw-out speed: 1000 mm/min
Bead shoulder R: 2 mm on male side, 3 mm on female side
Penetration depth: 7 mm
Oil: Pleton R-352L; manufactured by Sugimura Chemical Industry, Co., Ltd.
The evaluation criterion is the following.
◎: less than 5% of the area percentage of white rust generation
○+: 5% or more and less than 10% of the area percentage of white rust generation
○: 10% or more and less than 30% of the area percentage of white rust generation
○−: 30% or more of the area percentage of white rust generation, without red rust generation
Δ: with red rust generation, less than 10% of area percentage of red rust generation
X: 10% or more of area percentage of red rust generation
(3) Weldability
The weldability was evaluated under the same test condition and with the same evaluation criterion with those of [Example 1].
(4) Electrodeposited Paint Adhesion The electrodeposited paint adhesion was evaluated under the same test condition and with the same evaluation criterion with those of [Example 1].

TABLE 26

| No. | Water-epoxy resin dispersion |
|---|---|
| 1 | E1 of (Manufacture Example 1) given in the description |
| 2 | E2 of (Manufacture Example 2) given in the description |
| 3 | E3 of (Manufacture Example 3) given in the description |
| 4 | E4 of (Manufacture Example 4) given in the description |
| 5 | E5 of (Manufacture Example 5) given in the description |

TABLE 27

| No. | Water dispersed polyurethane resine (Product name) | Ionicity |
|---|---|---|
| 1 | UCoat UX-2505, manufactured by Sanyo Chemical Industries, Ltd. | Nonion |
| 2 | Superflex E2500, manufactured by Dai-ichi Kogyo Seiyaku Co., Ltd. | Nonion |
| 3 | Adekabontighter UX206, manufactured by Asahi Denka Kogyo K.K. | Nonion |
| 4 | Takerac W-635, manufactured by Mitsui Takeda Chemicals, Inc. | Nonion |
| 5 | Superflex 600, manufactured by Dai-ichi Kogyo Seiyaku Co., Ltd. | Cation |
| 6 | Permarin UC-20, manufactured by Sanyo Chemical Industries, Ltd. | Cation |

Symbols *1 through *10 found in Tables 28 through 43 designate the following, respectively.
*1: No. given in Table 1, (plated steel sheet)
*2: No. given in Table 26, (water-soluble or water-dispersibel epoxy resin)
*3: No. given in Table 27, (water dispersed polyurethane resine)
*4: No. given in Table 3, (silane coupling agent)
*5: No. given in Table 4, (phosphoric acid or hexafluorometal acid)
*6: No. given in Table 5, (water-soluble phosphate)
*7: No. given in Table 6, (rust inhibitor)
*8: Parts by mass, (for the ingredients other than water-soluble or water-dispersible epoxy resin, parts by mass to 100 parts by mass of the solid matter in the water-soluble or water-dispersible epoxy resin)
*9: No. given in Table 7 and Table 8, (resin composition)
*10: No. given in Table 9, (solid lubricant)
*11: Parts by mass, (for the ingredients other than organic resin, parts by mass to 100 parts by mass of the solid matter in the organic resin)

TABLE 28

| | | | Primary layer | | | | | | | |
|---|---|---|---|---|---|---|---|---|---|---|
| | | Plated steel sheet | Water-soluble resin or water-dispersible resin | | Water dispersed polyurethane resine | | Silane coupling agent | | Phosphoric acid or hexafluorometal acid | |
| Classification | No. | *1 | Kind *2 | Blending quantity *8 | Kind *3 | Blending quantity *8 | Kind *4 | Blending quantity *8 | Kind *5 | Blending quantity *8 |
| Comparative example | 1 | 1 | — | 50 | — | — | 1 | 25 | 1 | 40 |
| Comparative example | 2 | 1 | 1 | 50 | 1 | 50 | — | — | 1 | 40 |
| Example | 3 | 1 | 1 | 50 | 1 | 50 | 1 | 5 | 1 | 40 |
| Example | 4 | 1 | 1 | 50 | 1 | 50 | 1 | 15 | 1 | 40 |
| Example | 5 | 1 | 1 | 50 | 1 | 50 | 1 | 50 | 1 | 40 |

TABLE 28-continued

| | | | | | | | | | | |
|---|---|---|---|---|---|---|---|---|---|---|
| Example | 6 | 1 | 1 | 50 | 1 | 50 | 1 | 100 | 1 | 40 |
| Comparative example | 7 | 1 | 1 | 50 | 1 | 50 | 1 | 500 | 1 | 40 |
| Comparative example | 8 | 1 | 1 | 50 | 1 | 50 | 1 | 25 | — | — |
| Example | 9 | 1 | 1 | 50 | 1 | 50 | 1 | 25 | 1 | 1 |
| Example | 10 | 1 | 1 | 50 | 1 | 50 | 1 | 25 | 1 | 5 |
| Example | 11 | 1 | 1 | 50 | 1 | 50 | 1 | 25 | 1 | 20 |
| Example | 12 | 1 | 1 | 50 | 1 | 50 | 1 | 25 | 1 | 40 |
| Comparative example | 13 | 1 | 1 | 50 | 1 | 50 | 1 | 25 | 1 | 100 |
| Comparative example | 14 | 1 | 1 | 100 | — | — | 1 | 25 | 1 | 40 |
| Example | 15 | 1 | 1 | 90 | 1 | 10 | 1 | 25 | 1 | 40 |
| Example | 16 | 1 | 1 | 70 | 1 | 30 | 1 | 25 | 1 | 40 |
| Example | 17 | 1 | 1 | 30 | 1 | 70 | 1 | 25 | 1 | 40 |
| Example | 18 | 1 | 1 | 10 | 1 | 90 | 1 | 25 | 1 | 40 |
| Comparative example | 19 | 1 | — | — | 1 | 100 | 1 | 25 | 1 | 40 |

| | | Primary layer | | | | | |
|---|---|---|---|---|---|---|---|
| | | Water-soluble phosphate | | Rust inhibitor | | Coating thickness (μm) | Baking temperature (° C.) |
| Classification | No. | Kind *6 | Blending quantity *8 | Kind *7 | Blending quantity *8 | | |
| Comparative example | 1 | — | — | — | — | 0.3 | 140 |
| Comparative example | 2 | — | — | — | — | 0.3 | 140 |
| Example | 3 | — | — | — | — | 0.3 | 140 |
| Example | 4 | — | — | — | — | 0.3 | 140 |
| Example | 5 | — | — | — | — | 0.3 | 140 |
| Example | 6 | — | — | — | — | 0.3 | 140 |
| Comparative example | 7 | — | — | — | — | 0.3 | 140 |
| Comparative example | 8 | — | — | — | — | 0.3 | 140 |
| Example | 9 | — | — | — | — | 0.3 | 140 |
| Example | 10 | — | — | — | — | 0.3 | 140 |
| Example | 11 | — | — | — | — | 0.3 | 140 |
| Example | 12 | — | — | — | — | 0.3 | 140 |
| Comparative example | 13 | — | — | — | — | 0.3 | 140 |
| Comparative example | 14 | — | — | — | — | 0.3 | 140 |
| Example | 15 | — | — | — | — | 0.3 | 140 |
| Example | 16 | — | — | — | — | 0.3 | 140 |
| Example | 17 | — | — | — | — | 0.3 | 140 |
| Example | 18 | — | — | — | — | 0.3 | 140 |
| Comparative example | 19 | — | — | — | — | 0.3 | 140 |

TABLE 29

| | | Secondary layer | | | | | | | Performance | | | |
|---|---|---|---|---|---|---|---|---|---|---|---|---|
| | | Organic resin | | Rust inhibitor | | Solid lubricant | | Coating | | | Corrosion | | |
| Classification | No. | Kind *9 | Blending quantity *11 | Kind *7 | Blending quantity *11 | Kind *10 | Blending quantity *11 | thickness (μm) | Baking temperature (° C.) | Corrosion resistance | resistance after treatment | Weldability | Electro-deposited paint adhesion |
| Comparative example | 1 | 1 | 100 | 1 | 20 | — | — | 1.0 | 140 | X | X | ⊚ | ⊚ |
| Comparative example | 2 | 1 | 100 | 1 | 20 | — | — | 1.0 | 140 | Δ | X | ⊚ | ⊚ |
| Example | 3 | 1 | 100 | 1 | 20 | — | — | 1.0 | 140 | ○ | ○ | ⊚ | ⊚ |
| Example | 4 | 1 | 100 | 1 | 20 | — | — | 1.0 | 140 | ○ | ○ | ⊚ | ⊚ |
| Example | 5 | 1 | 100 | 1 | 20 | — | — | 1.0 | 140 | ○ | ○ | ⊚ | ⊚ |
| Example | 6 | 1 | 100 | 1 | 20 | — | — | 1.0 | 140 | ○ | ○ | ⊚ | ⊚ |
| Comparative example | 7 | 1 | 100 | 1 | 20 | — | — | 1.0 | 140 | Δ | X | ○ | ○ |

TABLE 29-continued

| | | Secondary layer | | | | | | | Performance | | | |
|---|---|---|---|---|---|---|---|---|---|---|---|---|
| | | Organic resin | | Rust inhibitor | | Solid lubricant | | Coating | | Corrosion | | |
| Classification | No. | Kind *9 | Blending quantity *11 | Kind *7 | Blending quantity *11 | Kind *10 | Blending quantity *11 | thickness (μm) | Baking temperature (° C.) | Corrosion resistance | resistance after treatment | Weldability | Electrodeposited paint adhesion |
| Comparative example | 8 | 1 | 100 | 1 | 20 | — | — | 1.0 | 140 | X | X | ⊚ | ⊚ |
| Example | 9 | 1 | 100 | 1 | 20 | — | — | 1.0 | 140 | ○ | ○ | ⊚ | ⊚ |
| Example | 10 | 1 | 100 | 1 | 20 | — | — | 1.0 | 140 | ○ | ○ | ⊚ | ⊚ |
| Example | 11 | 1 | 100 | 1 | 20 | — | — | 1.0 | 140 | ○ | ○ | ⊚ | ⊚ |
| Example | 12 | 1 | 100 | 1 | 20 | — | — | 1.0 | 140 | ○ | ○ | ⊚ | ⊚ |
| Comparative example | 13 | 1 | 100 | 1 | 20 | — | — | 1.0 | 140 | Δ | X | ⊚ | ⊚ |
| Comparative example | 14 | 1 | 100 | 1 | 20 | — | — | 1.0 | 140 | ○ | Δ | ⊚ | ⊚ |
| Example | 15 | 1 | 100 | 1 | 20 | — | — | 1.0 | 140 | ○ | ○ | ⊚ | ⊚ |
| Example | 16 | 1 | 100 | 1 | 20 | — | — | 1.0 | 140 | ○ | ○ | ⊚ | ⊚ |
| Example | 17 | 1 | 100 | 1 | 20 | — | — | 1.0 | 140 | ○ | ○ | ⊚ | ⊚ |
| Example | 18 | 1 | 100 | 1 | 20 | — | — | 1.0 | 140 | ○ | ○ | ⊚ | ⊚ |
| Comparative example | 19 | 1 | 100 | 1 | 20 | — | — | 1.0 | 140 | Δ | Δ | ⊚ | ⊚ |

TABLE 30

| | | Primary layer | | | | | | | | | |
|---|---|---|---|---|---|---|---|---|---|---|---|
| | | Plated steel sheet *1 | Water-soluble resin or water-dispersible resin | | Water dispersed polyurethane resine | | Silane coupling agent | | Phosphoric acid or hexafluorometal acid | | |
| Classification | No. | | Kind *2 | Blending quantity *8 | Kind *3 | Blending quantity *8 | Kind *4 | Blending quantity *8 | Kind *5 | Blending quantity *8 | |
| Example | 20 | 1 | 1 | 50 | 1 | 50 | 1 | 25 | 1 | 40 | |
| Example | 21 | 1 | 1 | 50 | 1 | 50 | 1 | 25 | 1 | 40 | |
| Example | 22 | 1 | 1 | 50 | 1 | 50 | 1 | 25 | 1 | 40 | |
| Example | 23 | 1 | 1 | 50 | 1 | 50 | 1 | 25 | 1 | 40 | |
| Comparative example | 24 | 1 | 1 | 50 | 1 | 50 | 1 | 25 | 1 | 40 | |
| Example | 25 | 1 | 1 | 50 | 1 | 50 | 1 | 25 | 1 | 40 | |
| Example | 26 | 1 | 1 | 50 | 1 | 50 | 1 | 25 | 1 | 40 | |
| Example | 27 | 1 | 1 | 50 | 1 | 50 | 1 | 25 | 1 | 40 | |
| Example | 28 | 1 | 1 | 50 | 1 | 50 | 1 | 25 | 1 | 40 | |
| Example | 29 | 1 | 1 | 50 | 1 | 50 | 1 | 25 | 1 | 40 | |
| Example | 30 | 1 | 1 | 50 | 1 | 50 | 1 | 25 | 1 | 40 | |
| Example | 31 | 1 | 1 | 50 | 1 | 50 | 1 | 25 | 1 | 40 | |
| Example | 32 | 1 | 1 | 50 | 1 | 50 | 1 | 25 | 1 | 40 | |
| Comparative example | 33 | 1 | 1 | 50 | 1 | 50 | 1 | 25 | 1 | 40 | |
| Example | 34 | 1 | 1 | 50 | 1 | 50 | 1 | 25 | 1 | 40 | |
| Example | 35 | 1 | 1 | 50 | 1 | 50 | 1 | 25 | 1 | 40 | |
| Example | 36 | 1 | 1 | 50 | 1 | 50 | 1 | 25 | 1 | 40 | |
| Example | 37 | 1 | 1 | 50 | 1 | 50 | 1 | 25 | 1 | 40 | |

| | | Primary layer | | | | | |
|---|---|---|---|---|---|---|---|
| | | Water-soluble phosphate | | Rust inhibitor | | Coating thickness (μm) | Baking temperature (° C.) |
| Classification | No. | Kind *6 | Blending quantity *8 | Kind *7 | Blending quantity *8 | | |
| Example | 20 | 1 | 0.5 | — | — | 0.3 | 140 |
| Example | 21 | 1 | 5 | — | — | 0.3 | 140 |
| Example | 22 | 1 | 10 | — | — | 0.3 | 140 |
| Example | 23 | 1 | 30 | — | — | 0.3 | 140 |
| Comparative example | 24 | 1 | 80 | — | — | 0.3 | 140 |

TABLE 30-continued

| | | | | | | | |
|---|---|---|---|---|---|---|---|
| Example | 25 | — | — | 1 | 0.5 | 0.3 | 140 |
| Example | 26 | — | — | 1 | 10 | 0.3 | 140 |
| Example | 27 | — | — | 1 | 30 | 0.3 | 140 |
| Example | 28 | — | — | 1 | 70 | 0.3 | 140 |
| Example | 29 | 1 | 5 | 1 | 0.5 | 0.3 | 140 |
| Example | 30 | 1 | 5 | 1 | 10 | 0.3 | 140 |
| Example | 31 | 1 | 10 | 1 | 10 | 0.3 | 140 |
| Example | 32 | 1 | 10 | 1 | 30 | 0.3 | 140 |
| Comparative example | 33 | 1 | 5 | 1 | 10 | 0.005 | 140 |
| Example | 34 | 1 | 5 | 1 | 10 | 0.01 | 140 |
| Example | 35 | 1 | 5 | 1 | 10 | 0.1 | 140 |
| Example | 36 | 1 | 5 | 1 | 10 | 0.6 | 140 |
| Example | 37 | 1 | 5 | 1 | 10 | 1.0 | 140 |

15

TABLE 31

| | | Secondary layer | | | | | |
|---|---|---|---|---|---|---|---|
| | | Organic resin | | Rust inhibitor | | Solid lubricant | |
| Classification | No. | Kind *9 | Blending quantity *11 | Kind *7 | Blending quantity *11 | Kind *10 | Blending quantity *11 |
| Example | 20 | 1 | 100 | 1 | 20 | — | — |
| Example | 21 | 1 | 100 | 1 | 20 | — | — |
| Example | 22 | 1 | 100 | 1 | 20 | — | — |
| Example | 23 | 1 | 100 | 1 | 20 | — | — |
| Comparative example | 24 | 1 | 100 | 1 | 20 | — | — |
| Example | 25 | 1 | 100 | 1 | 20 | — | — |
| Example | 26 | 1 | 100 | 1 | 20 | — | — |
| Example | 27 | 1 | 100 | 1 | 20 | — | — |
| Example | 28 | 1 | 100 | 1 | 20 | — | — |
| Example | 29 | 1 | 100 | 1 | 20 | — | — |
| Example | 30 | 1 | 100 | 1 | 20 | — | — |
| Example | 31 | 1 | 100 | 1 | 20 | — | — |
| Example | 32 | 1 | 100 | 1 | 20 | — | — |
| Comparative example | 33 | 1 | 100 | 1 | 20 | — | — |
| Example | 34 | 1 | 100 | 1 | 20 | — | — |
| Example | 35 | 1 | 100 | 1 | 20 | — | — |
| Example | 36 | 1 | 100 | 1 | 20 | — | — |
| Example | 37 | 1 | 100 | 1 | 20 | — | — |

| | | Secondary layer | | Performance | | | |
|---|---|---|---|---|---|---|---|
| | | | | | Corrosion | | |
| Classification | No. | Coating thickness (μm) | Baking temperature (° C.) | Corrosion resistance | resistance after treatment | Weld-ability | Electrodeposited paint adhesion |
| Example | 20 | 1.0 | 140 | ○ | ○ | ⊚ | ⊚ |
| Example | 21 | 1.0 | 140 | ○ | ○ | ⊚ | ⊚ |
| Example | 22 | 1.0 | 140 | ○ | ○ | ⊚ | ⊚ |
| Example | 23 | 1.0 | 140 | ○ | ○ | ⊚ | ⊚ |
| Comparative example | 24 | 1.0 | 140 | Δ | Δ | ⊚ | ⊚ |
| Example | 25 | 1.0 | 140 | ○+ | ○+ | ⊚ | ⊚ |
| Example | 26 | 1.0 | 140 | ○+ | ○+ | ⊚ | ⊚ |
| Example | 27 | 1.0 | 140 | ○+ | ○+ | ○ | ⊚ |
| Example | 28 | 1.0 | 140 | ○ | ○ | ○ | ⊚ |
| Example | 29 | 1.0 | 140 | ○+ | ○ | ⊚ | ⊚ |
| Example | 30 | 1.0 | 140 | ⊚ | ○ | ⊚ | ⊚ |
| Example | 31 | 1.0 | 140 | ⊚ | ○+ | ○ | ⊚ |
| Example | 32 | 1.0 | 140 | ⊚ | ○+ | ○ | ⊚ |
| Comparative example | 33 | 1.0 | 140 | X | X | ⊚ | ⊚ |
| Example | 34 | 1.0 | 140 | ○− | ○ | ⊚ | ⊚ |
| Example | 35 | 1.0 | 140 | ○ | ○ | ⊚ | ⊚ |
| Example | 36 | 1.0 | 140 | ○+ | ○ | ○ | ○ |
| Example | 37 | 1.0 | 140 | ○+ | ○+ | ○ | ○ |

TABLE 32

| | | Primary layer | | | | | | | | |
|---|---|---|---|---|---|---|---|---|---|---|
| | | Plated steel | Water-soluble resin or water-dispersible resin | | Water dispersed polyurethane resine | | Silane coupling agent | | Phosphoric acid or hexafluorometal acid | |
| Classification | No. | sheet *1 | Kind *2 | Blending quantity *8 | Kind *3 | Blending quantity *8 | Kind *4 | Blending quantity *8 | Kind *5 | Blending quantity *8 |
| Comparative example | 38 | 1 | 1 | 50 | 1 | 50 | 1 | 25 | 1 | 40 |
| Comparative example | 39 | 1 | 1 | 50 | 1 | 50 | 1 | 25 | 1 | 40 |
| Example | 40 | 1 | 1 | 50 | 1 | 50 | 1 | 25 | 1 | 40 |
| Example | 41 | 1 | 1 | 50 | 1 | 50 | 1 | 25 | 1 | 40 |
| Example | 42 | 1 | 1 | 50 | 1 | 50 | 1 | 25 | 1 | 40 |
| Example | 43 | 2 | 1 | 50 | 1 | 50 | 1 | 25 | 1 | 40 |
| Example | 44 | 3 | 1 | 50 | 1 | 50 | 1 | 25 | 1 | 40 |
| Example | 45 | 4 | 1 | 50 | 1 | 50 | 1 | 25 | 1 | 40 |
| Example | 46 | 5 | 1 | 50 | 1 | 50 | 1 | 25 | 1 | 40 |
| Example | 47 | 6 | 1 | 50 | 1 | 50 | 1 | 25 | 1 | 40 |
| Example | 48 | 7 | 1 | 50 | 1 | 50 | 1 | 25 | 1 | 40 |
| Example | 49 | 8 | 1 | 50 | 1 | 50 | 1 | 25 | 1 | 40 |
| Example | 50 | 9 | 1 | 50 | 1 | 50 | 1 | 25 | 1 | 40 |
| Example | 51 | 1 | 2 | 50 | 1 | 50 | 1 | 25 | 1 | 40 |
| Example | 52 | 1 | 3 | 50 | 1 | 50 | 1 | 25 | 1 | 40 |

| | | Primary layer | | | | | |
|---|---|---|---|---|---|---|---|
| | | Water-soluble phosphate | | Rust inhibitor | | Coating | Baking |
| Classification | No. | Kind *6 | Blending quantity *8 | Kind *7 | Blending quantity *8 | thickness (μm) | temperature (° C.) |
| Comparative example | 38 | 1 | 5 | 1 | 10 | 1.5 | 140 |
| Comparative example | 39 | 1 | 5 | 1 | 10 | 0.3 | 25 |
| Example | 40 | 1 | 5 | 1 | 10 | 0.3 | 50 |
| Example | 41 | 1 | 5 | 1 | 10 | 0.3 | 100 |
| Example | 42 | 1 | 5 | 1 | 10 | 0.3 | 200 |
| Example | 43 | 1 | 5 | 1 | 10 | 0.3 | 140 |
| Example | 44 | 1 | 5 | 1 | 10 | 0.3 | 140 |
| Example | 45 | 1 | 5 | 1 | 10 | 0.3 | 140 |
| Example | 46 | 1 | 5 | 1 | 10 | 0.3 | 140 |
| Example | 47 | 1 | 5 | 1 | 10 | 0.3 | 140 |
| Example | 48 | 1 | 5 | 1 | 10 | 0.3 | 140 |
| Example | 49 | 1 | 5 | 1 | 10 | 0.3 | 140 |
| Example | 50 | 1 | 5 | 1 | 10 | 0.3 | 140 |
| Example | 51 | 1 | 5 | 1 | 10 | 0.3 | 140 |
| Example | 52 | 1 | 5 | 1 | 10 | 0.3 | 140 |

TABLE 33

| | | Secondary layer | | | | | |
|---|---|---|---|---|---|---|---|
| | | Organic resin | | Rust inhibitor | | Solid lubricant | |
| Classification | No. | Kind *9 | Blending quantity *11 | Kind *7 | Blending quantity *11 | Kind *10 | Blending quantity *11 |
| Comparative example | 38 | 1 | 100 | 1 | 20 | — | — |
| Comparative example | 39 | 1 | 100 | 1 | 20 | — | — |
| Example | 40 | 1 | 100 | 1 | 20 | — | — |
| Example | 41 | 1 | 100 | 1 | 20 | — | — |
| Example | 42 | 1 | 100 | 1 | 20 | — | — |
| Example | 43 | 1 | 100 | 1 | 20 | — | — |
| Example | 44 | 1 | 100 | 1 | 20 | — | — |
| Example | 45 | 1 | 100 | 1 | 20 | — | — |
| Example | 46 | 1 | 100 | 1 | 20 | — | — |
| Example | 47 | 1 | 100 | 1 | 20 | — | — |
| Example | 48 | 1 | 100 | 1 | 20 | — | — |
| Example | 49 | 1 | 100 | 1 | 20 | — | — |

TABLE 33-continued

| Example | 50 | 1 | 100 | 1 | 20 | — | — |
|---|---|---|---|---|---|---|---|
| Example | 51 | 1 | 100 | 1 | 20 | — | — |
| Example | 52 | 1 | 100 | 1 | 20 | — | — |

| | | Secondary layer | | Performance | | | |
|---|---|---|---|---|---|---|---|
| | | | | | Corrosion | | |
| Classification | No. | Coating thickness (μm) | Baking temperature (° C.) | Corrosion resistance | resistance after treatment | Weldability | Electrodeposited paint adhesion |
| Comparative example | 38 | 1.0 | 140 | ◎ | ◎ | X | X |
| Comparative example | 39 | 1.0 | 140 | Δ | Δ | ◎ | ◎ |
| Example | 40 | 1.0 | 140 | ○− | ○ | ◎ | ◎ |
| Example | 41 | 1.0 | 140 | ○ | ○ | ◎ | ◎ |
| Example | 42 | 1.0 | 140 | ○− | ○ | ◎ | ◎ |
| Example | 43 | 1.0 | 140 | ○+ | ○+ | ◎ | ◎ |
| Example | 44 | 1.0 | 140 | ○ | ○ | ◎ | ◎ |
| Example | 45 | 1.0 | 140 | ◎ | ○ | ○ | ○ |
| Example | 46 | 1.0 | 140 | ◎ | ○+ | ○ | ○ |
| Example | 47 | 1.0 | 140 | ◎ | ◎ | ○ | ○ |
| Example | 48 | 1.0 | 140 | ○+ | ○+ | ○ | ○ |
| Example | 49 | 1.0 | 140 | ◎ | ○+ | ○ | ○ |
| Example | 50 | 1.0 | 140 | ◎ | ○+ | ○ | ○ |
| Example | 51 | 1.0 | 140 | ◎ | ◎ | ○ | ○ |
| Example | 52 | 1.0 | 140 | ◎ | ◎ | ○ | ○ |

TABLE 34

| | | | Primary layer | | | | | | | |
|---|---|---|---|---|---|---|---|---|---|---|
| | | Plated steel | Water-soluble resin or water-dispersible resin | | Water dispersed polyurethane resine | | Silane coupling agent | | Phosphoric acid or hexafluorometal acid | |
| Classification | No. | sheet *1 | Kind *2 | Blending quantity *8 | Kind *3 | Blending quantity *8 | Kind *4 | Blending quantity *8 | Kind *5 | Blending quantity *8 |
| Comparative example | 53 | 1 | 4 | 50 | 1 | 50 | 1 | 25 | 1 | 40 |
| Comparative example | 54 | 1 | 5 | 50 | 1 | 50 | 1 | 25 | 1 | 40 |
| Example | 55 | 1 | 1 | 50 | 1 | 50 | 2 | 25 | 1 | 40 |
| Example | 56 | 1 | 1 | 50 | 1 | 50 | 3 | 25 | 1 | 40 |
| Example | 57 | 1 | 1 | 50 | 1 | 50 | 4 | 25 | 1 | 40 |
| Example | 58 | 1 | 1 | 50 | 1 | 50 | 5 | 25 | 1 | 40 |
| Example | 59 | 1 | 1 | 50 | 1 | 50 | 6 | 25 | 1 | 40 |
| Example | 60 | 1 | 1 | 50 | 1 | 50 | 7 | 25 | 1 | 40 |
| Example | 61 | 1 | 1 | 50 | 1 | 50 | 8 | 25 | 1 | 40 |
| Example | 62 | 1 | 1 | 50 | 1 | 50 | 1 | 25 | 2 | 40 |
| Example | 63 | 1 | 1 | 50 | 1 | 50 | 1 | 25 | 3 | 40 |
| Example | 64 | 1 | 1 | 50 | 1 | 50 | 1 | 25 | 4 | 40 |
| Example | 65 | 1 | 1 | 50 | 1 | 50 | 1 | 25 | 1 | 40 |
| Example | 66 | 1 | 1 | 50 | 1 | 50 | 1 | 25 | 1 | 40 |
| Example | 67 | 1 | 1 | 50 | 1 | 50 | 1 | 25 | 1 | 40 |
| Example | 68 | 1 | 1 | 50 | 1 | 50 | 1 | 25 | 1 | 40 |

| | | Primary layer | | | | | |
|---|---|---|---|---|---|---|---|
| | | Water-soluble phosphate | | Rust inhibitor | | Coating | Baking |
| Classification | No. | Kind *6 | Blending quantity *8 | Kind *7 | Blending quantity *8 | thickness (μm) | temperature (° C.) |
| Comparative example | 53 | 1 | 5 | 1 | 10 | 0.3 | 140 |
| Comparative example | 54 | 1 | 5 | 1 | 10 | 0.3 | 140 |
| Example | 55 | 1 | 5 | 1 | 10 | 0.3 | 140 |
| Example | 56 | 1 | 5 | 1 | 10 | 0.3 | 140 |
| Example | 57 | 1 | 5 | 1 | 10 | 0.3 | 140 |
| Example | 58 | 1 | 5 | 1 | 10 | 0.3 | 140 |

TABLE 34-continued

|  | | | | | | | |
|---|---|---|---|---|---|---|---|
| Example | 59 | 1 | 5 | 1 | 10 | 0.3 | 140 |
| Example | 60 | 1 | 5 | 1 | 10 | 0.3 | 140 |
| Example | 61 | 1 | 5 | 1 | 10 | 0.3 | 140 |
| Example | 62 | 1 | 5 | 1 | 10 | 0.3 | 140 |
| Example | 63 | 1 | 5 | 1 | 10 | 0.3 | 140 |
| Example | 64 | 1 | 5 | 1 | 10 | 0.3 | 140 |
| Example | 65 | 2 | 5 | 1 | 10 | 0.3 | 140 |
| Example | 66 | 3 | 5 | 1 | 10 | 0.3 | 140 |
| Example | 67 | 4 | 5 | 1 | 10 | 0.3 | 140 |
| Example | 68 | 1 | 5 | 2 | 10 | 0.3 | 140 |

TABLE 35

| | | Secondary layer | | | | | |
|---|---|---|---|---|---|---|---|
| | | Organic resin | | Rust inhibitor | | Solid lubricant | |
| Classification | No. | Kind *9 | Blending quantity *11 | Kind *7 | Blending quantity *11 | Kind *10 | Blending quantity *11 |
| Comparative example | 53 | 1 | 100 | 1 | 20 | — | — |
| Comparative example | 54 | 1 | 100 | 1 | 20 | — | — |
| Example | 55 | 1 | 100 | 1 | 20 | — | — |
| Example | 56 | 1 | 100 | 1 | 20 | — | — |
| Example | 57 | 1 | 100 | 1 | 20 | — | — |
| Example | 58 | 1 | 100 | 1 | 20 | — | — |
| Example | 59 | 1 | 100 | 1 | 20 | — | — |
| Example | 60 | 1 | 100 | 1 | 20 | — | — |
| Example | 61 | 1 | 100 | 1 | 20 | — | — |
| Example | 62 | 1 | 100 | 1 | 20 | — | — |
| Example | 63 | 1 | 100 | 1 | 20 | — | — |
| Example | 64 | 1 | 100 | 1 | 20 | — | — |
| Example | 65 | 1 | 100 | 1 | 20 | — | — |
| Example | 66 | 1 | 100 | 1 | 20 | — | — |
| Example | 67 | 1 | 100 | 1 | 20 | — | — |
| Example | 68 | 1 | 100 | 1 | 20 | — | — |

| | | Secondary layer | | Performance | | | |
|---|---|---|---|---|---|---|---|
| Classification | No. | Coating thickness (μm) | Baking temperature (° C.) | Corrosion resistance | Corrosion resistance after treatment | Weldability | Electrodeposited paint adhesion |
| Comparative example | 53 | 1.0 | 140 | Δ | Δ | ○ | ◎ |
| Comparative example | 54 | 1.0 | 140 | X | X | ◎ | ◎ |
| Example | 55 | 1.0 | 140 | ◎ | ○+ | ◎ | ◎ |
| Example | 56 | 1.0 | 140 | ○+ | ○+ | ◎ | ◎ |
| Example | 57 | 1.0 | 140 | ○+ | ○+ | ◎ | ◎ |
| Example | 58 | 1.0 | 140 | ○+ | ○+ | ◎ | ◎ |
| Example | 59 | 1.0 | 140 | ○ | ○ | ◎ | ◎ |
| Example | 60 | 1.0 | 140 | ○ | ○ | ◎ | ◎ |
| Example | 61 | 1.0 | 140 | ○ | ○ | ◎ | ◎ |
| Example | 62 | 1.0 | 140 | ◎ | ○+ | ◎ | ◎ |
| Example | 63 | 1.0 | 140 | ◎ | ○+ | ◎ | ◎ |
| Example | 64 | 1.0 | 140 | ◎ | ○+ | ◎ | ◎ |
| Example | 65 | 1.0 | 140 | ◎ | ○+ | ◎ | ◎ |
| Example | 66 | 1.0 | 140 | ◎ | ○+ | ◎ | ◎ |
| Example | 67 | 1.0 | 140 | ◎ | ○+ | ◎ | ◎ |
| Example | 68 | 1.0 | 140 | ◎ | ○+ | ◎ | ◎ |

TABLE 36

| Classification | No. | Plated steel sheet *1 | Primary layer | | | | | | | |
|---|---|---|---|---|---|---|---|---|---|---|
| | | | Water-soluble resin or water-dispersible resin | | Water dispersed polyurethane resine | | Silane coupling agent | | Phosphoric acid or hexafluorometal acid | |
| | | | Kind *2 | Blending quantity *8 | Kind *3 | Blending quantity *8 | Kind *4 | Blending quantity *8 | Kind *5 | Blending quantity *8 |
| Example | 69 | 1 | 1 | 50 | 1 | 50 | 1 | 25 | 1 | 40 |
| Example | 70 | 1 | 1 | 50 | 1 | 50 | 1 | 25 | 1 | 40 |
| Example | 71 | 1 | 1 | 50 | 1 | 50 | 1 | 25 | 1 | 40 |
| Example | 72 | 1 | 1 | 50 | 1 | 50 | 1 | 25 | 1 | 40 |
| Example | 73 | 1 | 1 | 50 | 1 | 50 | 1 | 25 | 1 | 40 |
| Example | 74 | 1 | 1 | 50 | 2 | 50 | 1 | 25 | 1 | 40 |
| Example | 75 | 1 | 1 | 50 | 3 | 50 | 1 | 25 | 1 | 40 |
| Example | 76 | 1 | 1 | 50 | 4 | 50 | 1 | 25 | 1 | 40 |
| Example | 77 | 1 | 1 | 50 | 5 | 50 | 1 | 25 | 1 | 40 |
| Example | 78 | 1 | 1 | 50 | 6 | 50 | 1 | 25 | 1 | 40 |
| Example | 79 | 1 | 1 | 50 | 1 | 50 | 1 | 25 | 1 | 40 |
| Example | 80 | 1 | 1 | 50 | 1 | 50 | 1 | 25 | 1 | 40 |
| Example | 81 | 1 | 1 | 50 | 1 | 50 | 1 | 25 | 1 | 40 |
| Example | 82 | 1 | 1 | 50 | 1 | 50 | 1 | 25 | 1 | 40 |
| Example | 83 | 1 | 1 | 50 | 1 | 50 | 1 | 25 | 1 | 40 |
| Example | 84 | 1 | 1 | 50 | 1 | 50 | 1 | 25 | 1 | 40 |
| Example | 85 | 1 | 1 | 50 | 1 | 50 | 1 | 25 | 1 | 40 |

| Classification | No. | Primary layer | | | | Coating thickness (μm) | Baking temperature (° C.) |
|---|---|---|---|---|---|---|---|
| | | Water-soluble phosphate | | Rust inhibitor | | | |
| | | Kind *6 | Blending quantity *8 | Kind *7 | Blending quantity *8 | | |
| Example | 69 | 1 | 5 | 3 | 10 | 0.3 | 140 |
| Example | 70 | 1 | 5 | 4 | 10 | 0.3 | 140 |
| Example | 71 | 1 | 5 | 5 | 10 | 0.3 | 140 |
| Example | 72 | 1 | 5 | 6 | 10 | 0.3 | 140 |
| Example | 73 | 1 | 5 | 7 | 10 | 0.3 | 140 |
| Example | 74 | 1 | 5 | 1 | 10 | 0.3 | 140 |
| Example | 75 | 1 | 5 | 1 | 10 | 0.3 | 140 |
| Example | 76 | 1 | 5 | 1 | 10 | 0.3 | 140 |
| Example | 77 | 1 | 5 | 1 | 10 | 0.3 | 140 |
| Example | 78 | 1 | 5 | 1 | 10 | 0.3 | 140 |
| Example | 79 | 1 | 5 | 1 | 10 | 0.3 | 140 |
| Example | 80 | 1 | 5 | 1 | 10 | 0.3 | 140 |
| Example | 81 | 1 | 5 | 1 | 10 | 0.3 | 140 |
| Example | 82 | 1 | 5 | 1 | 10 | 0.3 | 140 |
| Example | 83 | 1 | 5 | 1 | 10 | 0.3 | 140 |
| Example | 84 | 1 | 5 | 1 | 10 | 0.3 | 140 |
| Example | 85 | 1 | 5 | 1 | 10 | 0.3 | 140 |

TABLE 37

| Classification | No. | Secondary layer | | | | | |
|---|---|---|---|---|---|---|---|
| | | Organic resin | | Rust inhibitor | | Solid lubricant | |
| | | Kind *9 | Blending quantity *11 | Kind *7 | Blending quantity *11 | Kind *10 | Blending quantity *11 |
| Example | 69 | 1 | 100 | 1 | 20 | — | — |
| Example | 70 | 1 | 100 | 1 | 20 | — | — |
| Example | 71 | 1 | 100 | 1 | 20 | — | — |
| Example | 72 | 1 | 100 | 1 | 20 | — | — |
| Example | 73 | 1 | 100 | 1 | 20 | — | — |
| Example | 74 | 1 | 100 | 1 | 20 | — | — |
| Example | 75 | 1 | 100 | 1 | 20 | — | — |
| Example | 76 | 1 | 100 | 1 | 20 | — | — |
| Example | 77 | 1 | 100 | 1 | 20 | — | — |
| Example | 78 | 1 | 100 | 1 | 20 | — | — |
| Example | 79 | 1 | 100 | 1 | 20 | — | — |
| Example | 80 | 2 | 100 | 1 | 20 | — | — |
| Example | 81 | 3 | 100 | 1 | 20 | — | — |
| Example | 82 | 4 | 100 | 1 | 20 | — | — |

TABLE 37-continued

| Classification | No. | | | | | | |
|---|---|---|---|---|---|---|---|
| Example | 83 | 5 | 100 | 1 | 20 | — | — |
| Example | 84 | 6 | 100 | 1 | 20 | — | — |
| Example | 85 | 7 | 100 | 1 | 20 | — | — |

| | | Secondary layer | | Performance | | | |
|---|---|---|---|---|---|---|---|
| | | | | | Corrosion | | |
| Classification | No. | Coating thickness (μm) | Baking temperature (°C.) | Corrosion resistance | resistance after treatment | Weldability | Electrodeposited paint adhesion |
| Example | 69 | 1.0 | 140 | ⊚ | ○+ | ⊚ | ⊚ |
| Example | 70 | 1.0 | 140 | ⊚ | ○+ | ⊚ | ⊚ |
| Example | 71 | 1.0 | 140 | ⊚ | ○+ | ⊚ | ⊚ |
| Example | 72 | 1.0 | 140 | ⊚ | ○+ | ⊚ | ⊚ |
| Example | 73 | 1.0 | 140 | ⊚ | ○+ | ⊚ | ⊚ |
| Example | 74 | 1.0 | 140 | ⊚ | ○+ | ⊚ | ⊚ |
| Example | 75 | 1.0 | 140 | ⊚ | ○+ | ⊚ | ⊚ |
| Example | 76 | 1.0 | 140 | ⊚ | ○+ | ⊚ | ⊚ |
| Example | 77 | 1.0 | 140 | ⊚ | ○+ | ⊚ | ⊚ |
| Example | 78 | 1.0 | 140 | ⊚ | ○+ | ⊚ | ⊚ |
| Example | 79 | 1.0 | 140 | ⊚ | ○+ | ⊚ | ⊚ |
| Example | 80 | 1.0 | 140 | ⊚ | ○+ | ⊚ | ⊚ |
| Example | 81 | 1.0 | 140 | ⊚ | ⊚ | ⊚ | ⊚ |
| Example | 82 | 1.0 | 140 | ○+ | ○ | ⊚ | ⊚ |
| Example | 83 | 1.0 | 140 | ○+ | ○ | ⊚ | ⊚ |
| Example | 84 | 1.0 | 140 | ○+ | ○+ | ⊚ | ⊚ |
| Example | 85 | 1.0 | 140 | ⊚ | ○+ | ⊚ | ⊚ |

TABLE 38

| | | | Primary layer | | | | | | | |
|---|---|---|---|---|---|---|---|---|---|---|
| | | Plated steel sheet | Water-soluble resin or water-dispersible resin | | Water dispersed polyurethane resine | | Silane coupling agent | | Phosphoric acid or hexafluorometal acid | |
| Classification | No. | *1 | Kind *2 | Blending quantity *8 | Kind *3 | Blending quantity *8 | Kind *4 | Blending quantity *8 | Kind *5 | Blending quantity *8 |
| Example | 86 | 1 | 1 | 50 | 1 | 50 | 1 | 25 | 1 | 40 |
| Example | 87 | 1 | 1 | 50 | 1 | 50 | 1 | 25 | 1 | 40 |
| Example | 88 | 1 | 1 | 50 | 1 | 50 | 1 | 25 | 1 | 40 |
| Example | 89 | 1 | 1 | 50 | 1 | 50 | 1 | 25 | 1 | 40 |
| Example | 90 | 1 | 1 | 50 | 1 | 50 | 1 | 25 | 1 | 40 |
| Comparative example | 91 | 1 | 1 | 50 | 1 | 50 | 1 | 25 | 1 | 40 |
| Comparative example | 92 | 1 | 1 | 50 | 1 | 50 | 1 | 25 | 1 | 40 |
| Comparative example | 93 | 1 | 1 | 50 | 1 | 50 | 1 | 25 | 1 | 40 |
| Example | 94 | 1 | 1 | 50 | 1 | 50 | 1 | 25 | 1 | 40 |
| Example | 95 | 1 | 1 | 50 | 1 | 50 | 1 | 25 | 1 | 40 |
| Example | 96 | 1 | 1 | 50 | 1 | 50 | 1 | 25 | 1 | 40 |
| Comparative example | 97 | 1 | 1 | 50 | 1 | 50 | 1 | 25 | 1 | 40 |
| Example | 98 | 1 | 1 | 50 | 1 | 50 | 1 | 25 | 1 | 40 |
| Comparative example | 99 | 1 | 1 | 50 | 1 | 50 | 1 | 25 | 1 | 40 |
| Comparative example | 100 | 1 | 1 | 50 | 1 | 10 | 1 | 25 | 1 | 40 |
| Comparative example | 101 | 1 | 1 | 50 | 1 | 30 | 1 | 25 | 1 | 40 |
| Example | 102 | 1 | 1 | 50 | 1 | 70 | 1 | 25 | 1 | 40 |

| | | Primary layer | | | | | |
|---|---|---|---|---|---|---|---|
| | | Water-soluble phosphate | | Rust inhibitor | | Coating | Baking |
| Classification | No. | Kind *6 | Blending quantity *8 | Kind *7 | Blending quantity *8 | thickness (μm) | temperature (°C.) |
| Example | 86 | 1 | 5 | 1 | 10 | 0.3 | 140 |
| Example | 87 | 1 | 5 | 1 | 10 | 0.3 | 140 |
| Example | 88 | 1 | 5 | 1 | 10 | 0.3 | 140 |

TABLE 38-continued

| | | | | | | | |
|---|---|---|---|---|---|---|---|
| Example | 89 | 1 | 5 | 1 | 10 | 0.3 | 140 |
| Example | 90 | 1 | 5 | 1 | 10 | 0.3 | 140 |
| Comparative example | 91 | 1 | 5 | 1 | 10 | 0.3 | 140 |
| Comparative example | 92 | 1 | 5 | 1 | 10 | 0.3 | 140 |
| Comparative example | 93 | 1 | 5 | 1 | 10 | 0.3 | 140 |
| Example | 94 | 1 | 5 | 1 | 10 | 0.3 | 140 |
| Example | 95 | 1 | 5 | 1 | 10 | 0.3 | 140 |
| Example | 96 | 1 | 5 | 1 | 10 | 0.3 | 140 |
| Comparative example | 97 | 1 | 5 | 1 | 10 | 0.3 | 140 |
| Example | 98 | 1 | 5 | 1 | 10 | 0.3 | 140 |
| Comparative example | 99 | 1 | 5 | 1 | 10 | 0.3 | 140 |
| Comparative example | 100 | 1 | 5 | 1 | 10 | 0.3 | 140 |
| Comparative example | 101 | 1 | 5 | 1 | 10 | 0.3 | 140 |
| Example | 102 | 1 | 5 | 1 | 10 | 0.3 | 140 |

TABLE 39

| | | Secondary layer | | | | | |
|---|---|---|---|---|---|---|---|
| | | Organic resin | | Rust inhibitor | | Solid lubricant | |
| Classification | No. | Kind *9 | Blending quantity *11 | Kind *7 | Blending quantity *11 | Kind *10 | Blending quantity *11 |
| Example | 86 | 8 | 100 | 1 | 20 | — | — |
| Example | 87 | 9 | 100 | 1 | 20 | — | — |
| Example | 88 | 10 | 100 | 1 | 20 | — | — |
| Example | 89 | 11 | 100 | 1 | 20 | — | — |
| Example | 90 | 12 | 100 | 1 | 20 | — | — |
| Comparative example | 91 | 13 | 100 | 1 | 20 | — | — |
| Comparative example | 92 | 14 | 100 | 1 | 20 | — | — |
| Comparative example | 93 | 15 | 100 | 1 | 20 | — | — |
| Example | 94 | 16 | 100 | 1 | 20 | — | — |
| Example | 95 | 17 | 100 | 1 | 20 | — | — |
| Example | 96 | 18 | 100 | 1 | 20 | — | — |
| Comparative example | 97 | 19 | 100 | 1 | 20 | — | — |
| Example | 98 | 20 | 100 | 1 | 20 | — | — |
| Comparative example | 99 | 21 | 100 | 1 | 20 | — | — |
| Comparative example | 100 | 22 | 100 | 1 | 20 | — | — |
| Comparative example | 101 | 23 | 100 | 1 | 20 | — | — |
| Example | 102 | 1 | 100 | 2 | 20 | — | — |

| | | Secondary layer | | Performance | | | |
|---|---|---|---|---|---|---|---|
| | | | | | Corrosion | | |
| Classification | No. | Coating thickness (μm) | Baking temperature (° C.) | Corrosion resistance | resistance after treatment | Weldability | Electrodeposited paint adhesion |
| Example | 86 | 1.0 | 140 | ⊚ | ○+ | ⊚ | ⊚ |
| Example | 87 | 1.0 | 140 | ⊚ | ⊚ | ⊚ | ⊚ |
| Example | 88 | 1.0 | 140 | ⊚ | ○ | ⊚ | ⊚ |
| Example | 89 | 1.0 | 140 | ⊚ | ○ | ⊚ | ⊚ |
| Example | 90 | 1.0 | 140 | ⊚ | ○ | ⊚ | ⊚ |
| Comparative example | 91 | 1.0 | 140 | ○ | X | ⊚ | ⊚ |
| Comparative example | 92 | 1.0 | 140 | ○ | X | ⊚ | ⊚ |
| Comparative example | 93 | 1.0 | 140 | ○ | X | ⊚ | ⊚ |
| Example | 94 | 1.0 | 140 | ⊚ | ⊚ | ⊚ | ⊚ |
| Example | 95 | 1.0 | 140 | ○+ | ○+ | ⊚ | ⊚ |

TABLE 39-continued

| Classification | No. | | | | | | |
|---|---|---|---|---|---|---|---|
| Example | 96 | 1.0 | 140 | ◎ | ○+ | ◎ | ◎ |
| Comparative example | 97 | 1.0 | 140 | ○ | △ | ◎ | ◎ |
| Example | 98 | 1.0 | 140 | ◎ | ○+ | ◎ | ◎ |
| Comparative example | 99 | 1.0 | 140 | △ | X | ◎ | ◎ |
| Comparative example | 100 | 1.0 | 140 | △ | △ | ◎ | ◎ |
| Comparative example | 101 | 1.0 | 140 | △ | △ | ◎ | ◎ |
| Example | 102 | 1.0 | 140 | ○+ | ○ | ◎ | ◎ |

TABLE 40

| | | Plated steel sheet *1 | Primary layer | | | | | | | |
|---|---|---|---|---|---|---|---|---|---|---|
| | | | Water-soluble resin or water-dispersible resin | | Water dispersed polyurethane resine | | Silane coupling agent | | Phosphoric acid or hexafluorometal acid | |
| Classification | No. | | Kind *2 | Blending quantity *8 | Kind *3 | Blending quantity *8 | Kind *4 | Blending quantity *8 | Kind *5 | Blending quantity *8 |
| Example | 103 | 1 | 1 | 50 | 1 | 50 | 1 | 25 | 1 | 40 |
| Example | 104 | 1 | 1 | 50 | 1 | 50 | 1 | 25 | 1 | 40 |
| Example | 105 | 1 | 1 | 50 | 1 | 50 | 1 | 25 | 1 | 40 |
| Example | 106 | 1 | 1 | 50 | 1 | 50 | 1 | 25 | 1 | 40 |
| Example | 107 | 1 | 1 | 50 | 1 | 50 | 1 | 25 | 1 | 40 |
| Example | 108 | 1 | 1 | 50 | 1 | 50 | 1 | 25 | 1 | 40 |
| Example | 109 | 1 | 1 | 50 | 1 | 50 | 1 | 25 | 1 | 40 |
| Example | 110 | 1 | 1 | 50 | 1 | 50 | 1 | 25 | 1 | 40 |
| Example | 111 | 1 | 1 | 50 | 1 | 50 | 1 | 25 | 1 | 40 |
| Example | 112 | 1 | 1 | 50 | 1 | 50 | 1 | 25 | 1 | 40 |
| Example | 113 | 1 | 1 | 50 | 1 | 50 | 1 | 25 | 1 | 40 |
| Example | 114 | 1 | 1 | 50 | 1 | 50 | 1 | 25 | 1 | 40 |
| Example | 115 | 1 | 1 | 50 | 1 | 50 | 1 | 25 | 1 | 40 |

| | | Primary layer | | | | Coating thickness (μm) | Baking temperature (° C.) |
|---|---|---|---|---|---|---|---|
| | | Water-soluble phosphate | | Rust inhibitor | | | |
| Classification | No. | Kind *6 | Blending quantity *8 | Kind *7 | Blending quantity *8 | | |
| Example | 103 | 1 | 5 | 1 | 10 | 0.3 | 140 |
| Example | 104 | 1 | 5 | 1 | 10 | 0.3 | 140 |
| Example | 105 | 1 | 5 | 1 | 10 | 0.3 | 140 |
| Example | 106 | 1 | 5 | 1 | 10 | 0.3 | 140 |
| Example | 107 | 1 | 5 | 1 | 10 | 0.3 | 140 |
| Example | 108 | 1 | 5 | 1 | 10 | 0.3 | 140 |
| Example | 109 | 1 | 5 | 1 | 10 | 0.3 | 140 |
| Example | 110 | 1 | 5 | 1 | 10 | 0.3 | 140 |
| Example | 111 | 1 | 5 | 1 | 10 | 0.3 | 140 |
| Example | 112 | 1 | 5 | 1 | 10 | 0.3 | 140 |
| Example | 113 | 1 | 5 | 1 | 10 | 0.3 | 140 |
| Example | 114 | 1 | 5 | 1 | 10 | 0.3 | 140 |
| Example | 115 | 1 | 5 | 1 | 10 | 0.3 | 140 |

TABLE 41

| | | Secondary layer | | | | | | Coating thickness (μm) |
|---|---|---|---|---|---|---|---|---|
| | | Organic resin | | Rust inhibitor | | Solid lubricant | | |
| Classification | No. | Kind *9 | Blending quantity *11 | Kind *7 | Blending quantity *11 | Kind *10 | Blending quantity *11 | |
| Example | 103 | 1 | 100 | 3 | 20 | — | — | 1.0 |
| Example | 104 | 1 | 100 | 4 | 20 | — | — | 1.0 |
| Example | 105 | 1 | 100 | 5 | 20 | — | — | 1.0 |
| Example | 106 | 1 | 100 | 6 | 20 | — | — | 1.0 |

TABLE 41-continued

| Classification | No. | | | | | | |
|---|---|---|---|---|---|---|---|
| Example | 107 | 1 | 100 | 7 | 20 | — | — | 1.0 |
| Example | 108 | 1 | 100 | 1 + 4 | 10 + 10 | — | — | 1.0 |
| Example | 109 | 1 | 100 | 1 + 5 | 20 + 10 | — | — | 1.0 |
| Example | 110 | 1 | 100 | 1 + 6 | 20 + 10 | — | — | 1.0 |
| Example | 111 | 1 | 100 | 1 + 4 + 6 | 10 + 7 + 3 | — | — | 1.0 |
| Example | 112 | 1 | 100 | 1 + 5 + 6 | 10 + 7 + 3 | — | — | 1.0 |
| Example | 113 | 1 | 100 | 4 + 5 + 6 | 9 + 8 + 3 | — | — | 1.0 |
| Example | 114 | 1 | 100 | — | — | — | — | 1.0 |
| Example | 115 | 1 | 100 | 1 | 1 | — | — | 1.0 |

| | | Secondary layer Baking temperature (° C.) | Performance | | | |
|---|---|---|---|---|---|---|
| Classification | No. | | Corrosion resistance | Corrosion resistance after treatment | Weldability | Electrodeposited paint adhesion |
| Example | 103 | 140 | ○+ | ○ | ⊚ | ⊚ |
| Example | 104 | 140 | ○+ | ○ | ⊚ | ⊚ |
| Example | 105 | 140 | ○+ | ○ | ⊚ | ⊚ |
| Example | 106 | 140 | ○ | ○− | ⊚ | ⊚ |
| Example | 107 | 140 | ○+ | ○ | ⊚ | ⊚ |
| Example | 108 | 140 | ⊚ | ○+ | ⊚ | ⊚ |
| Example | 109 | 140 | ⊚ | ○+ | ⊚ | ⊚ |
| Example | 110 | 140 | ⊚ | ○+ | ⊚ | ⊚ |
| Example | 111 | 140 | ⊚ | ○+ | ⊚ | ⊚ |
| Example | 112 | 140 | ⊚ | ○+ | ⊚ | ⊚ |
| Example | 113 | 140 | ⊚ | ○+ | ⊚ | ⊚ |
| Example | 114 | 140 | ○ | ○− | ⊚ | ⊚ |
| Example | 115 | 140 | ○ | ○− | ⊚ | ⊚ |

TABLE 42

| | | Plated steel sheet *1 | Primary layer | | | | | | | |
|---|---|---|---|---|---|---|---|---|---|---|
| | | | Water-soluble resin or water-dispersible resin | | Water dispersed polyurethane resine | | Silane coupling agent | | Phosphoric acid or hexafluorometal acid | |
| Classification | No. | | Kind *2 | Blending quantity *8 | Kind *3 | Blending quantity *8 | Kind *4 | Blending quantity *8 | Kind *5 | Blending quantity *8 |
| Example | 116 | 1 | 1 | 50 | 1 | 50 | 1 | 25 | 1 | 40 |
| Example | 117 | 1 | 1 | 50 | 1 | 50 | 1 | 25 | 1 | 40 |
| Example | 118 | 1 | 1 | 50 | 1 | 50 | 1 | 25 | 1 | 40 |
| Example | 119 | 1 | 1 | 50 | 1 | 50 | 1 | 25 | 1 | 40 |
| Example | 120 | 1 | 1 | 50 | 1 | 50 | 1 | 25 | 1 | 40 |
| Comparative example | 121 | 1 | 1 | 50 | 1 | 50 | 1 | 25 | 1 | 40 |
| Comparative example | 122 | 1 | 1 | 50 | 1 | 50 | 1 | 25 | 1 | 40 |
| Example | 123 | 1 | 1 | 50 | 1 | 50 | 1 | 25 | 1 | 40 |
| Example | 124 | 1 | 1 | 50 | 1 | 50 | 1 | 25 | 1 | 40 |
| Comparative example | 125 | 1 | 1 | 50 | 1 | 50 | 1 | 25 | 1 | 40 |
| Comparative example | 126 | 1 | 1 | 50 | 1 | 50 | 1 | 25 | 1 | 40 |
| Example | 127 | 1 | 1 | 50 | 1 | 50 | 1 | 25 | 1 | 40 |
| Example | 128 | 1 | 1 | 50 | 1 | 50 | 1 | 25 | 1 | 40 |
| Example | 129 | 1 | 1 | 50 | 1 | 50 | 1 | 25 | 1 | 40 |

| | | Primary layer | | | | Coating thickness (μm) | Baking temperature (° C.) |
|---|---|---|---|---|---|---|---|
| | | Water-soluble phosphate | | Rust inhibitor | | | |
| Classification | No. | Kind *6 | Blending quantity *8 | Kind *7 | Blending quantity *8 | | |
| Example | 116 | 1 | 5 | 1 | 10 | 0.3 | 140 |
| Example | 117 | 1 | 5 | 1 | 10 | 0.3 | 140 |
| Example | 118 | 1 | 5 | 1 | 10 | 0.3 | 140 |
| Example | 119 | 1 | 5 | 1 | 10 | 0.3 | 140 |
| Example | 120 | 1 | 5 | 1 | 10 | 0.3 | 140 |
| Comparative example | 121 | 1 | 5 | 1 | 10 | 0.3 | 140 |
| Comparative | 122 | 1 | 5 | 1 | 10 | 0.3 | 140 |

TABLE 42-continued

| | | | | | | | |
|---|---|---|---|---|---|---|---|
| example | | | | | | | |
| Example | 123 | 1 | 5 | 1 | 10 | 0.3 | 140 |
| Example | 124 | 1 | 5 | 1 | 10 | 0.3 | 140 |
| Comparative example | 125 | 1 | 5 | 1 | 10 | 0.3 | 140 |
| Comparative example | 126 | 1 | 5 | 1 | 10 | 0.3 | 140 |
| Example | 127 | 1 | 5 | 1 | 10 | 0.3 | 140 |
| Example | 128 | 1 | 5 | 1 | 10 | 0.3 | 140 |
| Example | 129 | 1 | 5 | — | — | 0.3 | 140 |

TABLE 43

| | | Secondary layer | | | | | | |
|---|---|---|---|---|---|---|---|---|
| | | Organic resin | | Rust inhibitor | | Solid lubricant | | Coating |
| Classification | No. | Kind *9 | Blending quantity *11 | Kind *7 | Blending quantity *11 | Kind *10 | Blending quantity *11 | thickness (μm) |
| Example | 116 | 1 | 100 | 1 | 50 | — | — | 1.0 |
| Example | 117 | 1 | 100 | 1 | 30 | — | — | 1.0 |
| Example | 118 | 1 | 100 | 1 | 20 | 1 | 5 | 1.0 |
| Example | 119 | 1 | 100 | 1 | 20 | 2 | 5 | 1.0 |
| Example | 120 | 1 | 100 | 1 | 20 | 3 | 5 | 1.0 |
| Comparative example | 121 | — | — | — | — | — | — | — |
| Comparative example | 122 | 1 | 100 | 1 | 20 | 1 | 5 | 1.0 |
| Example | 123 | 1 | 100 | 1 | 20 | 1 | 5 | 1.0 |
| Example | 124 | 1 | 100 | 1 | 20 | 1 | 5 | 1.0 |
| Comparative example | 125 | 1 | 100 | 1 | 20 | 1 | 5 | 1.0 |
| Comparative example | 126 | 1 | 100※ | 1 | 20 | 1 | 5 | 1.0 |
| Example | 127 | 1 | 100 | 1 | 20 | 2 | 5 | 1.0 |
| Example | 128 | 1 | 100 | 1 | 20 | 2 | 5 | 1.0 |
| Example | 129 | 1 | 100 | 1 | 20 | 2 | 5 | 1.0 |

| | | | Performance | | | |
|---|---|---|---|---|---|---|
| Classification | No. | Secondary layer Baking temperature (° C.) | Corrosion resistance | Corrosion resistance after treatment | Weldability | Electrodeposited paint adhesion |
| Example | 116 | 140 | ◉ | ○ | ○ | ◉ |
| Example | 117 | 140 | ◉ | ○+ | ○ | ◉ |
| Example | 118 | 140 | ◉ | ◉ | ◉ | ◉ |
| Example | 119 | 140 | ◉ | ◉ | ◉ | ◉ |
| Example | 120 | 140 | ◉ | ◉ | ◉ | ◉ |
| Comparative example | 121 | — | X | X | ◉ | ◉ |
| Comparative example | 122 | 140 | Δ | Δ | ○ | ◉ |
| Example | 123 | 140 | ○ | ○ | ○ | ◉ |
| Example | 124 | 140 | ◉ | ◉ | ○ | ○ |
| Comparative example | 125 | 140 | ◉ | ○+ | X | X |
| Comparative example | 126 | 140 | ◉ | X | ○ | ○ |
| Example | 127 | 110 | ◉ | ○+ | ◉ | ◉ |
| Example | 128 | 200 | ○ | ○ | ◉ | ◉ |
| Example | 129 | 140 | ◉ | ◉ | ◉ | ◉ |

※ As the conductive agent, 80 parts by mass of iron phosphide is added to 100 parts by mass of the solid matter in the resin composition.

What is claimed is:

1. A surface-treated steel sheet with excellent corrosion resistance comprising:

(a) a plated steel sheet selected from the group consisting of a zinc-based plated steel sheet and an aluminum-based plated steel sheet;

(b) a surface-treatment coating having a coating thickness of 0.01 to 1 μm, and being formed by applying and drying on a surface of the plated steel sheet a surface treatment coating composition which contains the following ingredients (α) to (δ):

(α) a water-epoxy resin dispersion which is prepared by dispersing in water a (Z) modified epoxy resin obtained by a reaction of a (W) epoxy group-containing resin, an (X) primary amine compound and/or secondary amine compound, and an active hydrogen-containing compound in which a part or the entirety of the compound is structured by a (Y) hydrazine derivative having active hydrogen;

(β) a water dispersed polyurethane resin having a mass ratio of resin solid matter in the water-epoxy resin dispersion to resin solid matter in the water dispersed polyurethane resin in the surface treatment coating composition, expressed as (water-epoxy resin dispersion)/(water dispersed polyurethane resin), being 95/5 to 5/95;

(γ) a silane coupling agent in an amount of 1 to 300 parts by mass of solid matter therein to 100 parts by mass of the resin solid matter in the water-epoxy resin dispersion in the surface treatment coating composition; and (δ) phosphoric acid and/or a hexafluorometal acid in an amount of 0.1 to 80 parts by mass of solid matter therein to 100 parts by mass of the resin solid matter in the water-epoxy resin dispersion in the surface treatment coating composition; and (c) a top coating having a coating thickness of 0.3 to 2 μm, and being formed by applying and drying a coating composition for top coating, containing an (E) high molecular weight epoxy group-containing resin having a number average molecular weight of 6000 to 20000, wherein said high molecular weight epoxy group-containing resin is a hydrazine derivative-modified epoxy resin, the top coating being disposed on the surface-treatment coating.

2. The surface-treated steel sheet according to claim 1, wherein the (Y) hydrazine derivative containing active hydrogen is at least one compound selected from the group consisting of a pyrazole compound and a triazole compound, said compound having a ring structure of a five-membered ring or a six-membered ring, and has a nitrogen atom in the ring structure.

3. The surface-treated steel sheet according to claim 2, wherein the surface treatment coating composition further comprises a water-soluble phosphate in an amount of 0.1 to 60 parts by mass of solid matter therein to 100 parts by mass of the resin solid matter in the sum of the water-epoxy resin dispersion of the ingredient (α) and the water dispersed polyurethane resin of the ingredient (β).

4. The surface-treated steel sheet according to claim 3, wherein the surface treatment coating composition further comprises a non-chromium based rust inhibitor in an amount of 0.1 to 50 parts by mass of solid matter therein to 100 parts by mass of the resin solid matter in the sum of the water-epoxy resin dispersion of the ingredient (α) and the water dispersed polyurethane resin of the ingredient (β).

5. The surface-treated steel sheet according to claim 2, wherein the surface treatment coating composition further comprises a non-chromium based rust inhibitor in an amount of 0.1 to 50 parts by mass of solid matter therein to 100 parts by mass of the resin solid matter in the sum of the water-epoxy resin dispersion of the ingredient (α) and the water dispersed polyurethane resin of the ingredient (β).

6. The surface-treated steel sheet according to claim 1, wherein the surface treatment coating composition further comprises a water-soluble phosphate in an amount of 0.1 to 60 parts by mass of solid matter therein to 100 parts by mass of the resin solid matter in the sum of the water-epoxy resin dispersion of the ingredient (α) and the water dispersed polyurethane resin of the ingredient (β).

7. The surface-treated steel sheet according to claim 6, wherein the surface treatment coating composition further comprises a non-chromium based rust inhibitor in an amount of 0.1 to 50 parts by mass of solid matter therein to 100 parts by mass of the resin solid matter in the sum of the water-epoxy resin dispersion of the ingredient (α) and the water dispersed polyurethane resin of the ingredient (β).

8. The surface-treated steel sheet according to claim 1, wherein the surface treatment coating composition further comprises a non-chromium based rust inhibitor in an amount of 0.1 to 50 parts by mass of solid matter therein to 100 parts by mass of the resin solid matter in the sum of the water-epoxy resin dispersion of the ingredient (α) and the water dispersed polyurethane resin of the ingredient (β).

9. A method for manufacturing a surface-treated steel sheet with excellent corrosion resistance comprising the steps of:

(a) applying onto a surface of a zinc-based plated steel or an aluminum-based plated steel a surface treatment coating composition which contains the following ingredients (α) to (δ):

(α) a water-epoxy resin dispersion which is prepared by dispersing in water a (Z) modified epoxy resin obtained by a reaction of a (W) epoxy group-containing resin, an (X) primary amine compound and/or secondary amine compound, and an active hydrogen-containing compound in which a part or entire of the compound is structured by a (Y) hydrazine derivative having active hydrogen;

(β) a water dispersed polyurethane resin having a mass ratio of resin solid matter in the water-epoxy resin dispersion to resin solid matter in the water dispersed polyurethane resin in the surface treatment coating composition, expressed as (water-epoxy resin dispersion)/(water dispersed polyurethane resin), being 95/5 to 5/95;

(γ) a silane coupling agent in an amount of 1 to 300 parts by mass of solid matter therein to 100 parts by mass of the resin solid matter in the water-epoxy resin dispersion in the surface treatment coating composition; and (δ) phosphoric acid and/or a hexafluorometal acid in an amount of 0.1 to 80 parts by mass of solid matter therein to 100 parts by mass of the resin solid matter in the water-epoxy resin dispersion in the surface treatment coating composition;

(b) drying the applied surface treatment coating composition at an ultimate sheet temperature of 30° to 150° C., thus forming a surface-treatment coating having a coating thickness of 0.01 to 1 μm;

(c) forming a top coating having a coating thickness of 0.3 to 2 μm on the surface treatment coating by applying a coating composition for the top coating containing an (E) high molecular weight epoxy group-containing resin having a number average molecular weight of 6,000 to 20,000, wherein said high molecular weight epoxy group-containing resin is a hydrazine derivative-modified epoxy resin; and (d) drying the applied coating composition for a top coating at an ultimate sheet temperature of 30° to 150° C.

* * * * *

UNITED STATES PATENT AND TRADEMARK OFFICE
CERTIFICATE OF CORRECTION

| | | |
|---|---|---|
| PATENT NO. | : 8,012,599 B2 | Page 1 of 1 |
| APPLICATION NO. | : 11/977868 | |
| DATED | : September 6, 2011 | |
| INVENTOR(S) | : Tatsuya Miyoshi | |

It is certified that error appears in the above-identified patent and that said Letters Patent is hereby corrected as shown below:

On the Title Page, Item 56, References Cited:
Foreign Patent Document, Line 15;
change "JP2001-239514" to --JP2001-239517--

On the Title Page, Item 57, Abstract:
change the currently printed abstract to
--A surface-treated steel sheet has a zinc-based or an aluminum-based plated steel sheet, a surface-treatment coating being formed on the surface of the zinc-based or aluminum-based steel sheet by applying and drying a surface treatment coating composition thereon, and a top coating being formed by applying, and drying a coating composition for top coating on the surface-treatment coating. The surface treatment coating composition contains a water-epoxy resin dispersion, a water dispersed polyurethane resin, a silane coupling agent, and phosphoric acid and/or a hexaflourometal acid. The coating composition for a top coating contains a high molecular weight epoxy group-containing resin average molecular weight of 6,000 to 20,000.--

Signed and Sealed this
Sixteenth Day of October, 2012

David J. Kappos
*Director of the United States Patent and Trademark Office*